(12) United States Patent
Edwards et al.

(10) Patent No.: US 12,535,941 B2
(45) Date of Patent: Jan. 27, 2026

(54) USER INTERFACE FOR MANAGING INPUT TECHNIQUES

(71) Applicant: Apple Inc., Cupertino, CA (US)

(72) Inventors: Dylan Ross Edwards, San Jose, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/519,979

(22) Filed: Nov. 27, 2023

(65) Prior Publication Data

US 2024/0086055 A1 Mar. 14, 2024

Related U.S. Application Data

(63) Continuation of application No. 16/825,908, filed on Mar. 20, 2020, now Pat. No. 11,829,591.

(60) Provisional application No. 62/856,041, filed on Jun. 1, 2019.

(51) Int. Cl.
| | |
|---|---|
| *G06F 3/04886* | (2022.01) |
| *G06F 3/04845* | (2022.01) |
| *G06F 3/0485* | (2022.01) |
| *G06F 3/04883* | (2022.01) |
| *G06F 3/16* | (2006.01) |

(52) U.S. Cl.
CPC ........ *G06F 3/04845* (2013.01); *G06F 3/0485* (2013.01); *G06F 3/04883* (2013.01); *G06F 3/04886* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 8,587,547 B2 | 11/2013 | Koch et al. | |
| 2003/0210270 A1* | 11/2003 | Clow | G06F 3/0481 715/767 |
| 2005/0140660 A1 | 6/2005 | Valikangas | |
| 2006/0075359 A1 | 4/2006 | Bauchot et al. | |
| 2010/0031143 A1* | 2/2010 | Rao | G06F 3/0237 704/E15.001 |
| 2010/0141590 A1 | 6/2010 | Markiewicz et al. | |
| 2011/0153325 A1* | 6/2011 | Ballinger | G06F 3/04886 704/235 |
| 2012/0092381 A1 | 4/2012 | Hoover et al. | |

(Continued)

FOREIGN PATENT DOCUMENTS

| | | |
|---|---|---|
| CN | 1620642 A | 5/2005 |
| CN | 103064629 A | 4/2013 |

(Continued)

OTHER PUBLICATIONS

Roman, Daniel, "Gboard Keyboard Gets Voice Typing, iOS emojis", YouTube, Feb. 24, 2017, <URL: https://www.youtube.com/watch?v=kF0vcdc1V9Q>, retrieved Feb. 12, 2025 (Year: 2017).*

(Continued)

*Primary Examiner* — Christopher J Fibbi
(74) *Attorney, Agent, or Firm* — YHE Law LLP

(57) ABSTRACT

The present disclosure generally relates to managing input devices. In some embodiments, keyboards are resized. In some embodiments, visual feedback of an audio input is provided.

21 Claims, 50 Drawing Sheets

(56) References Cited

U.S. PATENT DOCUMENTS

| | | | |
|---|---|---|---|
| 2012/0127206 A1 | 5/2012 | Thompson et al. | |
| 2012/0206363 A1 | 8/2012 | Kyprianou et al. | |
| 2013/0067399 A1 | 3/2013 | Elliott et al. | |
| 2013/0234942 A1 | 9/2013 | Yoo et al. | |
| 2015/0346905 A1 | 12/2015 | Winer et al. | |
| 2016/0077793 A1* | 3/2016 | Disano | G06F 3/04883 715/728 |
| 2016/0085441 A1 | 3/2016 | Mitchell | |
| 2016/0147435 A1* | 5/2016 | Brody | G06F 3/04883 715/863 |
| 2017/0109039 A1 | 4/2017 | Lemay et al. | |
| 2017/0263248 A1* | 9/2017 | Gruber | G06F 40/166 |
| 2017/0302809 A1 | 10/2017 | Shogaki | |
| 2018/0011688 A1* | 1/2018 | Wei | G06F 3/0233 |
| 2019/0042645 A1 | 2/2019 | Othmer et al. | |
| 2019/0122658 A1* | 4/2019 | Nakagawa | G06F 3/167 |
| 2020/0020334 A1* | 1/2020 | Kang | G10L 15/22 |
| 2020/0379632 A1 | 12/2020 | Edwards et al. | |
| 2023/0134269 A1 | 5/2023 | Zer | |
| 2024/0361875 A1 | 10/2024 | Edwards et al. | |

FOREIGN PATENT DOCUMENTS

| | | |
|---|---|---|
| CN | 113808592 A | 12/2021 |
| EP | 2391101 A1 | 11/2011 |

OTHER PUBLICATIONS

Maindola, Amit, "Google Voice Type in Hindi—English", Dec. 24, 2016, YouTube, <URL: https://www.youtube.com/watch?v=W_Q9hKpCtlc>, retrieved Mar. 10, 2025 (Year: 2016).*

Maindola, Amit, "Google Voice Type in Hindi—English", Dec. 24, 2016, YouTube, <URL: https://www.youtube.com/watch?v=W_Q9hKpCtlc>, retrieved Jun. 5, 2025 (Year: 2016).*

Office Action received for Chinese Patent Application No. 202080039148.X, mailed on Feb. 7, 2024, 22 pages (13 pages of English Translation and 9 pages of Official Copy).

Office Action received for Chinese Patent Application No. 202080039148.X, mailed on Aug. 20, 2024, 19 pages (12 pages of English Translation and 7 pages of Official Copy).

Office Action received for Chinese Patent Application No. 202080039148.X, mailed on Jun. 26, 2024, 20 pages (13 pages of English Translation and 7 pages of Official Copy).

Applicant-Initiated Interview Summary received for U.S. Appl. No. 16/825,908, mailed on Feb. 2, 2023, 3 pages.

Applicant-Initiated Interview Summary received for U.S. Appl. No. 16/825,908, mailed on Jun. 5, 2023, 2 pages.

Applicant-Initiated Interview Summary received for U.S. Appl. No. 16/825,908, mailed on Oct. 31, 2022, 2 pages.

Examiner-Initiated Interview Summary received for U.S. Appl. No. 16/825,308, maiied on May 25, 2023, 2 pages.

Final Office Action received for U.S. Appl. No. 16/825,908, mailed on Dec. 14, 2022, 38 pages.

International Preliminary Report on Patentability received for PCT Patent Application No. PCT/IB2020/000308, mailed on Dec. 16, 2021, 12 pages.

International Search Report and Written Opinion received for PCT Patent Application No. PCT/IB2020/000308, mailed on Oct. 9, 2020, 17 pages.

Invitaton to Pay Additional fees received for PCT Patent Application No. PCT/IB2020/000308, mailed on Aug. 14, 2020, 9 pages.

Non-Final Office Action received for U.S. Appl. No. 16/825,908, mailed on Apr. 11, 2023, 41 pages.

Non-Final Office Action received for U.S. Appl. No. 16/825,908, mailed on Sep. 6, 2022, 31 pages.

Notice of Allowance received for U.S. Appl. No. 16/825,908, mailed on Jul. 19, 2023, 10 pages.

Howcast, "How to Move the iPad Keyboard I Mac Basics", Available online at: https://www.youtube.com/watch?v=se0kucTrNXk, May 11, 2014, 4 pages.

Nuance, "Dragon NaturallySpeaking", Version 13, End-User Workbook, 2014, 125 pages.

Office Action received for European Patent Application No. 20732308.0, mailed on Oct. 31, 2024, 7 pages.

Apple Support, "How to show a continuous overlay for Voice Control on iPhone, iPad, and iPod touch—Apple Support", Online available at: www.youtube.com/watch?v=kYTmdWpf8uo, Dec. 18, 2020, 2 pages.

Jacobs Quicktips for Iphone, "How to use Voice Dictation to transcribe text on iPad", Online available at: https://www.youtube.com/watch?v=qhXMBbZf8zQ, Mar. 2, 2020, 3 pages.

Mailtag, "How to Use Gmail Smart Compose", Online available at: https://www.youtube.com/watch?v=_hBJIN5OdVM, Oct. 16, 2018, 3 pages.

My RSI Life, "Dragon Naturally Speaking Tutorial #1 (Professional Individual version 15)", Online available at: https://www.youtube.com/watch?v=G2m0kUkYHuQ, Oct. 6, 2022, 5 pages.

My RSI Life, "Dragon Naturally Speaking Tutorial #3—Using Dragon with Microsoft Excel", Online available at: https://www.youtube.com/watch?v=EuLu3x-gQ28, Mar. 12, 2023, 4 pages.

Non-Final Office Action received for U.S. Appl. No. 18/643,954, mailed on Jul. 31, 2025, 17 pages.

Applicant-Initiated Interview Summary received for U.S. Appl. No. 18/643,954, mailed on Aug. 22, 2025, 5 pages.

* cited by examiner

USER INTERFACE FOR MANAGING INPUT TECHNIQUES

CROSS REFERENCE TO RELATED APPLICATIONS

This application is a continuation of U.S. Nonprovisional patent application Ser. No. 16/825,908, entitled "USER INTERFACE FOR MANAGING INPUT TECHNIQUES," filed on Mar. 20, 2020, which claims priority to U.S. Provisional Patent Application Ser. No. 62/856,041, entitled "USER INTERFACE FOR MANAGING INPUT TECHNIQUES," filed on Jun. 1, 2019, the contents of which are hereby incorporated by reference in their entirety.

FIELD

The present disclosure relates generally to computer user interfaces, and more specifically to techniques for managing input techniques.

BACKGROUND

Electronic devices provide various techniques for managing user input. Some touchscreen devices provide on-screen keyboards that enable users to provide keyboard input. Such on-screen keyboards consume part of the display space. Some devices provide audio transcription capabilities that enables users to provide audio input.

BRIEF SUMMARY

Some techniques for managing input techniques using electronic devices, however, are generally cumbersome and inefficient. For example, some existing techniques use a complex and time-consuming user interface, which may include multiple key presses or keystrokes. For another example, some techniques use up significant display space, thereby reducing the amount of other content that can be displayed. Existing techniques require more time than necessary, wasting user time and device energy. This latter consideration is particularly important in battery-operated devices.

Accordingly, the present technique provides electronic devices with faster, more efficient methods and interfaces for managing input techniques. Such methods and interfaces optionally complement or replace other methods for managing input techniques. Such methods and interfaces reduce the cognitive burden on a user and produce a more efficient human-machine interface. Such methods and interfaces reduced the about of display space required to operate, thereby enabling the device to display additional content. For battery-operated computing devices, such methods and interfaces conserve power and increase the time between battery charges.

Example methods are disclosed herein. An example method includes, at an electronic device a display device and a touch-sensitive surface: displaying, on the display device, a keyboard at a first size, the keyboard including a first set of keys, wherein activation of a respective key of the first set of keys causes a corresponding respective character to be added into an input area; while displaying the keyboard at the first size, detecting, using the touch-sensitive surface, a first gesture that includes a set of two or more contacts; in response to detecting at least a portion of the first gesture: in accordance with a determination that a first set of resizing criteria is satisfied, wherein the first set of resizing criteria includes a first resizing criterion that is satisfied when the first gesture includes movement of the set of two or more contacts: resizing, on the display device, display of the keyboard to a second size that is smaller than the first size, the second size determined based on a magnitude of the movement of the set of two or more contacts; while displaying the keyboard at the second size, detecting, using the touch-sensitive surface, lift-off of the set of two or more contacts; and in response to detecting lift-off of the set of two or more contacts: in accordance with a determination that a set of liftoff criteria is satisfied, wherein the set of liftoff criteria includes a first liftoff criterion that is satisfied when the magnitude of the movement of the set of two or more contacts exceeds a first threshold magnitude: resizing, on the display device, display of the keyboard to a third size different from the first size and the second size.

Example non-transitory computer-readable storage media are described herein. An example non-transitory computer-readable storage medium stores one or more programs configured to be executed by one or more processors of an electronic device with a display device and a touch-sensitive surface, the one or more programs including instructions for: displaying, on the display device, a keyboard at a first size, the keyboard including a first set of keys, wherein activation of a respective key of the first set of keys causes a corresponding respective character to be added into an input area; while displaying the keyboard at the first size, detecting, using the touch-sensitive surface, a first gesture that includes a set of two or more contacts; in response to detecting at least a portion of the first gesture: in accordance with a determination that a first set of resizing criteria is satisfied, wherein the first set of resizing criteria includes a first resizing criterion that is satisfied when the first gesture includes movement of the set of two or more contacts: resizing, on the display device, display of the keyboard to a second size that is smaller than the first size, the second size determined based on a magnitude of the movement of the set of two or more contacts; while displaying the keyboard at the second size, detecting, using the touch-sensitive surface, lift-off of the set of two or more contacts; and in response to detecting lift-off of the set of two or more contacts: in accordance with a determination that a set of liftoff criteria is satisfied, wherein the set of liftoff criteria includes a first liftoff criterion that is satisfied when the magnitude of the movement of the set of two or more contacts exceeds a first threshold magnitude: resizing, on the display device, display of the keyboard to a third size different from the first size and the second size.

Example transitory computer-readable storage media are described herein. An example transitory computer-readable storage medium stores one or more programs configured to be executed by one or more processors of an electronic device with a display device and a touch-sensitive surface, the one or more programs including instructions for: displaying, on the display device, a keyboard at a first size, the keyboard including a first set of keys, wherein activation of a respective key of the first set of keys causes a corresponding respective character to be added into an input area; while displaying the keyboard at the first size, detecting, using the touch-sensitive surface, a first gesture that includes a set of two or more contacts; in response to detecting at least a portion of the first gesture: in accordance with a determination that a first set of resizing criteria is satisfied, wherein the first set of resizing criteria includes a first resizing criterion that is satisfied when the first gesture includes movement of the set of two or more contacts: resizing, on the display device, display of the keyboard to a second size that is smaller than the first size, the second size determined based on a magnitude of the movement of the set of two or more contacts; while displaying the keyboard at the second size, detecting, using the touch-sensitive surface, lift-off of the set of two or more contacts; and in response to detecting lift-off of the set of two or more contacts: in accordance with a determination that a set of liftoff criteria is satisfied, wherein the set of liftoff criteria includes a first liftoff criterion that is satisfied when the magnitude of the movement of the set of two or more contacts exceeds a first threshold magnitude: resizing, on the display device, display of the keyboard to a third size different from the first size and the second size.

Example electronic devices are described herein. An example electronic device includes a display device; a touch-sensitive surface; one or more processors; and memory storing one or more programs configured to be executed by the one or more processors, the one or more programs including instructions for: displaying, on the display device, a keyboard at a first size, the keyboard including a first set of keys, wherein activation of a respective key of the first set of keys causes a corresponding respective character to be added into an input area; while displaying the keyboard at the first size, detecting, using the touch-sensitive surface, a first gesture that includes a set of two or more contacts; in response to detecting at least a portion of the first gesture: in accordance with a determination that a first set of resizing criteria is satisfied, wherein the first set of resizing criteria includes a first resizing criterion that is satisfied when the first gesture includes movement of the set of two or more contacts: resizing, on the display device, display of the keyboard to a second size that is smaller than the first size, the second size determined based on a magnitude of the movement of the set of two or more contacts; while displaying the keyboard at the second size, detecting, using the touch-sensitive surface, lift-off of the set of two or more contacts; and in response to detecting lift-off of the set of two or more contacts: in accordance with a determination that a set of liftoff criteria is satisfied, wherein the set of liftoff criteria includes a first liftoff criterion that is satisfied when the magnitude of the movement of the set of two or more contacts exceeds a first threshold magnitude: resizing, on the display device, display of the keyboard to a third size different from the first size and the second size.

An example electronic device includes: a display device; a touch-sensitive surface; means for displaying, on the display device, a keyboard at a first size, the keyboard including a first set of keys, wherein activation of a respective key of the first set of keys causes a corresponding respective character to be added into an input area; means for, while displaying the keyboard at the first size, detecting, using the touch-sensitive surface, a first gesture that includes a set of two or more contacts; means for, in response to detecting at least a portion of the first gesture: in accordance with a determination that a first set of resizing criteria is satisfied, wherein the first set of resizing criteria includes a first resizing criterion that is satisfied when the first gesture includes movement of the set of two or more contacts: resizing, on the display device, display of the keyboard to a second size that is smaller than the first size, the second size determined based on a magnitude of the movement of the set of two or more contacts; means for, while displaying the keyboard at the second size, detecting, using the touch-sensitive surface, lift-off of the set of two or more contacts; and means for, in response to detecting lift-off of the set of two or more contacts: in accordance with a determination that a set of liftoff criteria is satisfied, wherein the set of liftoff criteria includes a first liftoff criterion that is satisfied when the magnitude of the movement of the set of two or more contacts exceeds a first threshold magnitude: resizing, on the display device, display of the keyboard to a third size different from the first size and the second size.

An example method includes, at an electronic device with a display device and an audio input device: while not displaying, on the display device, a text entry field and a transcription affordance, receiving a request; in response to receiving the request, concurrently displaying, on the display device: the text entry field, and the transcription affordance; detecting a first user input; in response to detecting the first user input: in accordance with a determination that a first set of transcription criteria is satisfied, wherein the first set of transcription criteria includes a first transcription criterion that is satisfied when the first user input corresponds to activation of the transcription affordance: displaying, at a location on the display device that is proximate to the text entry field, a visual object that provides visual feedback based on audio detected using the audio input device; and in accordance with a determination that the first set of transcription criteria is not satisfied: forgoing displaying, at the location on the display device that is proximate to the text entry field, the visual object that provides visual feedback based on audio detected using the audio input device.

An example non-transitory computer-readable storage medium stores one or more programs configured to be executed by one or more processors of an electronic device with a display device and an audio input device, the one or more programs including instructions for: while not displaying, on the display device, a text entry field and a transcription affordance, receiving a request; in response to receiving the request, concurrently displaying, on the display device: the text entry field, and the transcription affordance; detecting a first user input; in response to detecting the first user input: in accordance with a determination that a first set of transcription criteria is satisfied, wherein the first set of transcription criteria includes a first transcription criterion that is satisfied when the first user input corresponds to activation of the transcription affordance: displaying, at a location on the display device that is proximate to the text entry field, a visual object that provides visual feedback based on audio detected using the audio input device; and in accordance with a determination that the first set of transcription criteria is not satisfied: forgoing displaying, at the location on the display device that is proximate to the text entry field, the visual object that provides visual feedback based on audio detected using the audio input device.

An example transitory computer-readable storage medium stores one or more programs configured to be executed by one or more processors of an electronic device with a display device and an audio input device, the one or more programs including instructions for: while not displaying, on the display device, a text entry field and a transcription affordance, receiving a request; in response to receiving the request, concurrently displaying, on the display device: the text entry field, and the transcription affordance; detecting a first user input; in response to detecting the first user input: in accordance with a determination that a first set of transcription criteria is satisfied, wherein the first set of transcription criteria includes a first transcription criterion that is satisfied when the first user input corresponds to activation of the transcription affordance: displaying, at a location on the display device that is proximate to the text entry field, a visual object that provides visual feedback based on audio detected using the audio input device; and in accordance with a determination that the first set of transcription criteria is not satisfied: forgoing displaying, at the location on the display device that is proximate to the text entry field, the visual object that provides visual feedback based on audio detected using the audio input device.

An example electronic device includes a display device; an audio input device; one or more processors; and memory storing one or more programs configured to be executed by the one or more processors, the one or more programs including instructions for: while not displaying, on the display device, a text entry field and a transcription affordance, receiving a request; in response to receiving the request, concurrently displaying, on the display device: the text entry field, and the transcription affordance; detecting a first user input; in response to detecting the first user input: in accordance with a determination that a first set of transcription criteria is satisfied, wherein the first set of transcription criteria includes a first transcription criterion that is satisfied when the first user input corresponds to activation of the transcription affordance: displaying, at a location on the display device that is proximate to the text entry field, a visual object that provides visual feedback based on audio detected using the audio input device; and in accordance with a determination that the first set of transcription criteria is not satisfied: forgoing displaying, at the location on the display device that is proximate to the text entry field, the visual object that provides visual feedback based on audio detected using the audio input device.

An example electronic device includes a display device; an audio input device; means for while not displaying, on the display device, a text entry field and a transcription affordance, receiving a request; means for, in response to receiving the request, concurrently displaying, on the display device: the text entry field, and the transcription affordance; means for, detecting a first user input; means for, in response to detecting the first user input: in accordance with a determination that a first set of transcription criteria is satisfied, wherein the first set of transcription criteria includes a first transcription criterion that is satisfied when the first user input corresponds to activation of the transcription affordance: displaying, at a location on the display device that is proximate to the text entry field, a visual object that provides visual feedback based on audio detected using the audio input device; and in accordance with a determination that the first set of transcription criteria is not satisfied: forgoing displaying, at the location on the display device that is proximate to the text entry field, the visual object that provides visual feedback based on audio detected using the audio input device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing input techniques, thereby increasing the effectiveness, efficiency, and user satisfaction with such devices. Such methods and interfaces may complement or replace other methods for managing input techniques.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing input techniques. For example, reducing the amount of display space required to provide such techniques enables the device to display additional content. Such techniques can reduce the cognitive burden on a user who provides inputs to the device, thereby enhancing productivity. Further, such techniques can reduce processor and battery power otherwise wasted on redundant user inputs.

Figure 6A:
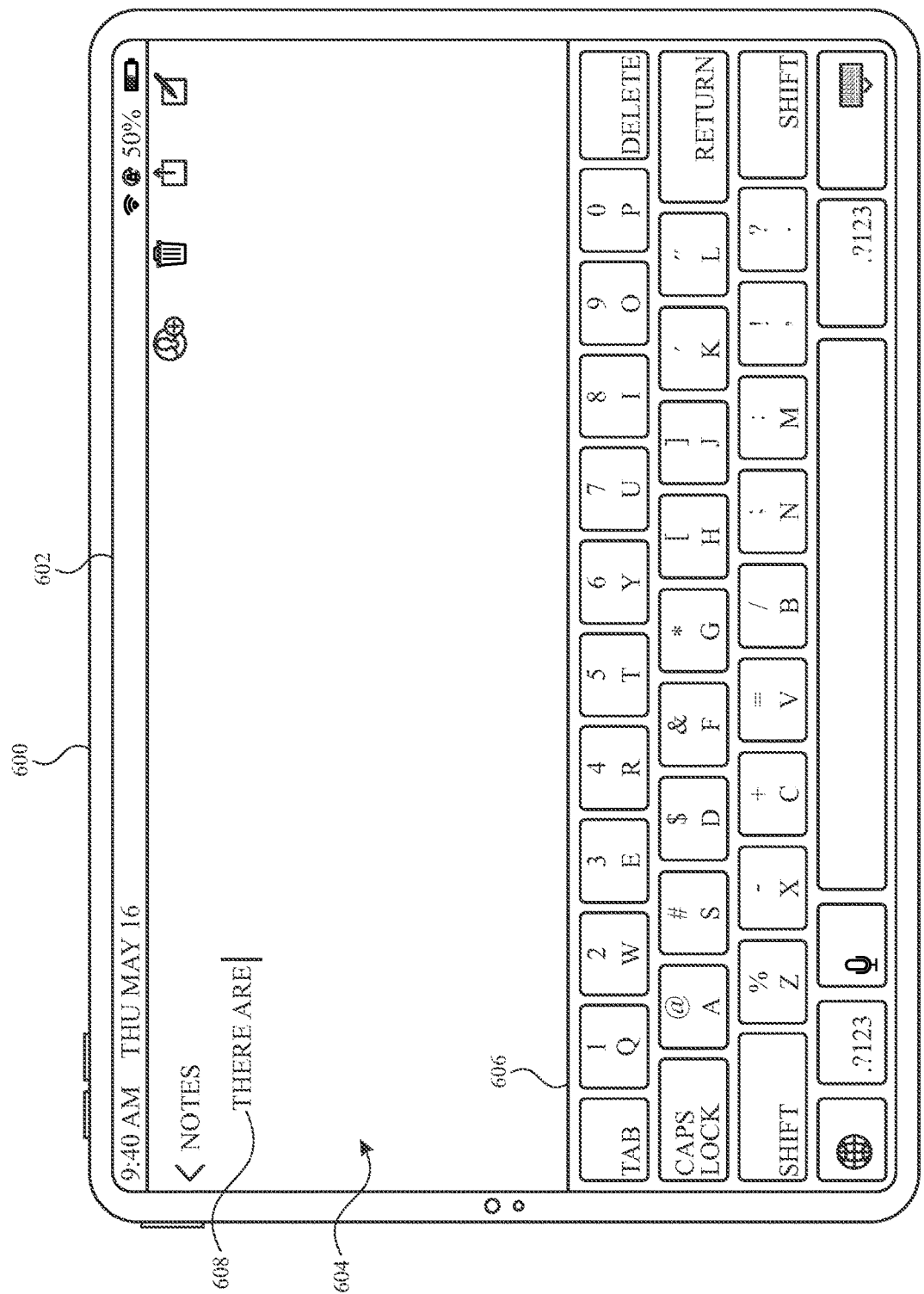
FIGS. 6A-6W illustrate exemplary user interfaces for managing keyboards, in accordance with some embodiments.
Figure 6W:
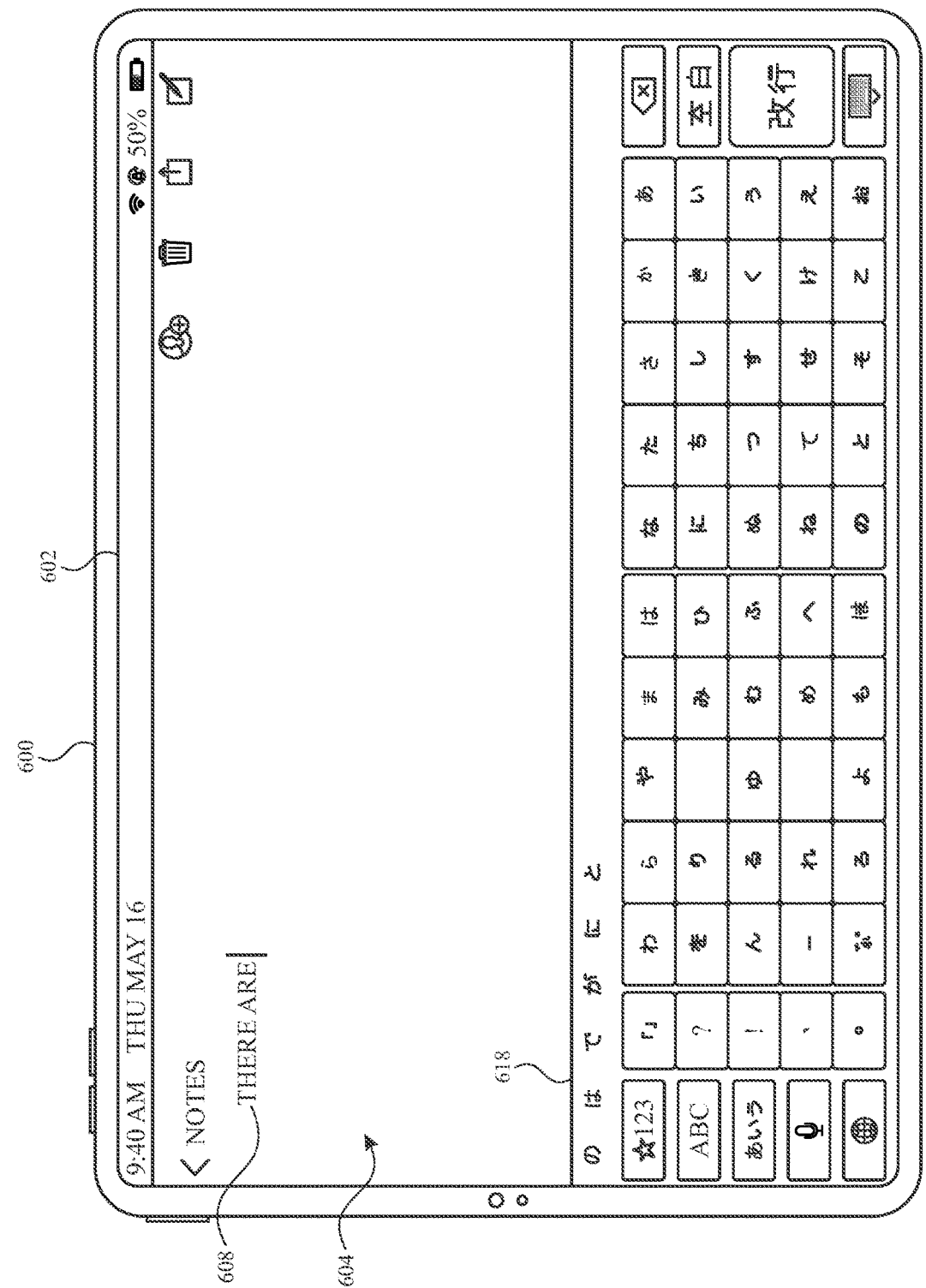
Figure 7:
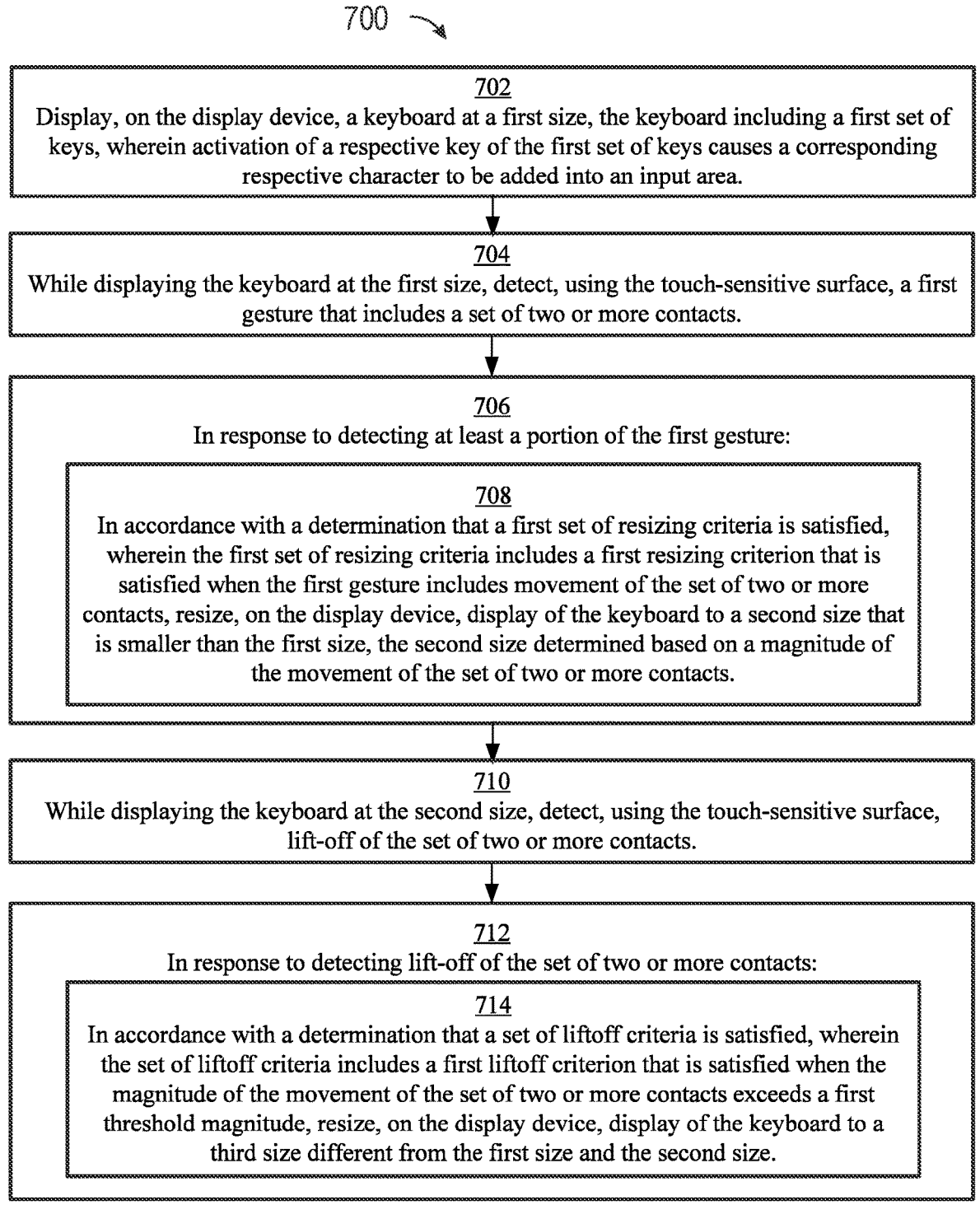
FIG. 7 is a flow diagram illustrating methods for managing keyboards, in accordance with some embodiments.

Below, FIGS. 1A-1B, 2, 3, 4A-4B, and 5A-5H provide a description of exemplary devices for performing the techniques for managing event notifications. FIGS. 6A-6W illustrate exemplary user interfaces for managing keyboards, in accordance with some embodiments. FIG. 7 is a flow diagram illustrating methods for managing keyboards, in accordance with some embodiments. The user interfaces in FIGS. 6A-6W are used to illustrate the processes described below, including the processes in FIG. 7. FIGS. 8A-8K illustrate exemplary user interfaces for providing visual feedback of an audio input, in accordance with some embodiments. FIG. 9 is a flow diagram illustrating methods for providing visual feedback of an audio input, in accordance with some embodiments. The user interfaces in FIGS. 8A-8K are used to illustrate the processes described below, including the processes in FIG. 9.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
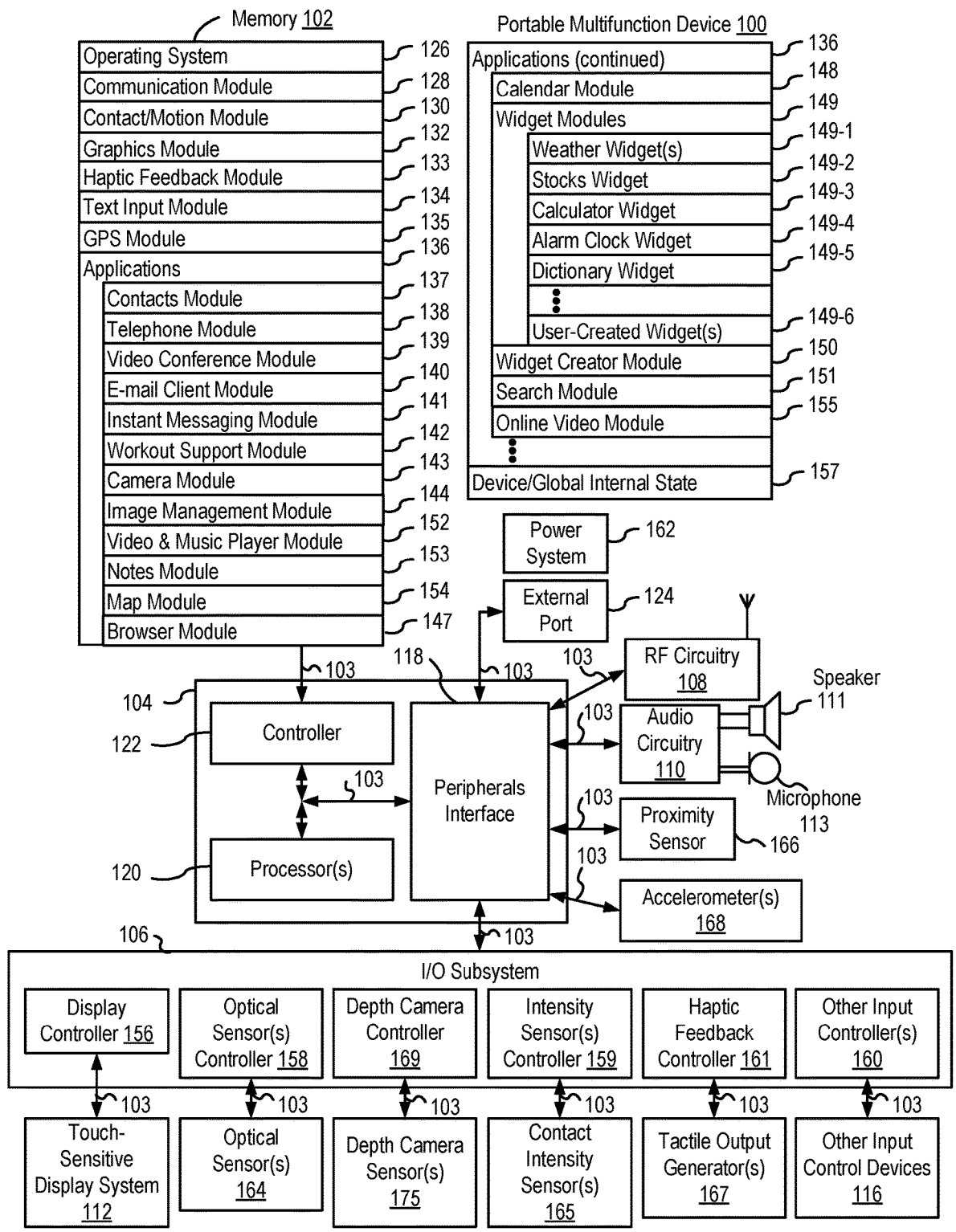
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
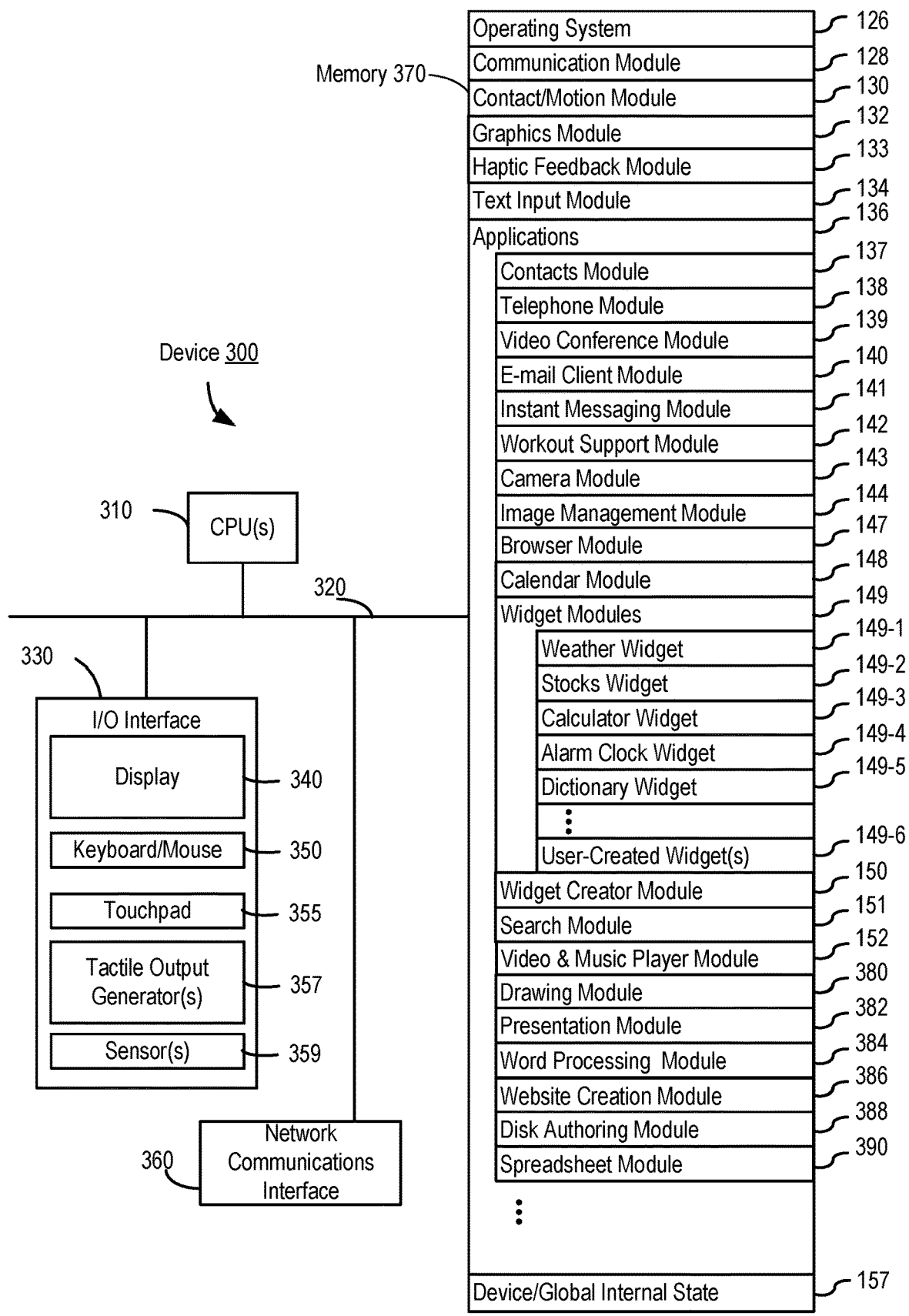
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
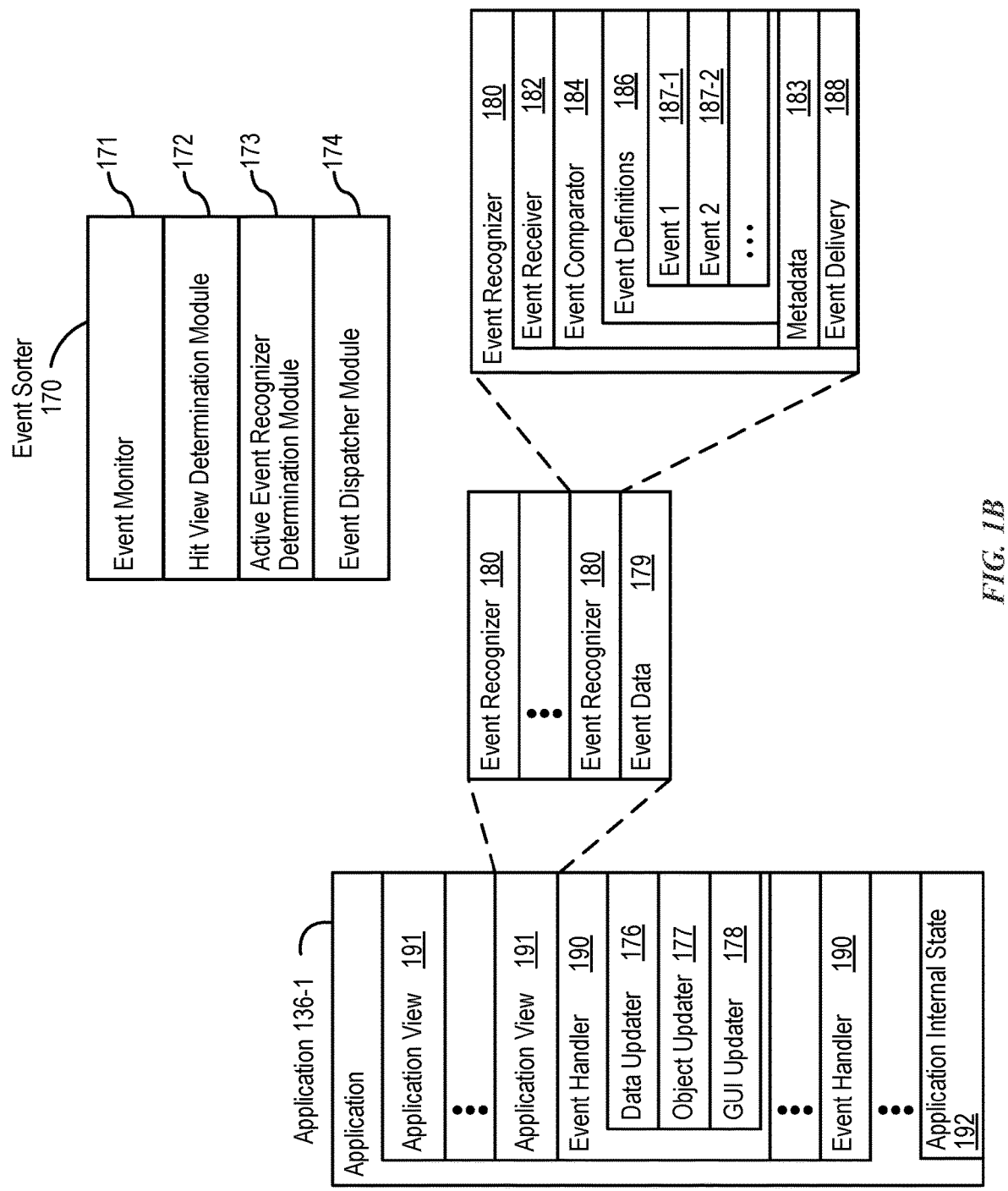
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
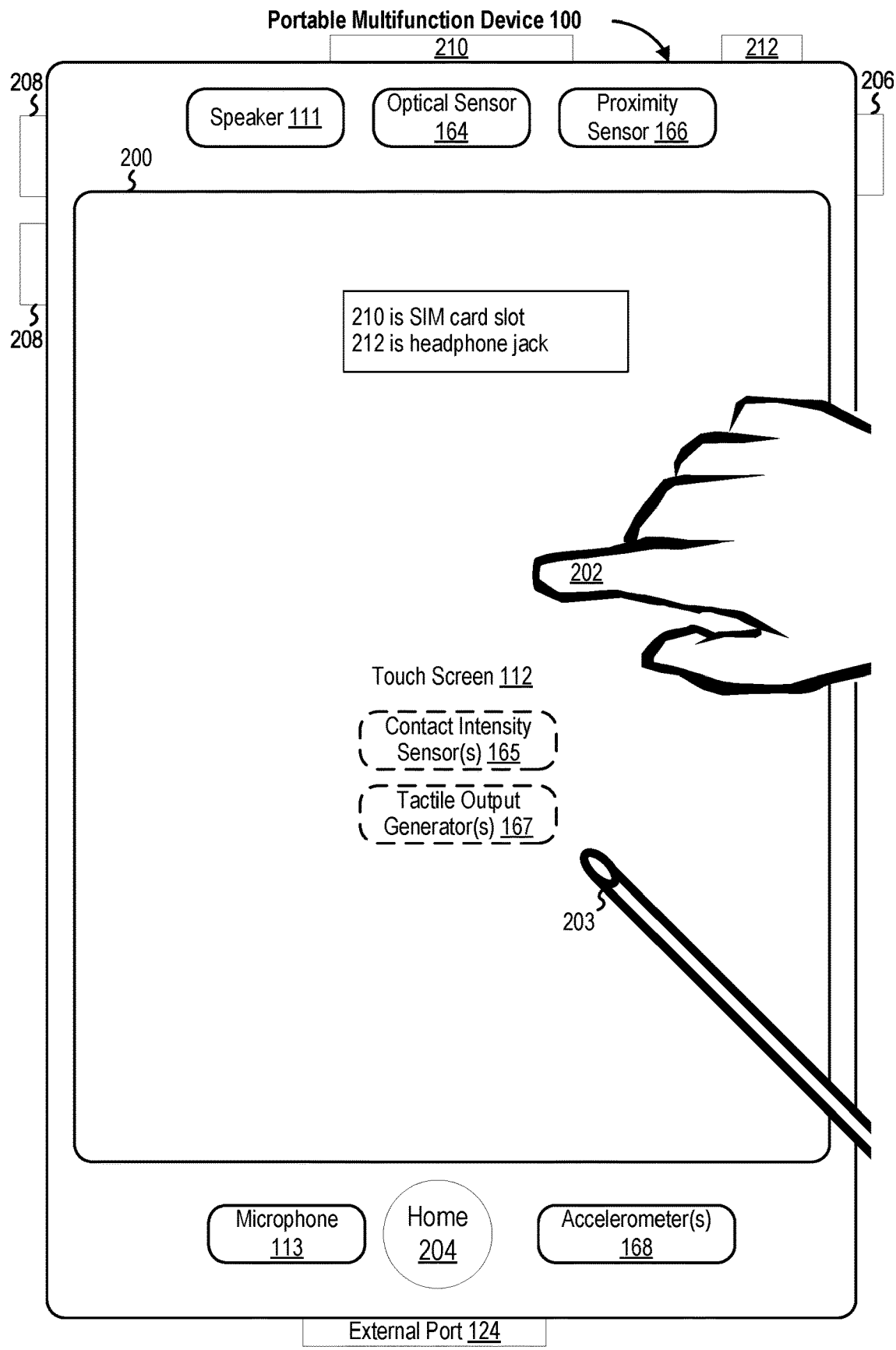
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
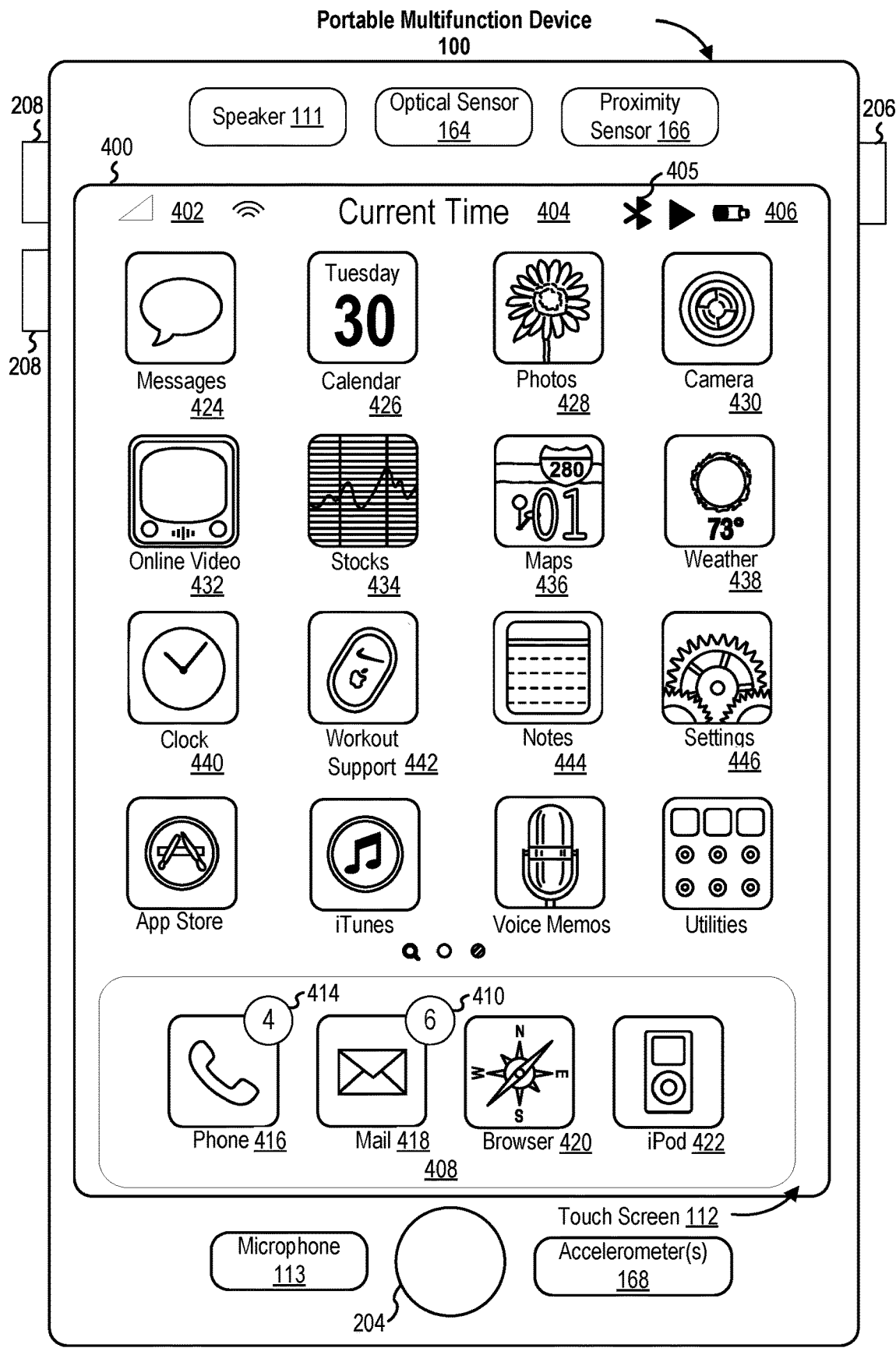
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
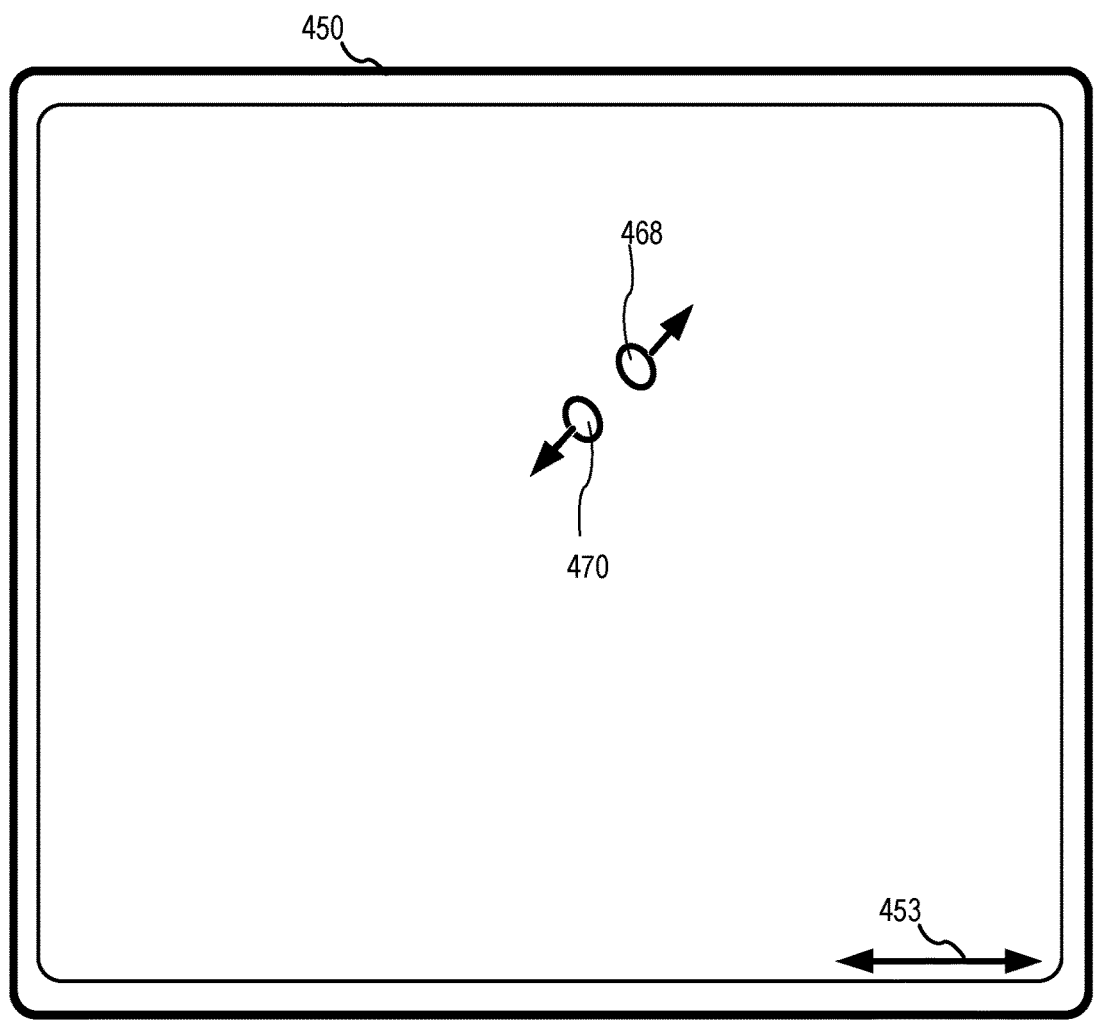
FIG. 4B illustrates an exemplary user interface for a multifunction device with a touch-sensitive surface that is separate from the display in accordance with some embodiments.
Figure 4B:
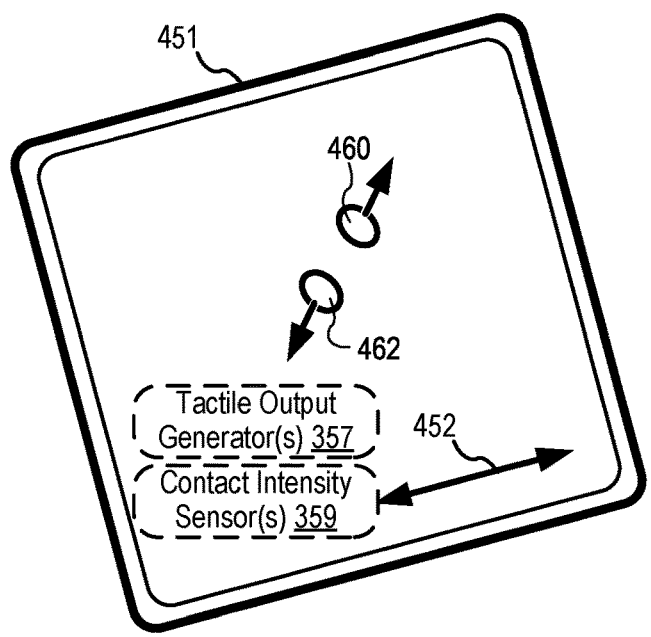

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
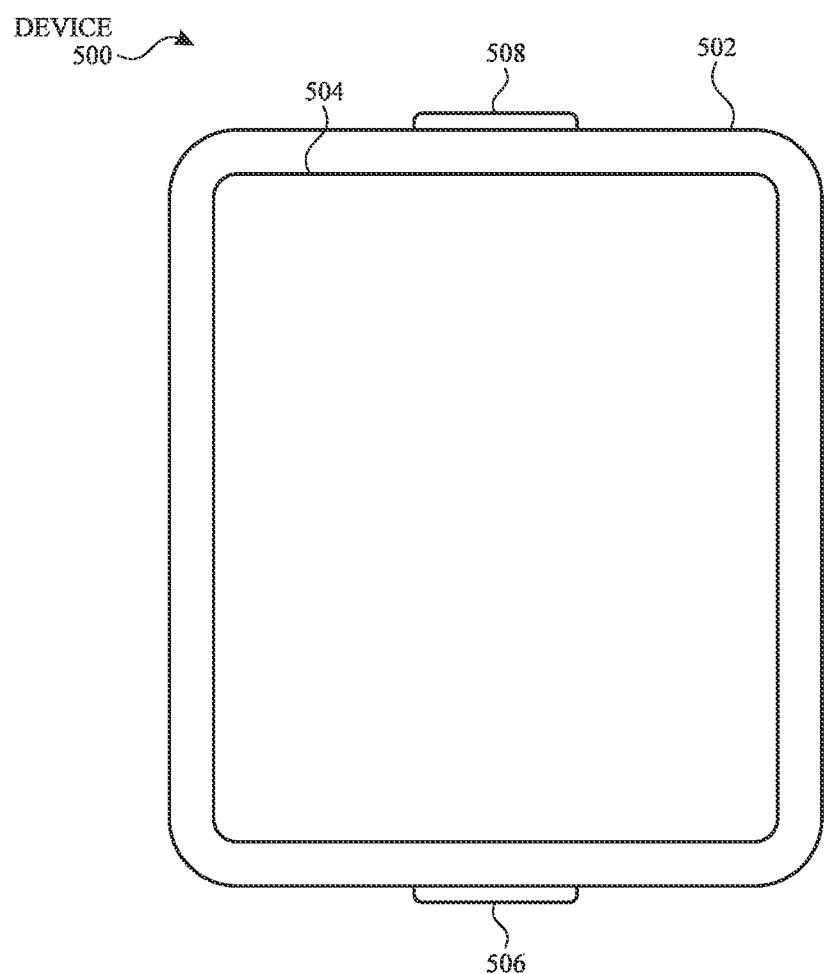
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
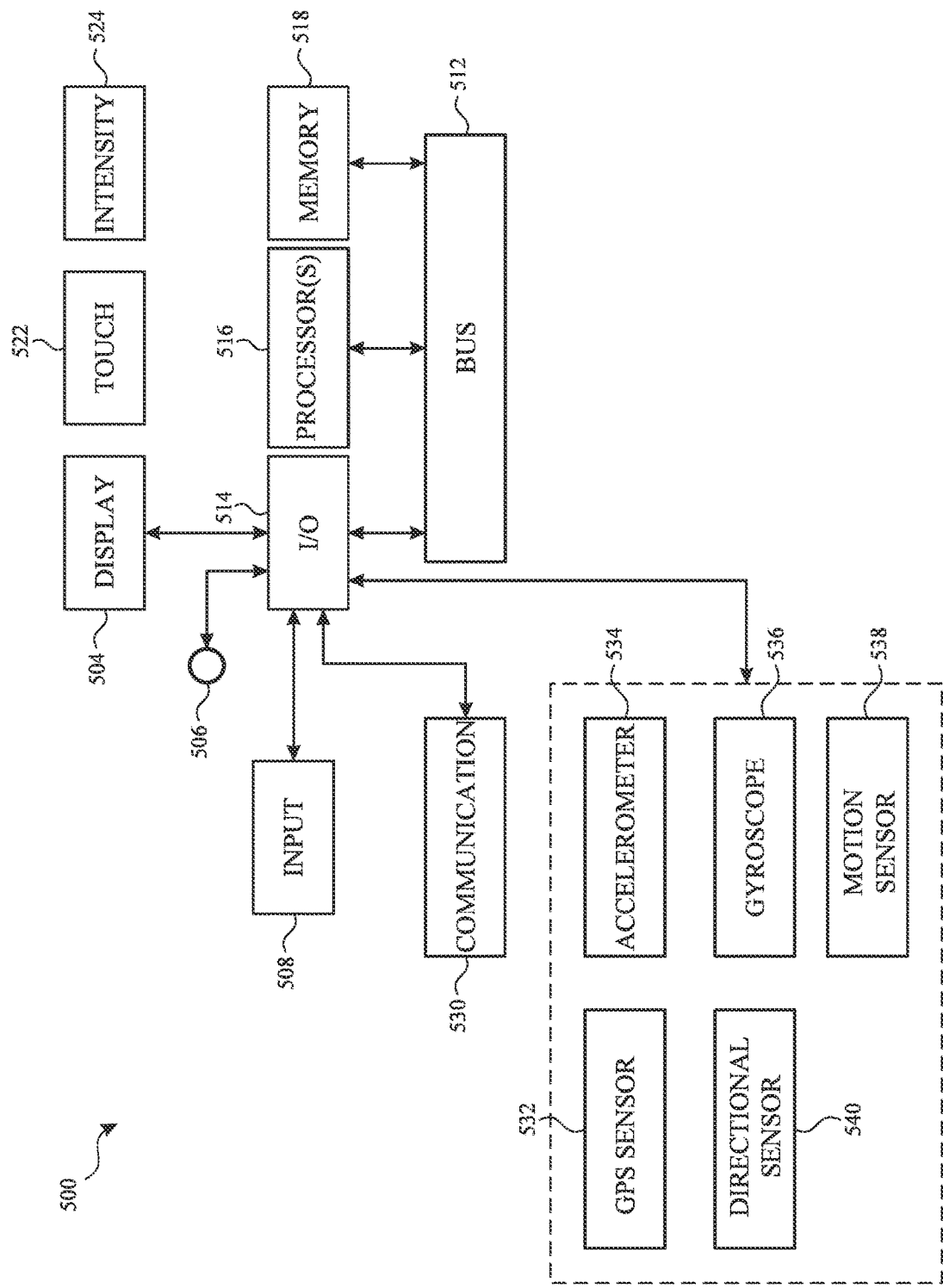
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
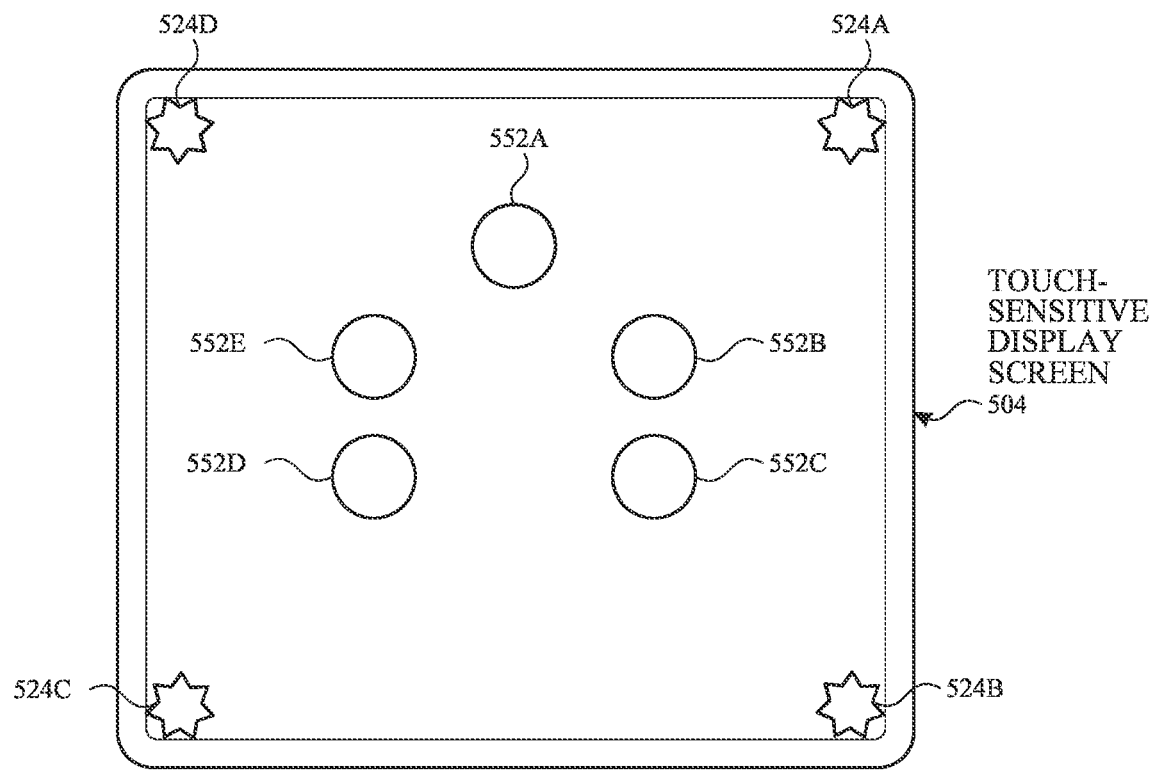
FIGS. 5C-5D illustrate exemplary components of a personal electronic device having a touch-sensitive display and intensity sensors in accordance with some embodiments.
Figure 5C:
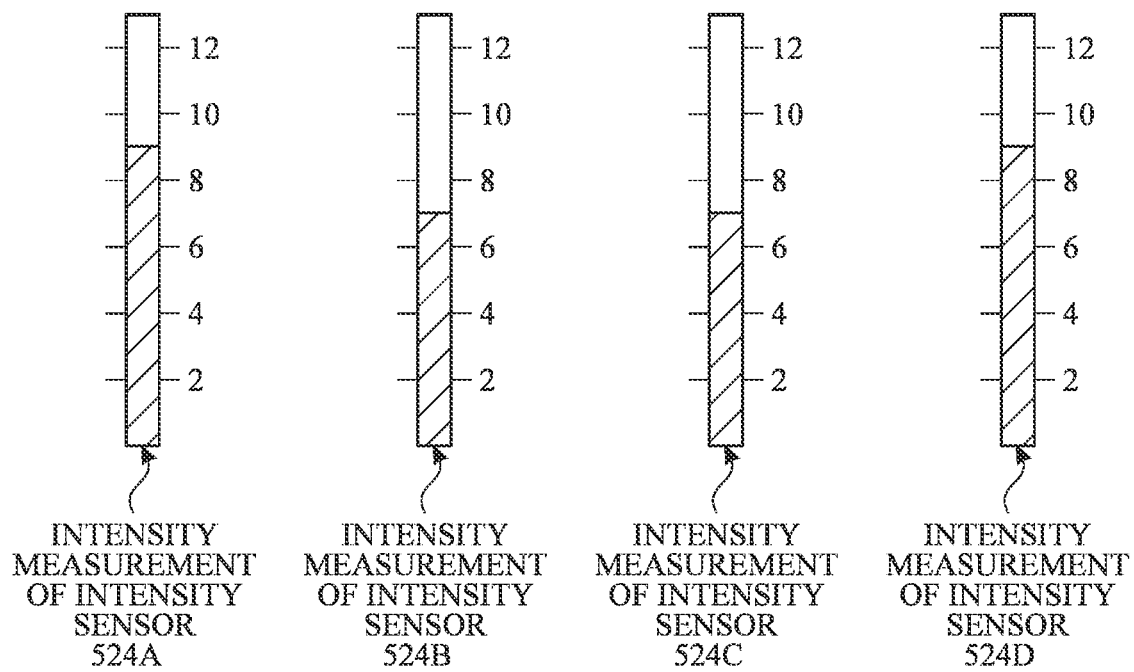
Figure 5D:
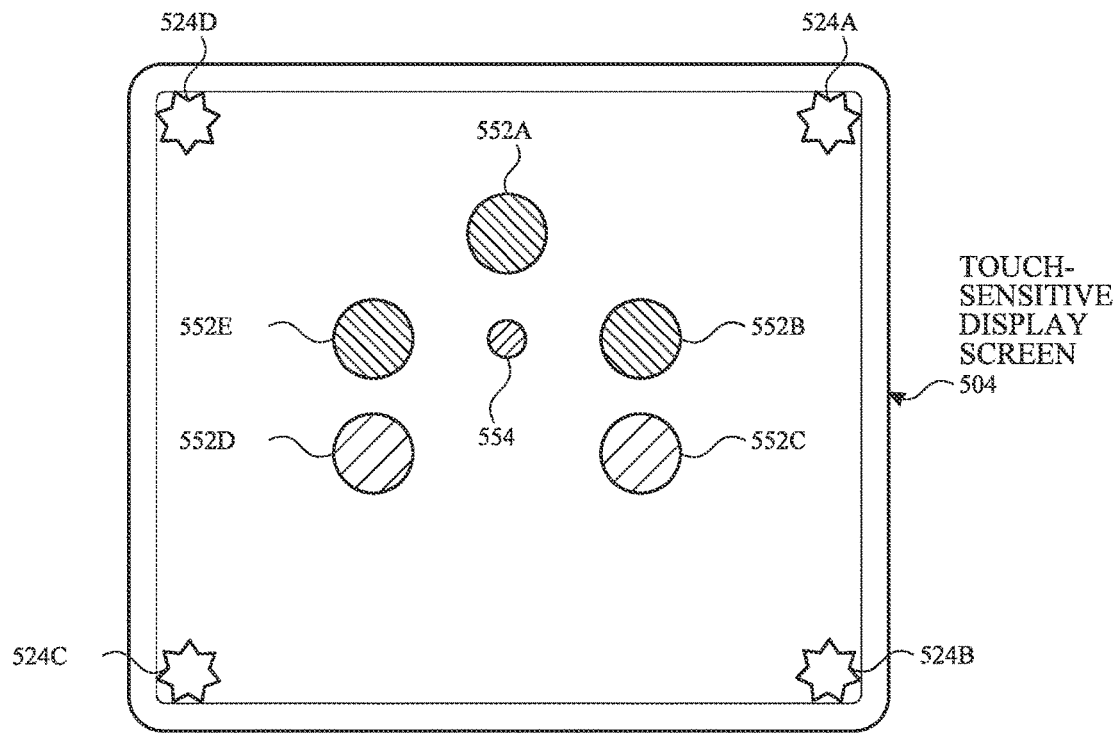
Figure 5D:
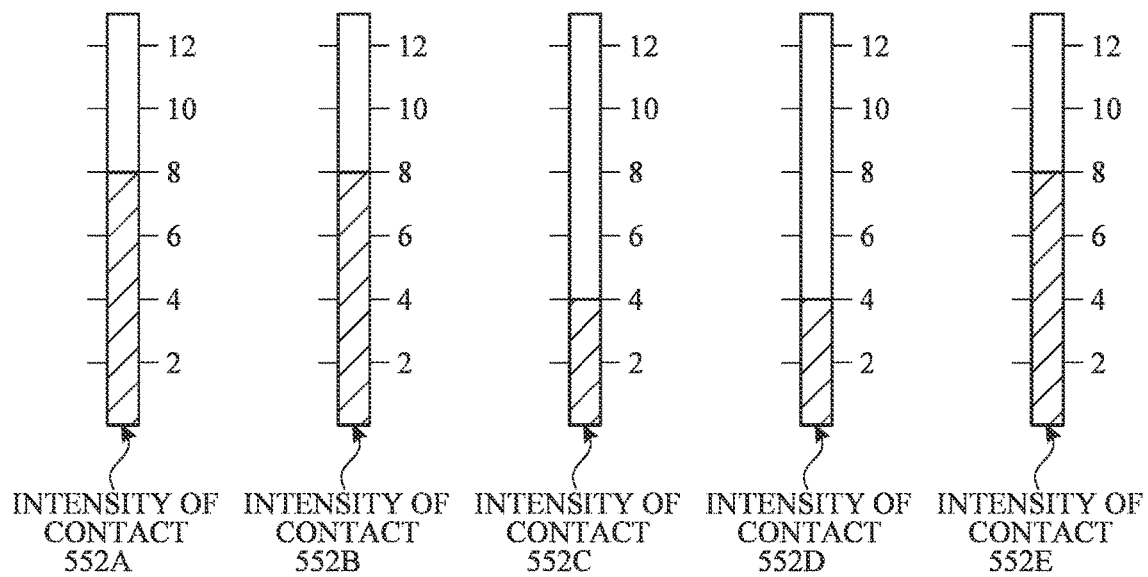

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
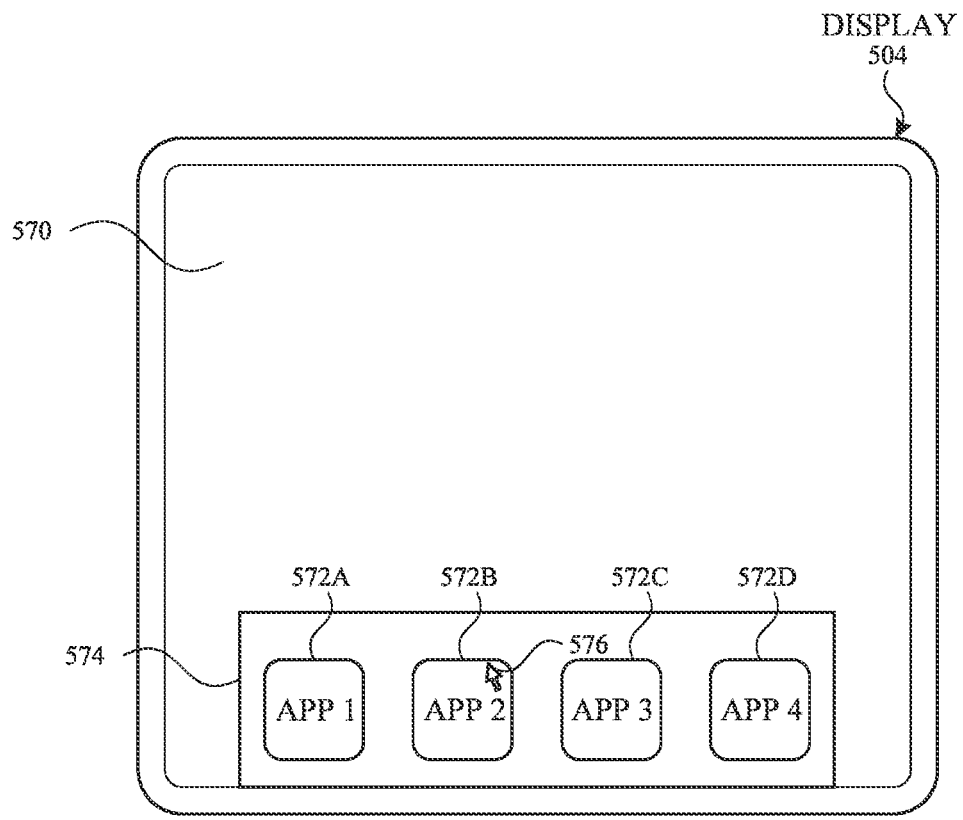
FIGS. 5E-5H illustrate exemplary components and user interfaces of a personal electronic device in accordance with some embodiments.
Figure 5E:
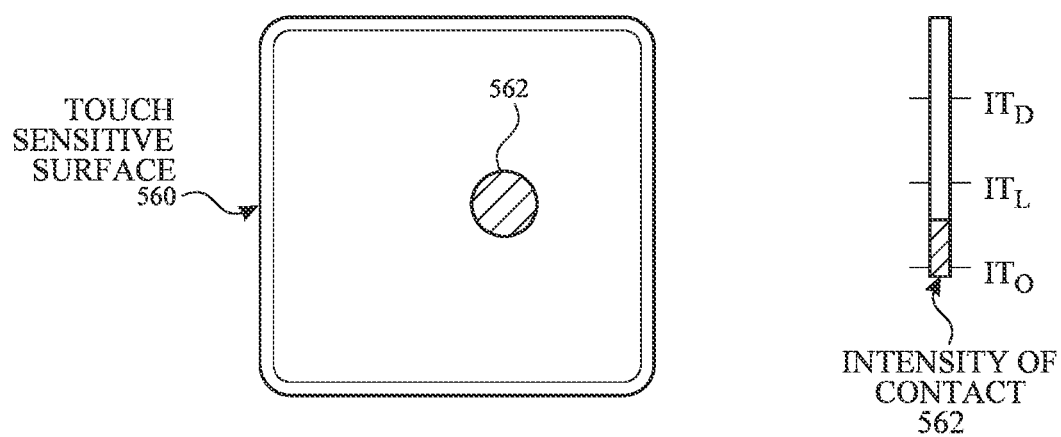
Figure 5F:
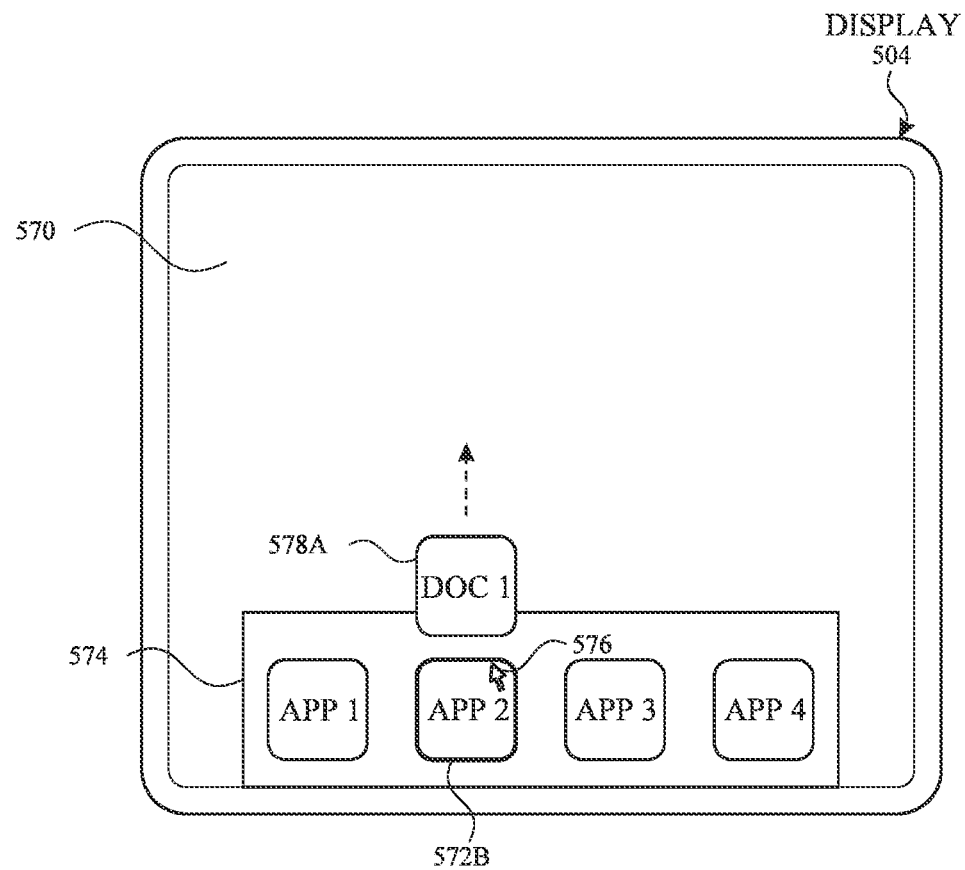
Figure 5F:
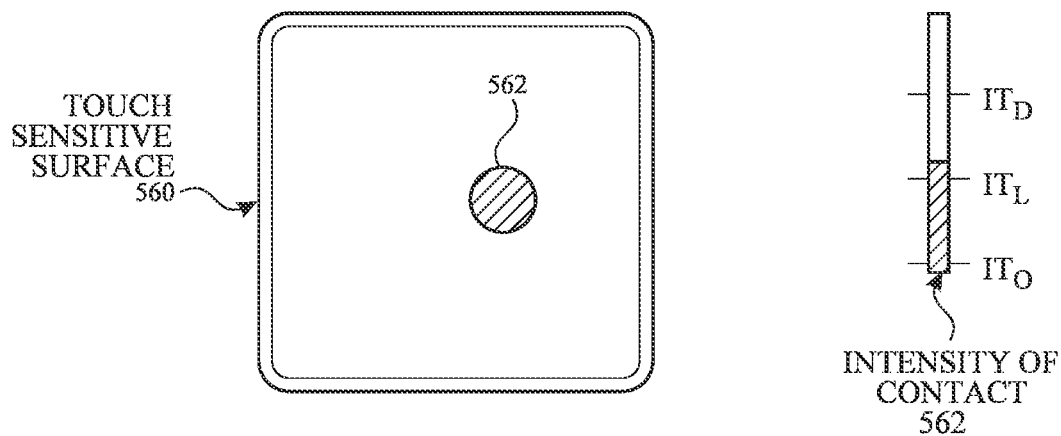
Figure 5G:
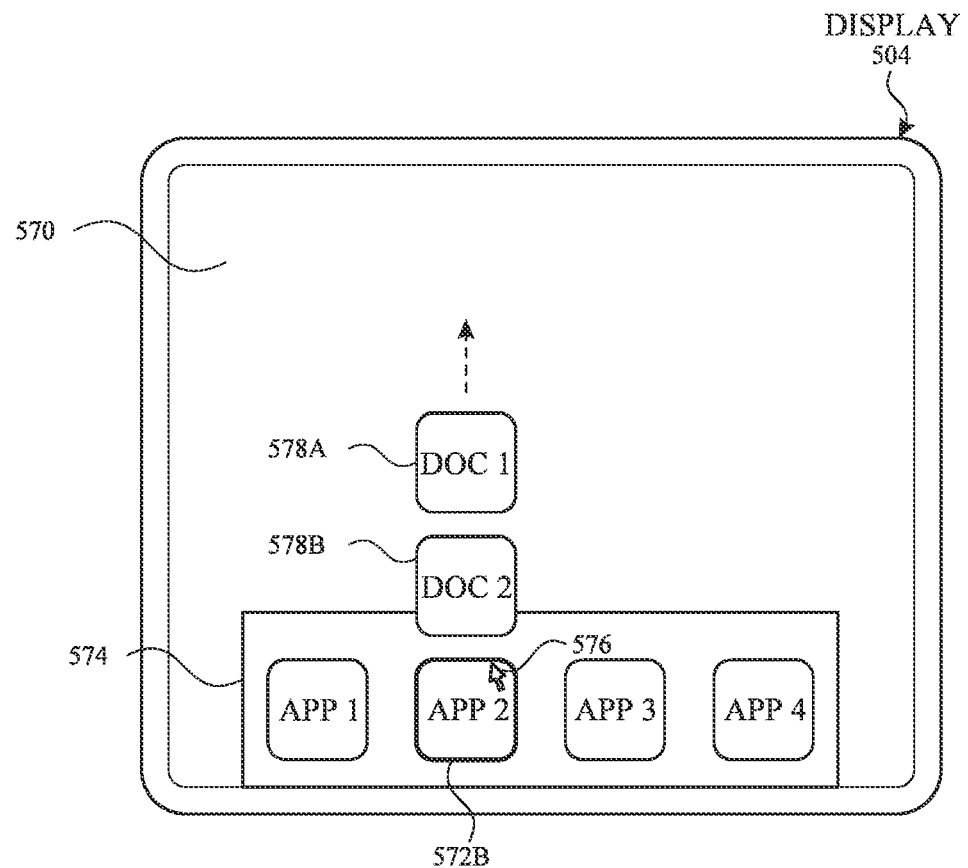
Figure 5G:
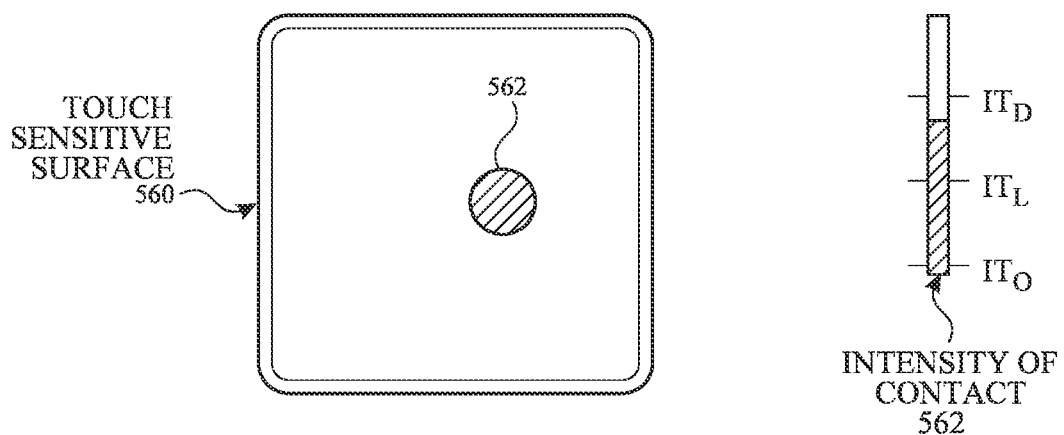
Figure 5H:
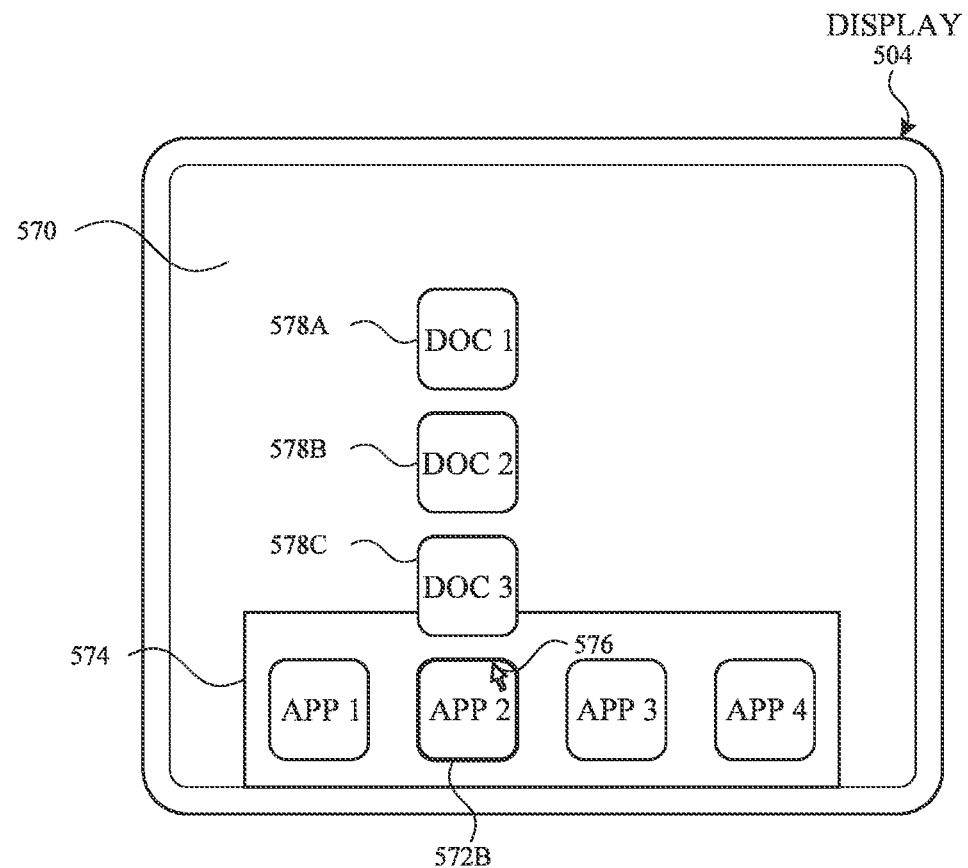
Figure 5H:
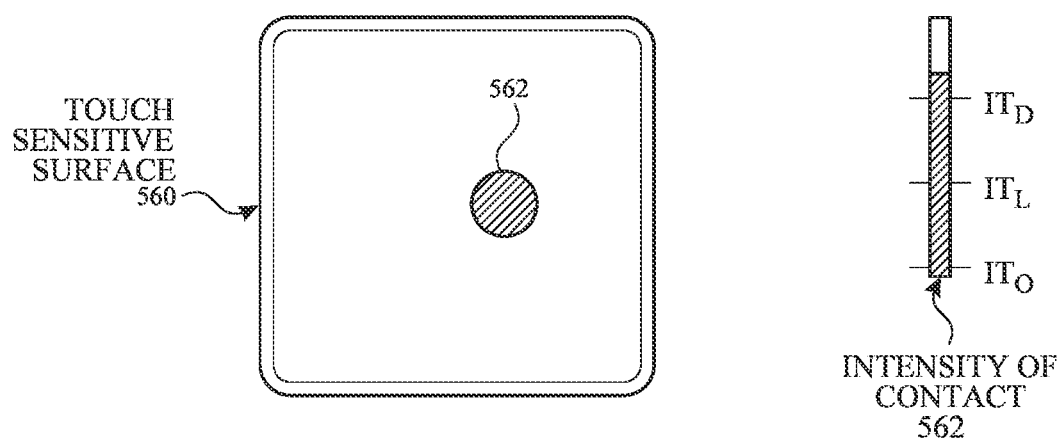

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as portable multifunction device 100, device 300, or device 500.

FIGS. 6A-6W illustrate exemplary user interfaces for managing keyboards, in accordance with some embodiments. The user interfaces in these figures are used to illustrate the processes described below, including the processes in FIG. 7.

FIG. 6A illustrates an electronic device 600 including a display device 602 integrated with a touch-sensitive surface. In some embodiments, electronic device 600 includes one or more features of device 100, 300, or 500. Electronic device 600 displays, on display device 602, a user interface 604 (e.g., an interface for a notes application). User interface 604 includes keyboard 606. As shown in FIG. 6A, keyboard 606 includes a set of keys corresponding to a QWERTY layout. When a key of keyboard 606 is activated, a corresponding character is added into input area 608 (e.g., a text entry field, a search field, a document). As shown in FIG. 6A, keyboard 606 extends the full width of the display device 602 and abuts the bottom edge of the display device 602 (in the landscape orientation).

Figure 6B:
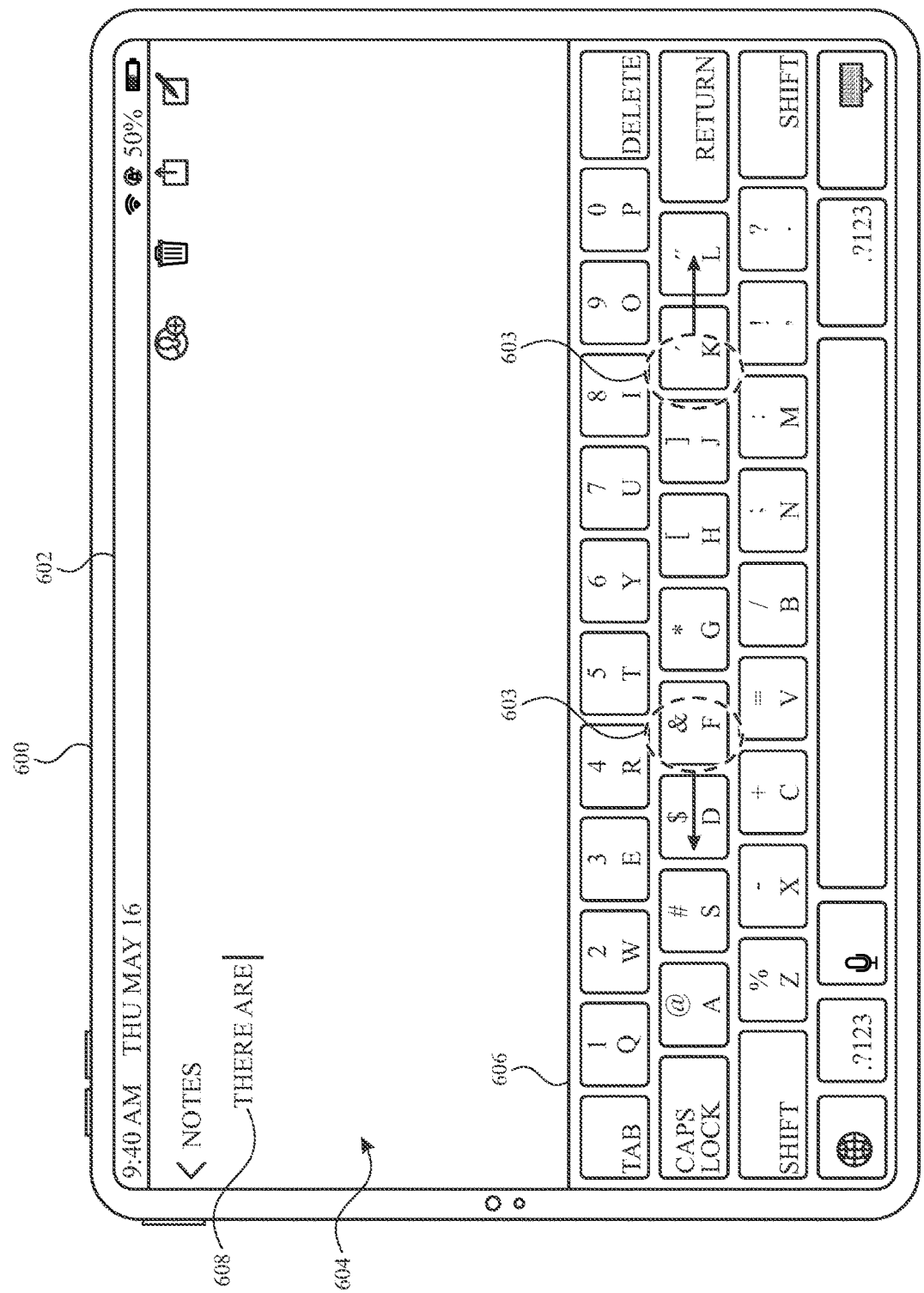

FIG. 6B illustrates contacts 603 on display device 602 at locations corresponding to keyboard 606 (e.g., two concurrent finger contacts on keyboard 606). The contacts 603 move away from each other to perform a depinch gesture on keyboard 606. In some embodiments, electronic device 600 detects the depinch gesture when movement of the contacts 603 is more than a threshold distance away from each other. The contacts 603 do not cause activation of any keys of keyboard 606, and no characters are added into input area 608.

Figure 6C:
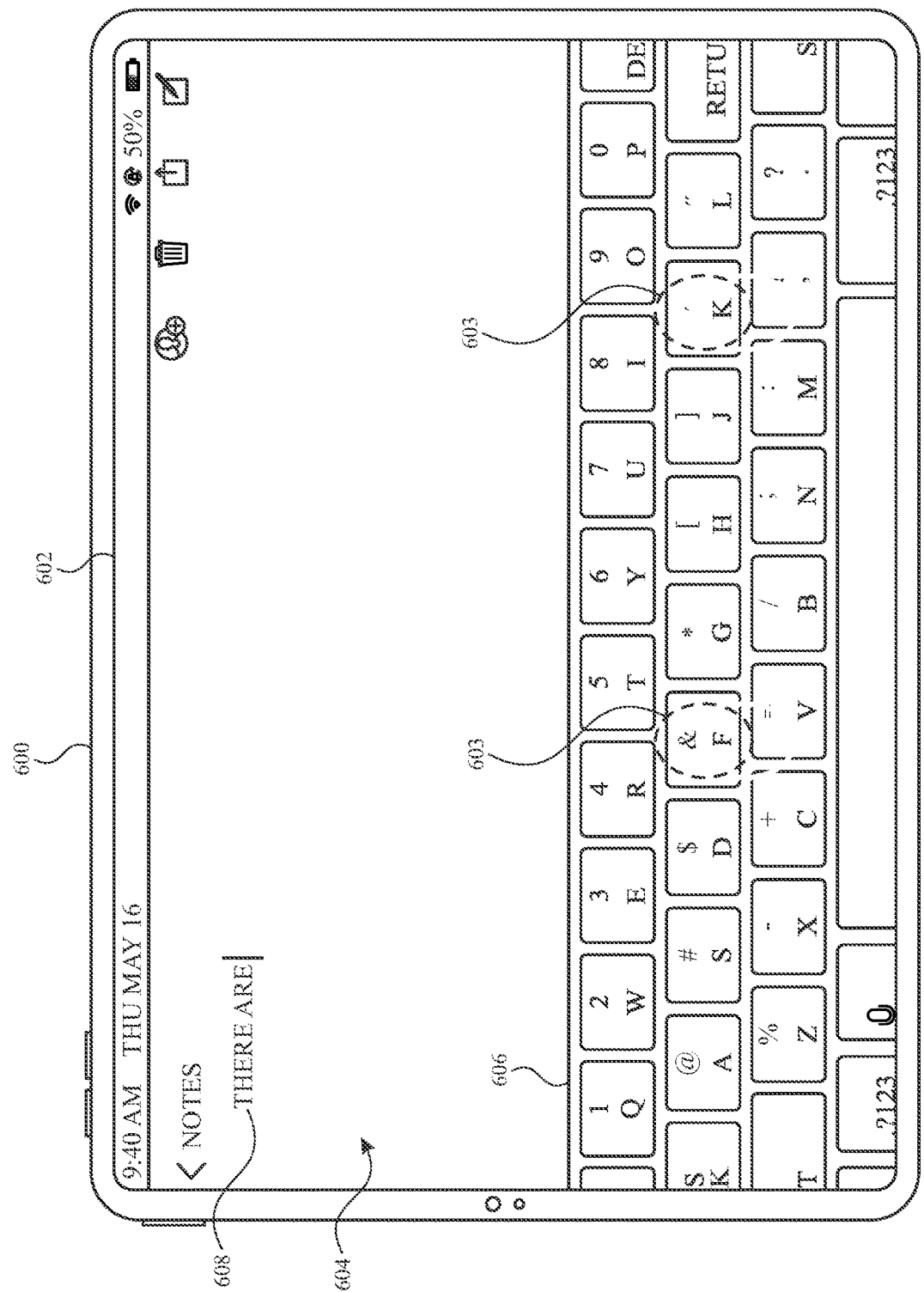

As shown in FIG. 6C, when the electronic device 600 detects the depinch gesture performed by contacts 603, keyboard 606 is enlarged in both height and width (e.g., displayed in a bigger size than keyboard 606 shown in FIG. 6A). In some embodiments, the amount keyboard 606 is enlarged in size is based on the distance that contacts 603 move away from each other. In some embodiments, as the contacts 603 move away from each other, the keyboard 606 is displayed changing size with the movement of the contacts 603 (e.g., animated during the transition to another size). In some embodiments, individual keys of the keyboard 606 change size as the keyboard changes size, while the aspect ratios of the individual keys are maintained. While the contacts 603 continue to be detected on display device 602 (e.g., no lift-off of the fingers is detected), keyboard 606 continues to be displayed at the enlarged size.

Figure 6D:
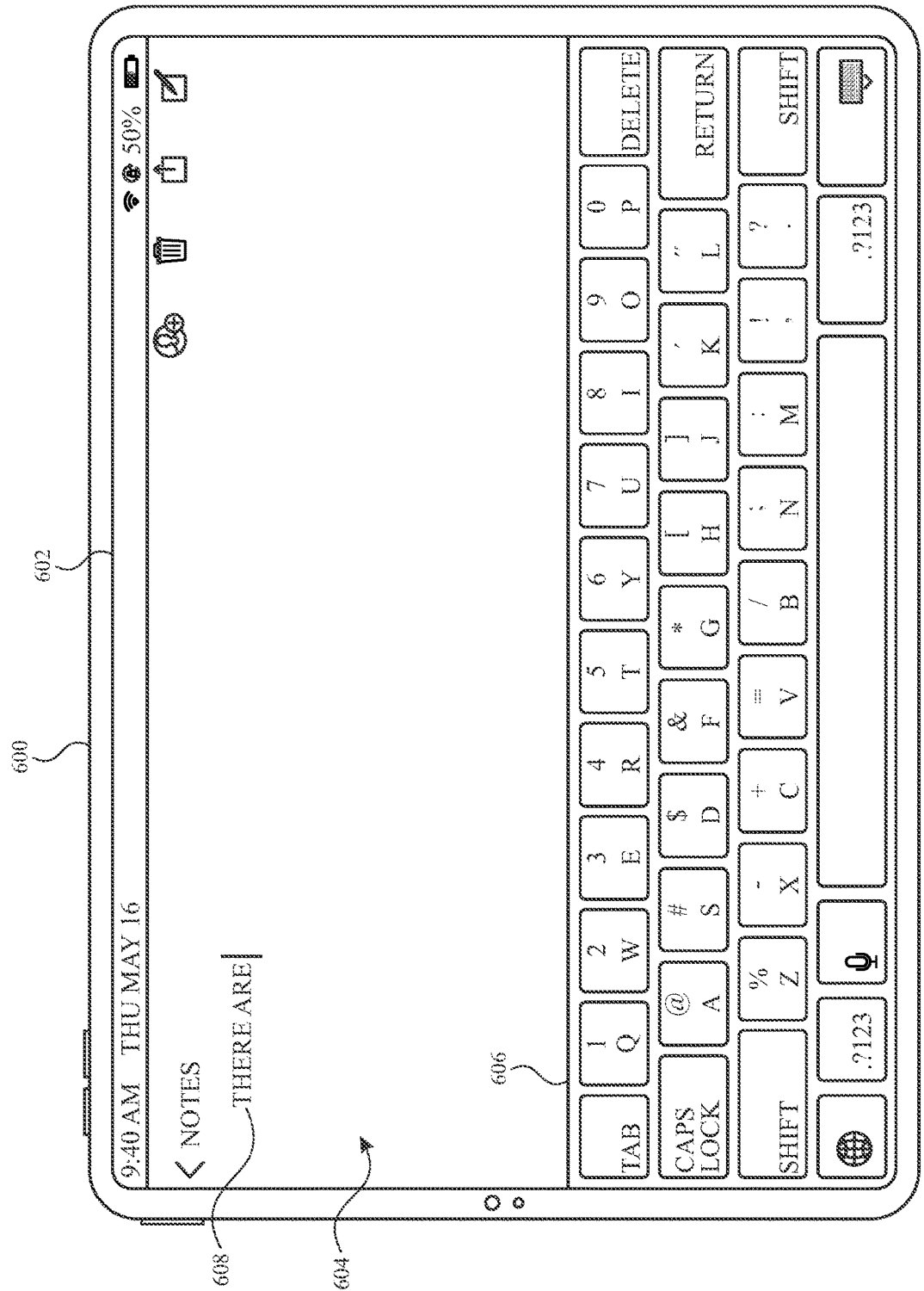

As shown in FIG. 6D, when the contacts 603 are released (e.g., a lift-off of the fingers is detected), keyboard 606 returns to the previous size before the depinch gesture was detected (e.g., the size of keyboard 606 shown in FIG. 6A), thereby indicating to the user that the keyboard cannot be expanded (and maintained) beyond the full size shown in FIG. 6D.

Figure 6E:
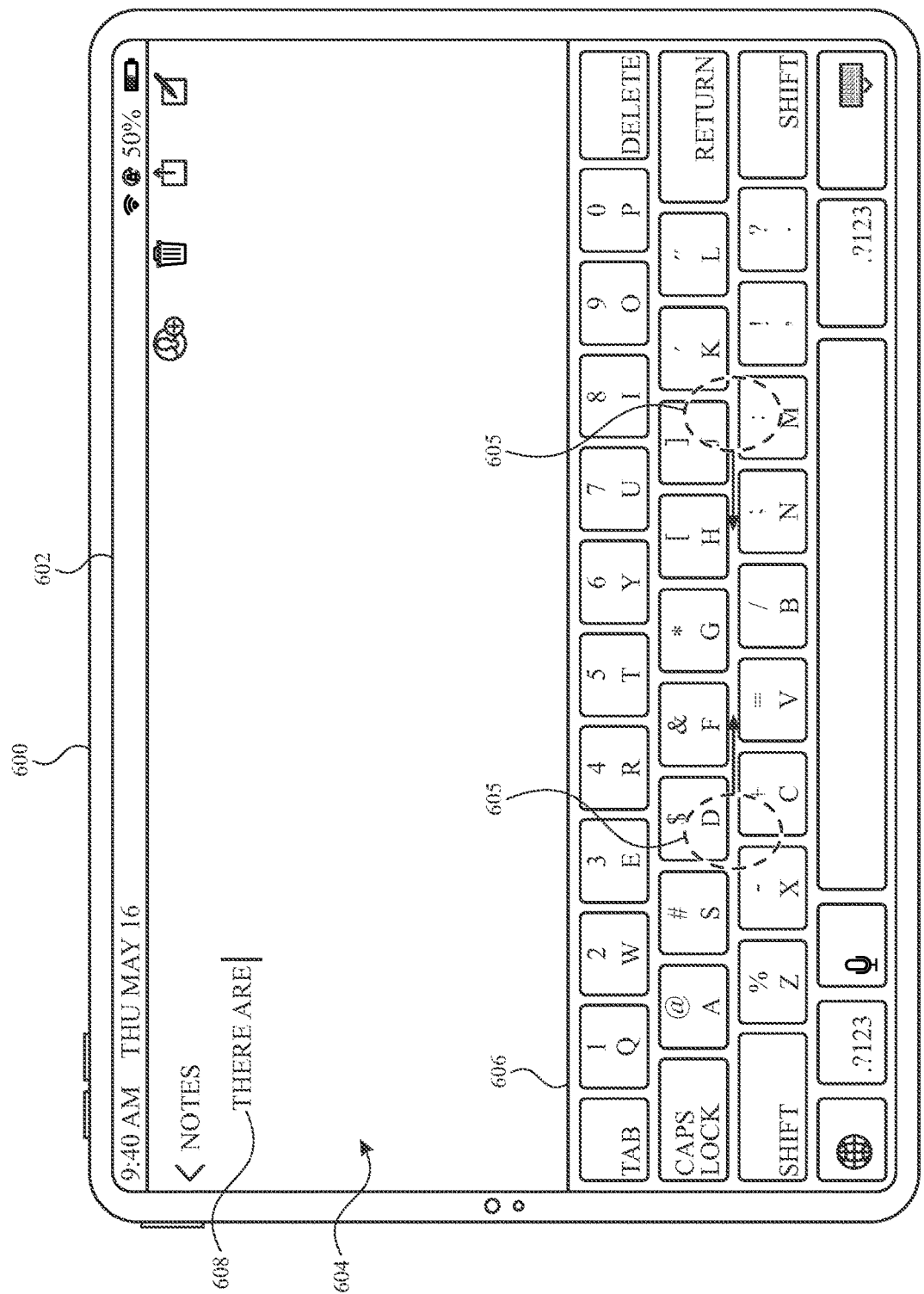

FIG. 6E illustrates contacts 605 on display device 602 at locations corresponding to keyboard 606 (e.g., two concurrent finger contacts on keyboard 606). The contacts 605 move toward from each other to perform a pinch gesture on keyboard 606. In some embodiments, electronic device 600 detects the pinch gesture when movement of the contacts 605 is more than a threshold distance toward each other. The contacts 605 do not cause activation of any keys of keyboard 606, and no characters are added into input area 608.

Figure 6F:
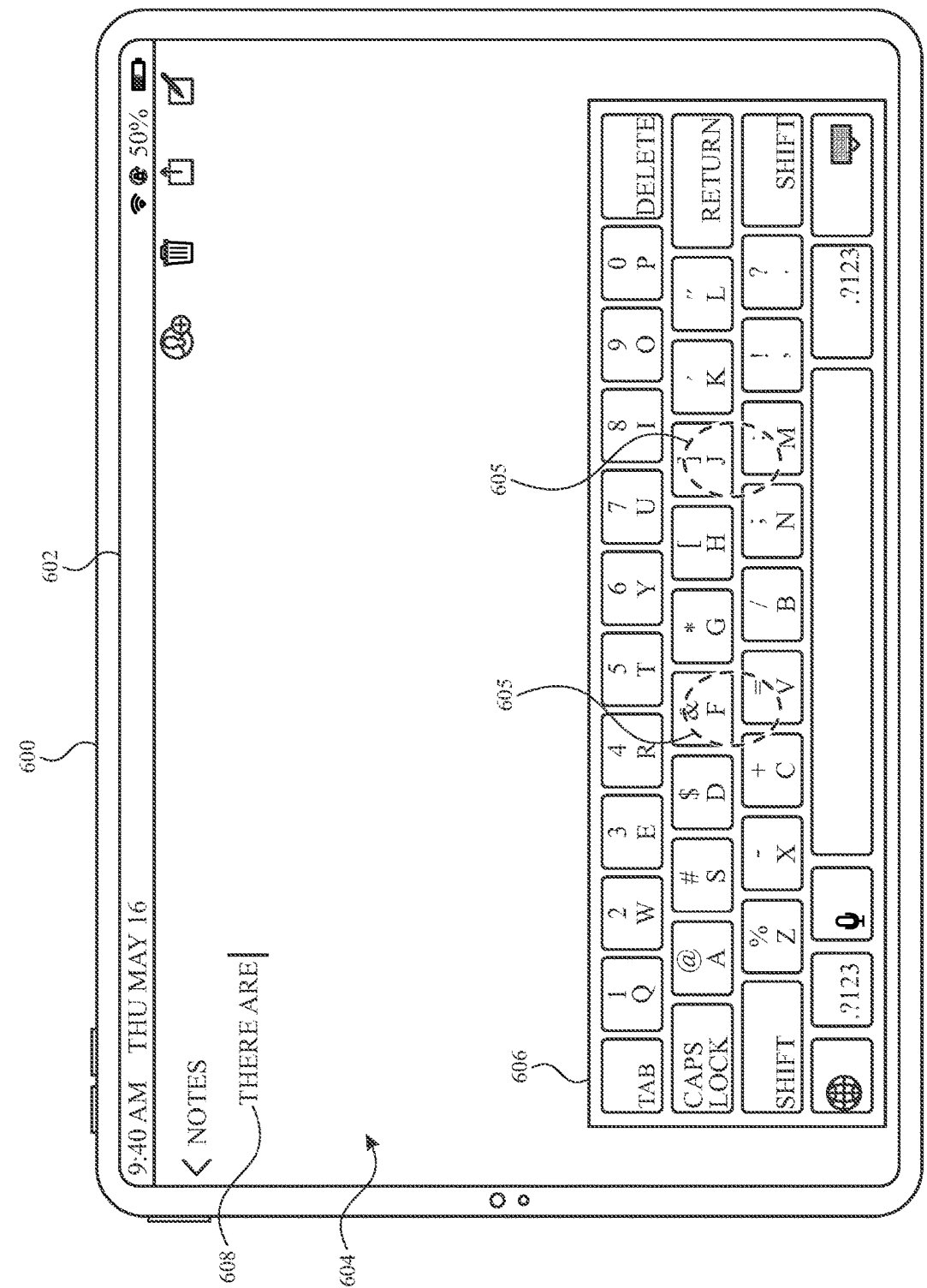

As shown in FIG. 6F, when the electronic device 600 detects the pinch gesture performed by contacts 605, keyboard 606 is reduced in both height and width (e.g., displayed in a smaller size than keyboard 606 shown in FIG. 6A). In some embodiments, the amount keyboard 606 is reduced in size is based on the distance that contacts 605 move toward each other. In some embodiments, as the contacts 605 move toward each other, the keyboard 606 is displayed changing size with the movement of the contacts 605 (e.g., animated during the transition to another size). In some embodiments, individual keys of the keyboard 606 change size as the keyboard changes size, while the aspect ratios of the individual keys are maintained. While the contacts 605 continue to be detected on display device 602 (e.g., no lift-off of the fingers is detected), keyboard 606 continues to be displayed at the reduced size.

If the contacts 605 do not move more than a threshold distance toward each other (e.g., keyboard 606 is not reduced to a threshold size), then when the contacts 605 are released (e.g., a lift-off of the fingers is detected), keyboard 606 returns to the previous size before the pinch gesture was detected (e.g., the size of keyboard 606 shown in FIG. 6D). If the contacts 605 move more than the threshold distance toward each other (e.g., keyboard 606 is reduced to at least a threshold size), then when the contacts 605 are released (e.g., a lift-off of the fingers is detected), keyboard 606 continues to be displayed at the reduced size (or at a smaller, predetermined size) after the contacts are released (e.g., as shown in FIG. 6I).

Figure 6G:
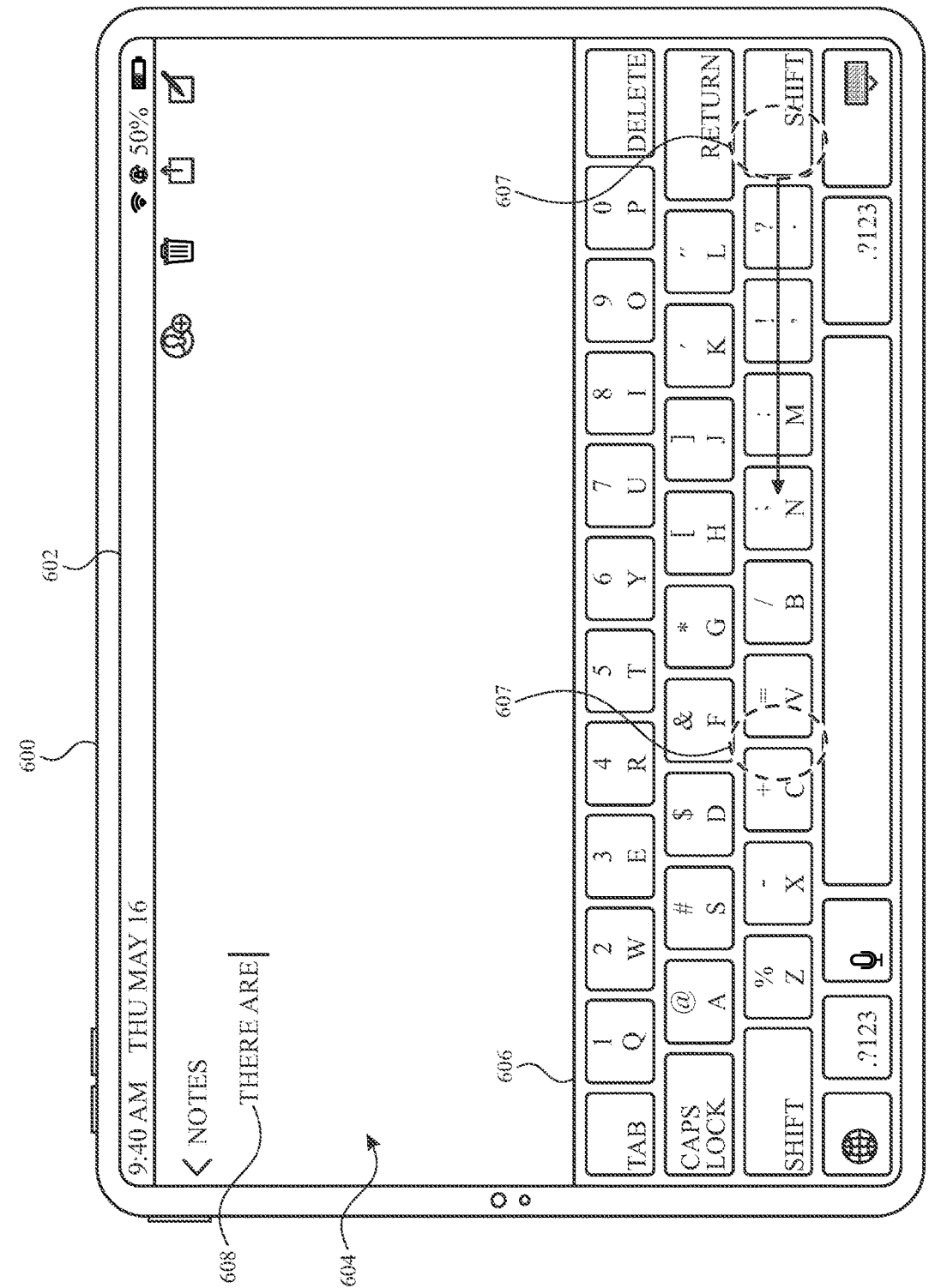

When the contacts 605 shown in FIG. 6F are released (e.g., a lift-off of the fingers is detected), keyboard 610 returns to being displayed at the full size, as shown in FIG. 6G, because the magnitude of pinch gesture 605 was less than the threshold. Displaying the keyboard at full size when the user releases the inputs indicates to the user that the keyboard can be reduced in size, but that a bigger pinch gesture (with larger magnitude) is required.

As shown in FIG. 6G, another pinch gesture is detected, where one of the two contacts 607 moves toward the other contact to perform the pinch gesture on keyboard 606. The contacts 607 do not cause activation of any keys of keyboard 606, and no characters are added into input area 608. As one of the contacts 607 moves toward the other, keyboard 606 reduces in size, as shown in FIG. 6H.

Figure 6H:
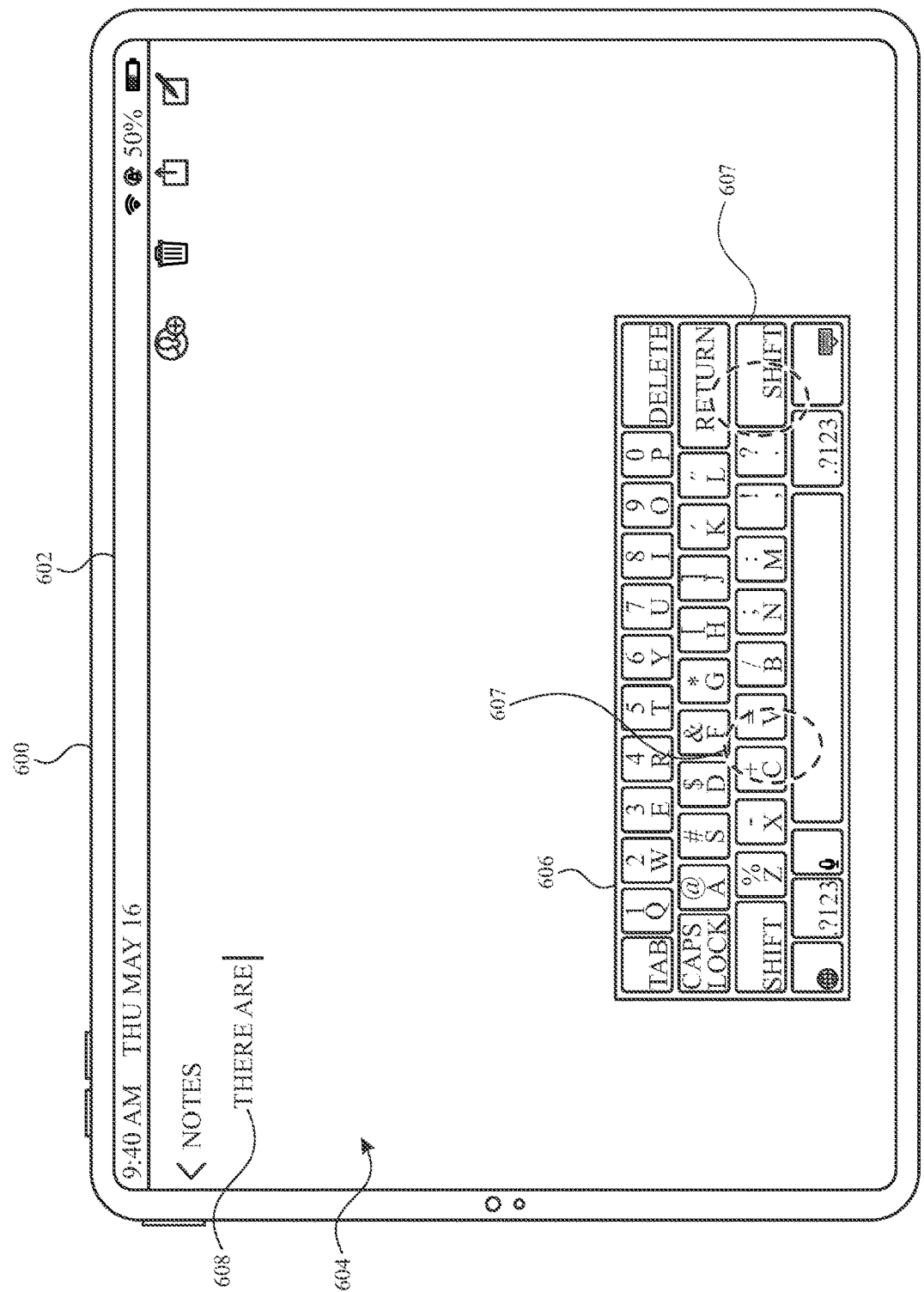
Figure 6I:
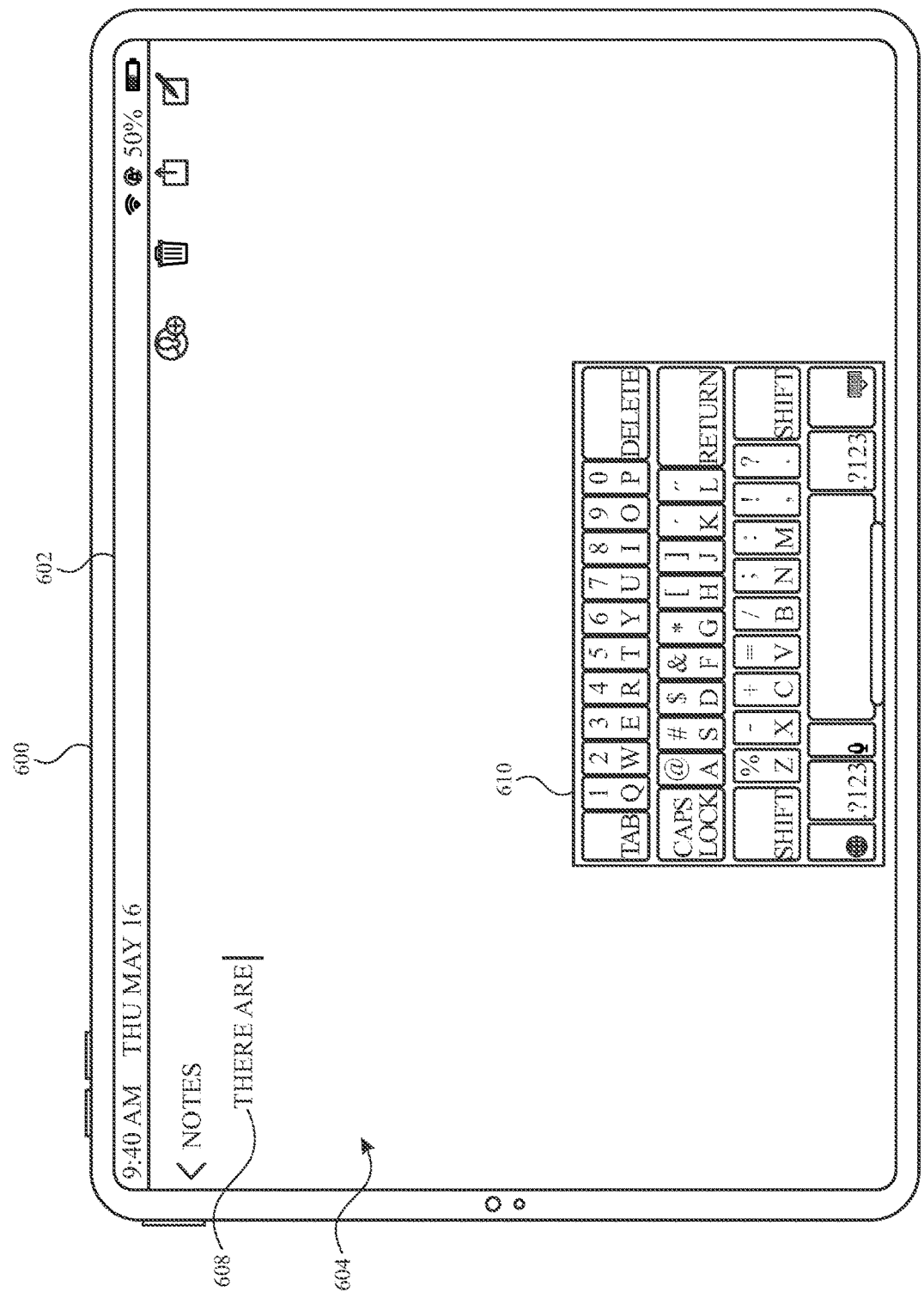

As shown in FIG. 6I, when the contacts 607 shown in FIG. 6H are released (e.g., a lift-off of the fingers is detected), a reduced size keyboard 610 is displayed because distance the one contact 607 moves toward the other contact 607 in FIGS. 6G and 6H is more than the threshold distance. The size of the reduced size keyboard 610 in FIG. 6I is a predetermined small keyboard size that is smaller than the keyboard 606 shown in FIG. 6H. After the contacts 607 move toward each other more than the threshold distance, when the contacts 607 are released, the keyboard 606 is automatically resized to the predetermined small keyboard size of the reduced size keyboard 610.

Figure 6J:
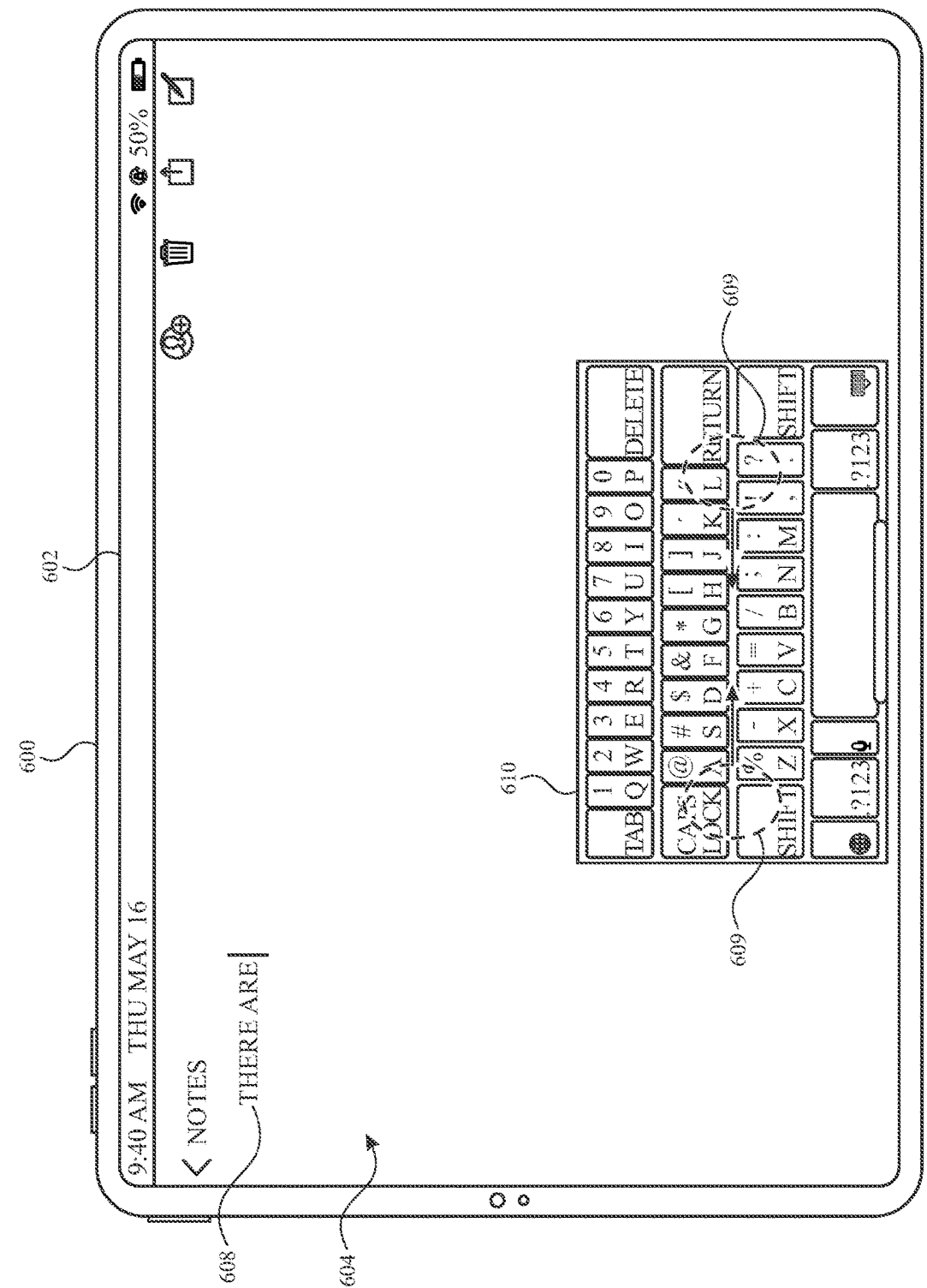

FIG. 6J illustrates contacts 609 on display device 602 at locations corresponding to the reduced size keyboard 610 (e.g., two concurrent finger contacts on the reduced size keyboard 610). The contacts 609 move toward from each other to perform a pinch gesture on the reduced size keyboard 610. In some embodiments, electronic device 600 detects the pinch gesture when movement of the contacts 609 is more than a threshold distance toward each other. The contacts 609 do not cause activation of any keys of the reduced size keyboard 610, and no characters are added into input area 608.

Figure 6K:
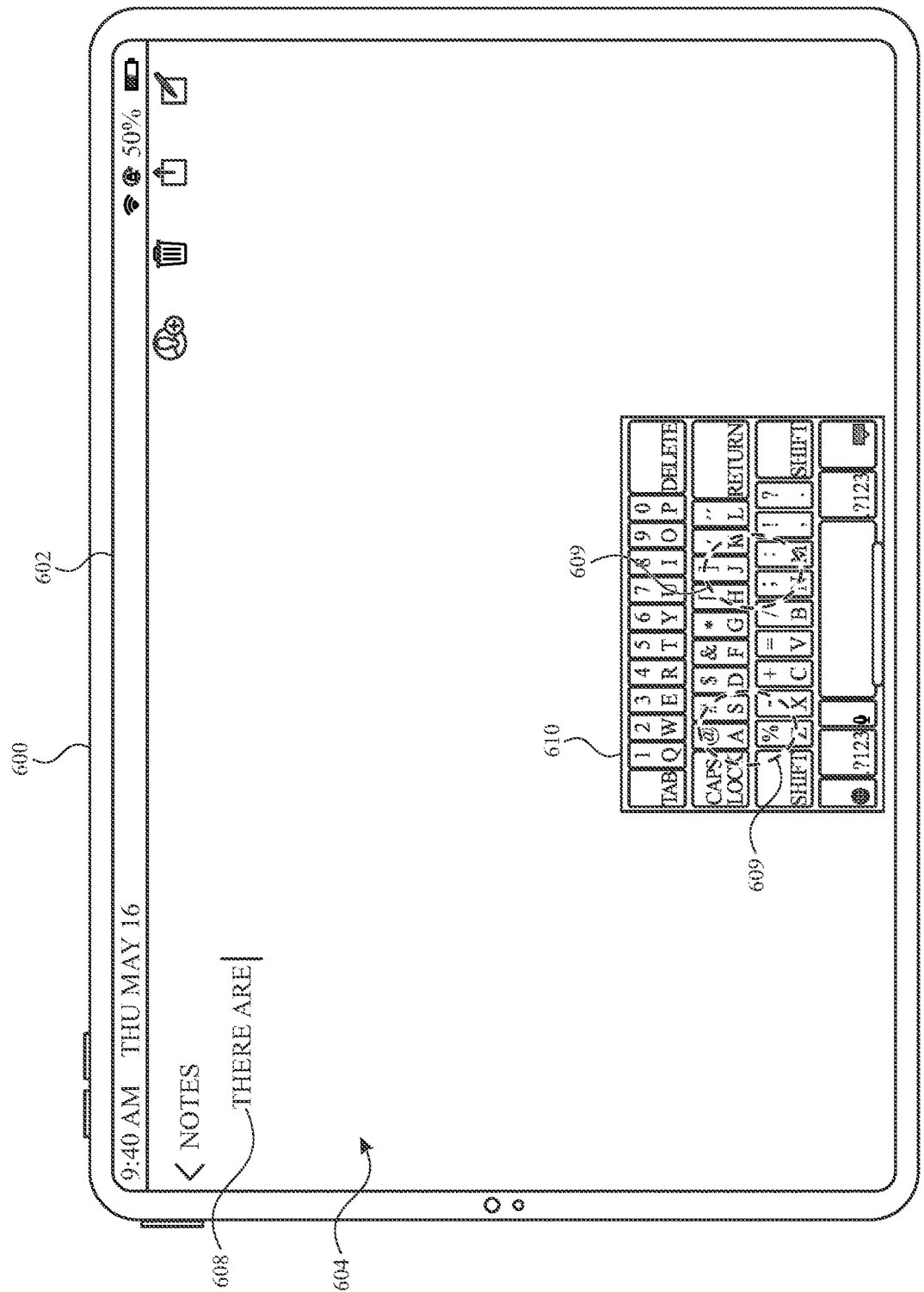

As shown in FIG. 6K, when the electronic device 600 detects the pinch gesture performed by contacts 609, the reduced size keyboard 610 is further reduced in both height and width (e.g., displayed in a smaller size than keyboard 610 shown in FIG. 6J). In some embodiments, the amount the reduced size keyboard 610 is further reduced in size is based on the distance that contacts 609 move toward each other. In some embodiments, as the contacts 609 move toward each other, the reduced size keyboard 610 is displayed changing size with the movement of the contacts 609 (e.g., animated during the transition to another size). In some embodiments, individual keys of the reduced size keyboard 610 change size as the keyboard changes size, while the aspect ratios of the individual keys are maintained.

While the contacts 609 continue to be detected on display device 602 (e.g., no lift-off of the fingers is detected), the reduced size keyboard 610 continues to be displayed at the further reduced size, as shown in FIG. 6K. Because the keyboard was previously at the predetermined small keyboard size, when the contacts 609 are released (e.g., a lift-off of the fingers is detected), reduced size keyboard 610 returns to the predetermined small keyboard size from before the pinch gesture was detected (e.g., the size of reduced size keyboard 610 shown in FIG. 6J).

Figure 6L:
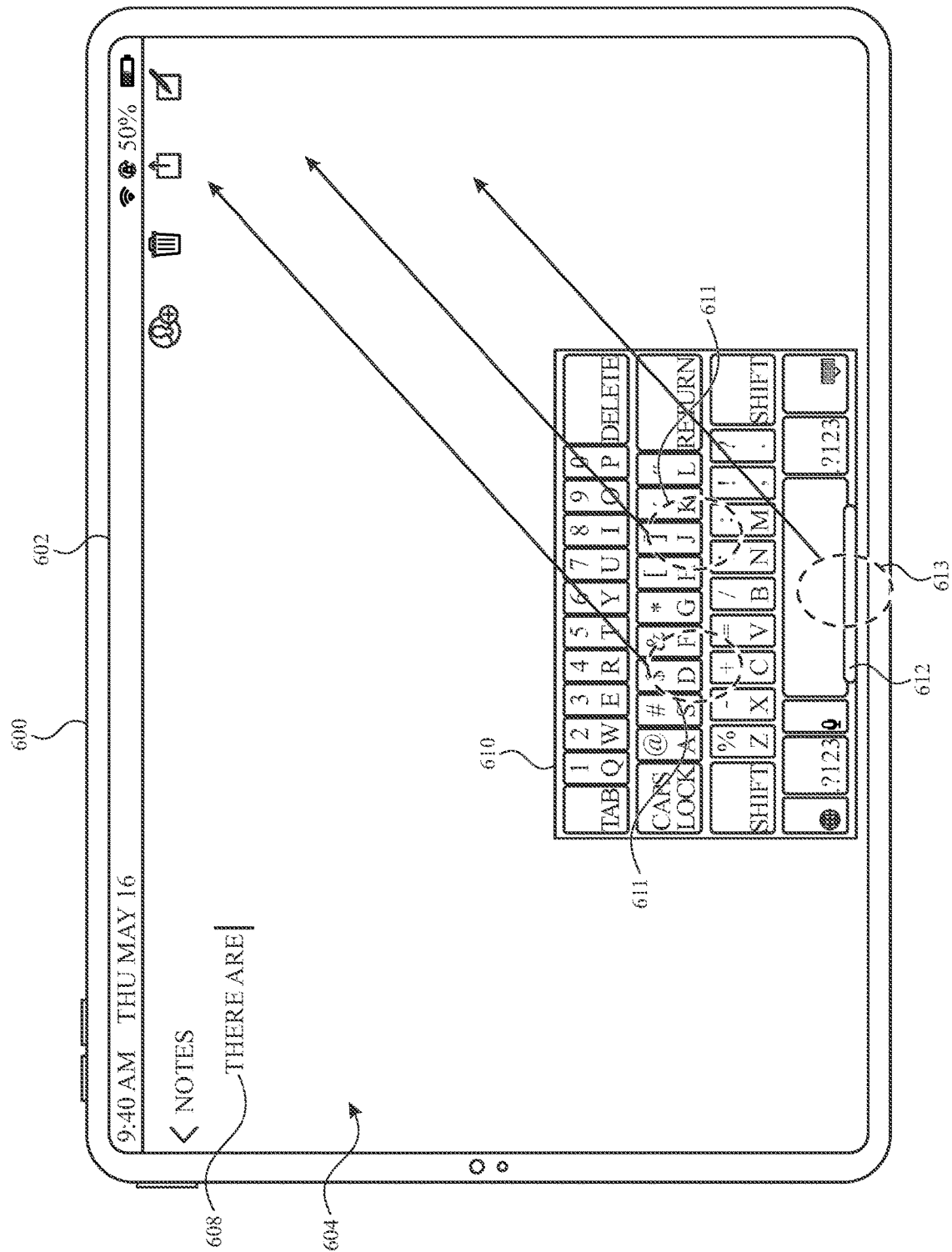
Figure 6M:
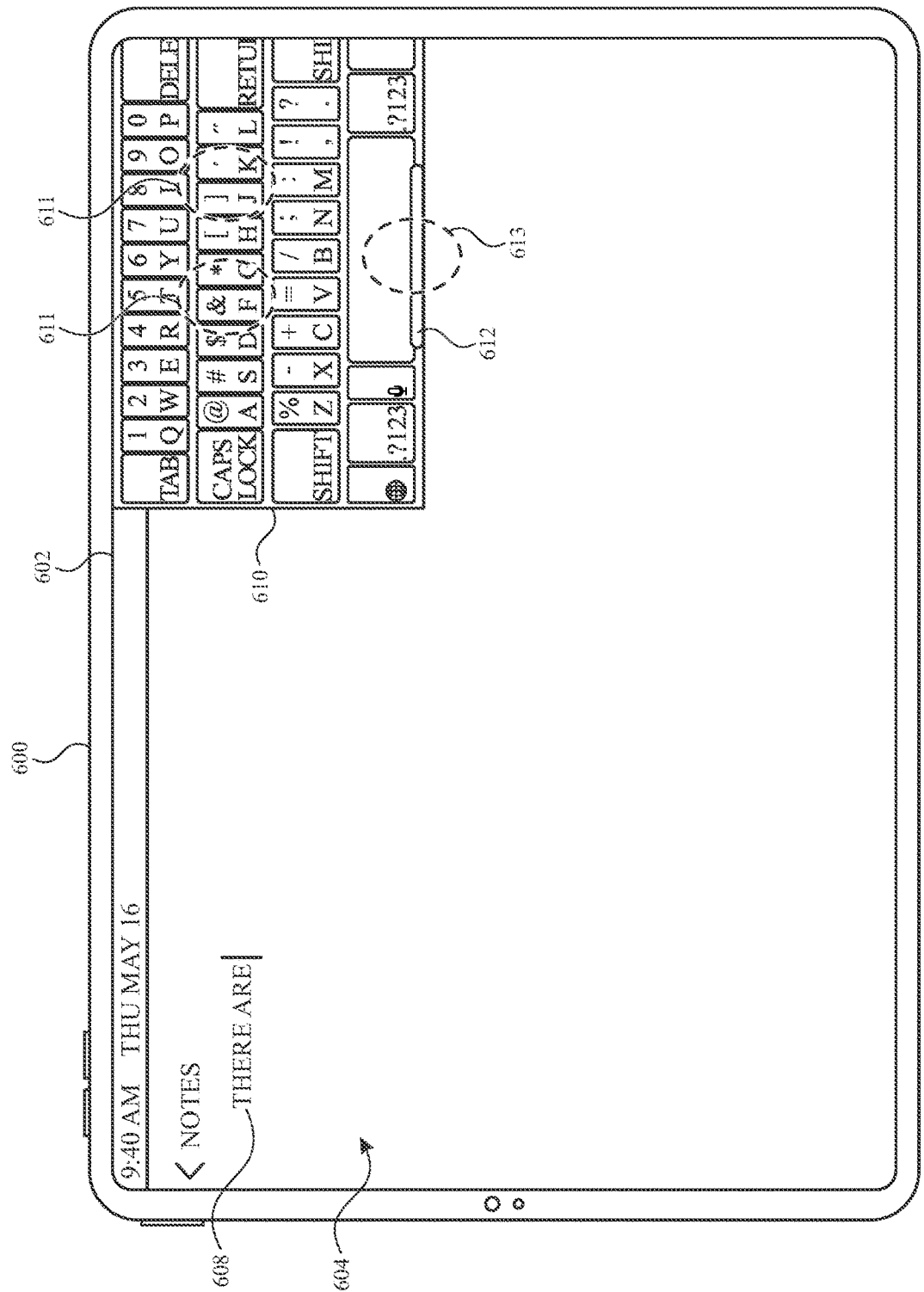

FIG. 6L illustrates repositioning inputs on the reduced size keyboard 610. In some embodiments, when contacts 611 are detected on display device 602 at locations corresponding to the reduced size keyboard 610 (e.g., two concurrent finger contacts on the reduced size keyboard 610) and the contacts 611 move in approximately the same direction (e.g., a two-finger swipe gesture), the reduced size keyboard 610 is moved in the same direction as the contacts 611, as shown in FIG. 6M. The contacts 611 do not cause activation of any keys of the reduced size keyboard 610, and no characters are added into input area 608. Alternatively or in addition, in some embodiments, the reduced size keyboard 610 is displayed with a grabber object 612. When a contact 613 is detected on display device 602 at a location corresponding to the grabber object 612, the reduced size keyboard 610 moves with the movement of the contact 613, as shown in FIG. 6M.

As shown in FIG. 6M, the reduced size keyboard 610 is repositioned to an upper right corner of display device 602 in response to movement of contacts 611 or movement of contact 613. While the contacts 611 or contact 613 continue to be detected on the reduced size keyboard 610, the reduced size keyboard is displayed at the repositioned location corresponding to the contacts 611 or contact 613. When the contacts 611 or contact 613 are released (e.g., a lift-off of the finger(s) is detected), the reduced size keyboard 610 is automatically shifted to an allowed location (e.g., a location that does not interfere with other UI elements, such as the upper margin area of the user interface 604). In some embodiments, when the reduced size keyboard 610 is repositioned to an allowed location, the device does not automatically shift the reduced size keyboard 610 when the contacts 611 or contact 613 are released.

Figure 6N:
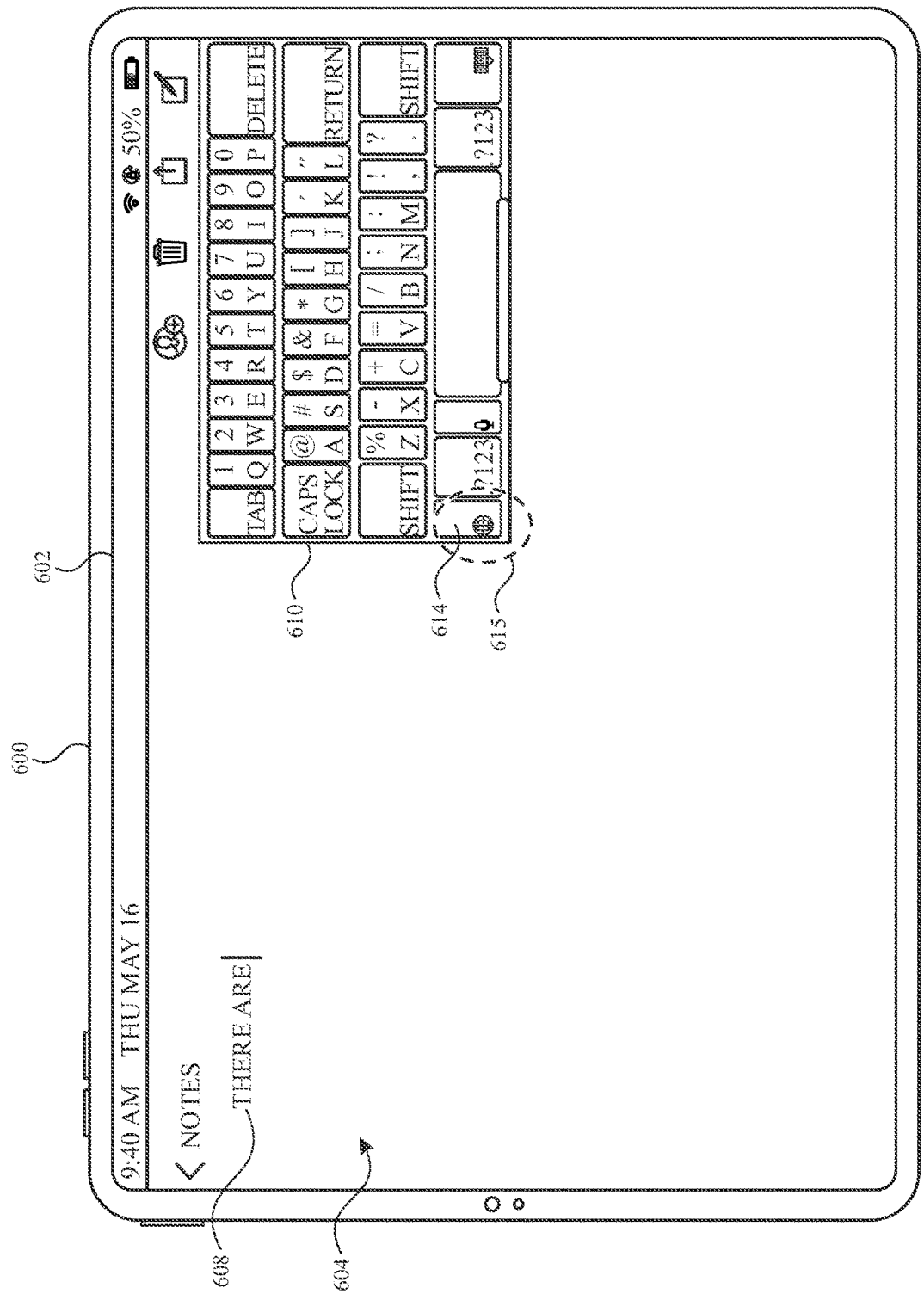

As shown in FIG. 6N, after the contacts 611 or contact 613 are released (e.g., a lift-off of the finger(s) is detected), the reduced size keyboard 610 is automatically shifted downward to avoid interference with the upper margin area of user interface 604. Furthermore, the reduced size keyboard 610 is automatically shifted to the left so that all keys of the reduced size keyboard 610 are displayed and the keyboard abuts an edge (e.g., the right edge) of the display device 602. When an input 615 corresponding to a select keyboard key is detected (e.g., a tap on the select keyboard key 614), the reduced size keyboard 610 changes to a different keyboard layout or a different language.

Figure 6O:
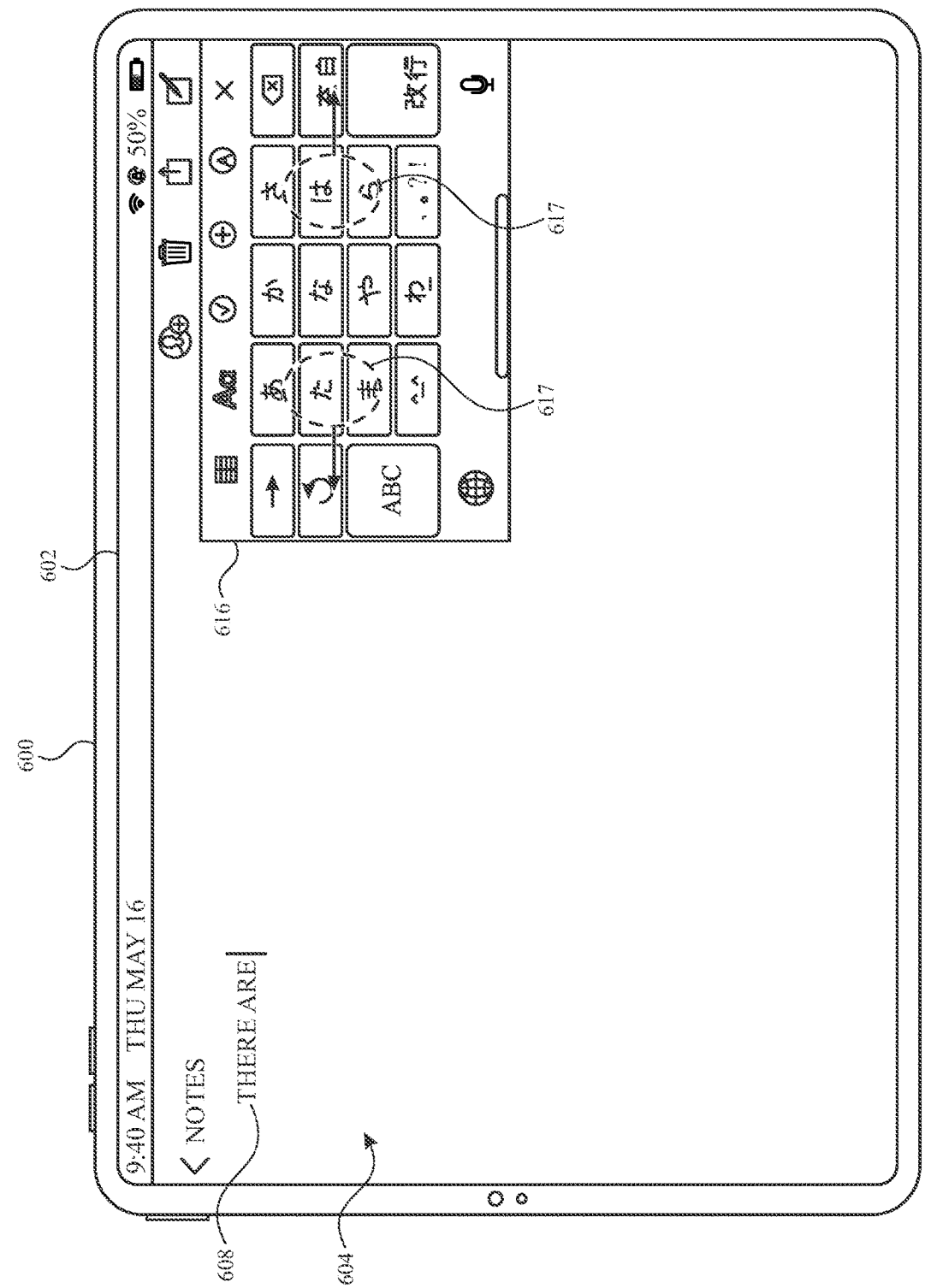

FIG. 6O illustrates a reduced size Chinese keyboard 616 being displayed at the location of reduced size keyboard 610 shown in FIG. 6N. The reduced size Chinese keyboard 616 replaces the reduced size keyboard 610 in response to detecting input 615 on the select keyboard key 614 shown in FIG. 6N. FIG. 6O further illustrates contacts 617 on display device 602 at locations corresponding to the reduced size Chinese keyboard 616 (e.g., two concurrent finger contacts on reduced size Chinese keyboard 616). The contacts 617 move away from each other to perform a depinch gesture on the reduced size Chinese keyboard 616. In some embodiments, electronic device 600 detects the depinch gesture when movement of the contacts 617 is more than a threshold distance away from each other. The contacts 617 do not cause activation of any keys of the reduced size Chinese keyboard 616, and no characters are added into input area 608.

Figure 6P:
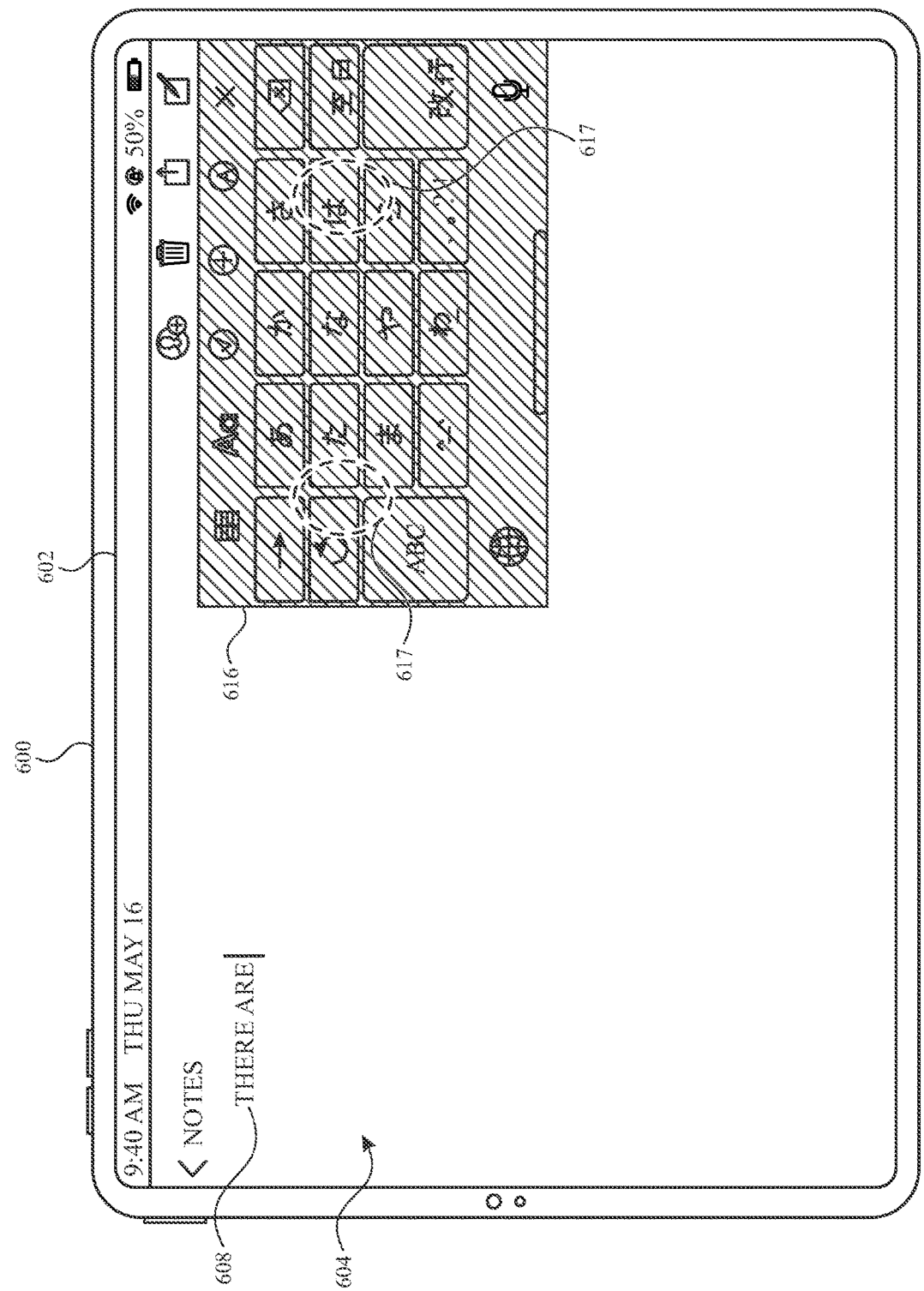

As shown in FIG. 6P, when the electronic device 600 detects the depinch gesture performed by contacts 617, the reduced size Chinese keyboard 616 is enlarged in both height and width (e.g., displayed in a bigger size than the keyboard shown in FIG. 6O). In some embodiments, the amount the Chinese keyboard 616 is enlarged in size is based on the distance that contacts 617 move away from each other. In some embodiments, as the contacts 617 move away from each other, the keys of reduced size Chinese keyboard 616 are blurred while changing size with the movement of the contacts 617 (e.g., the Chinese keyboard 616 is animated during the transition to another size, but specific features of the keyboard are obscured).

While the contacts 617 continue to be detected on display device 602 (e.g., no lift-off of the fingers is detected), the Chinese keyboard 616 continues to be displayed at the enlarged size and with blurred keys. As shown in FIG. 6P, the contacts 617 do not move more than a threshold distance away from each other (e.g., the Chinese keyboard 616 is not enlarged to a threshold size). As a result, when the contacts 617 are released (e.g., a lift-off of the fingers is detected), the Chinese keyboard 616 returns to the previous size before the depinch gesture was detected, as shown in FIG. 6Q.

Figure 6Q:
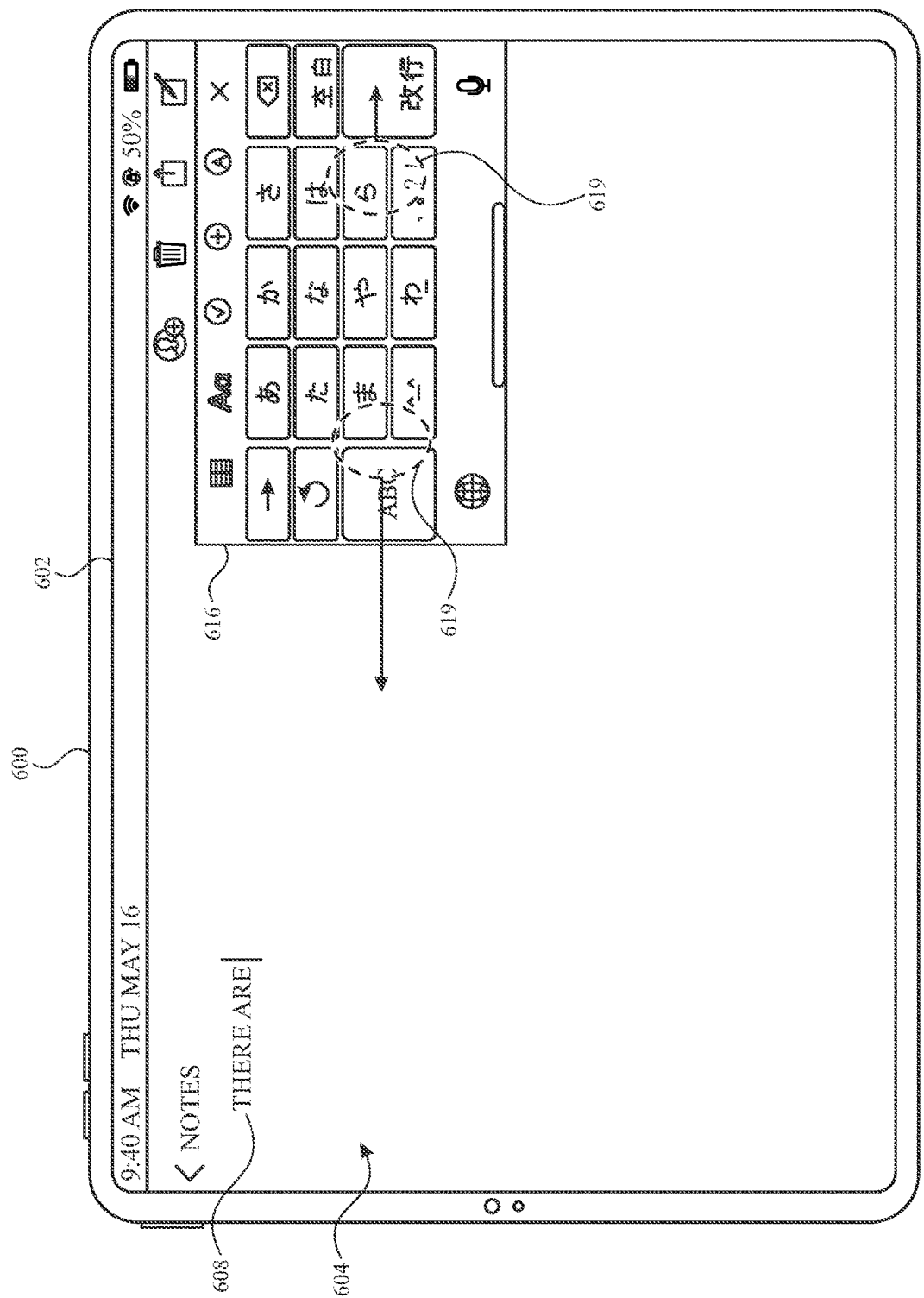

FIG. 6Q illustrates the reduced size Chinese keyboard 616 following the release of contacts 617 shown in FIG. 6P. The reduced size Chinese keyboard 616 in FIG. 6Q is displayed at its original reduced size (the size before the depinch gesture shown in FIGS. 6O and 6P was detected). FIG. 6Q further illustrates contacts 619 moving away from each other to perform another depinch gesture.

Figure 6R:
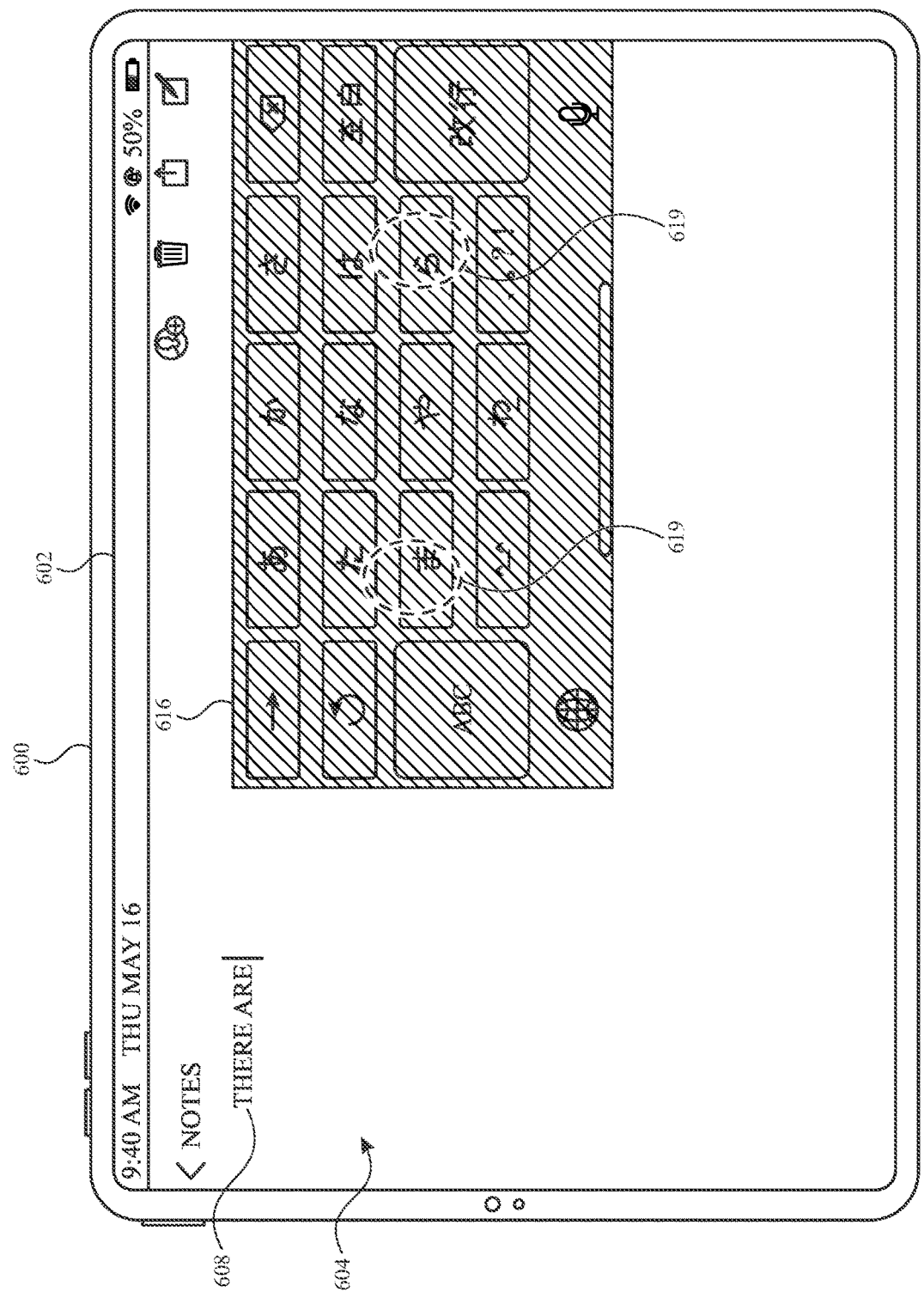

As shown in FIG. 6R, the contacts 619 performing the depinch gesture move more than the threshold distance away from each other (e.g., the reduced size Chinese keyboard 616 is enlarged to at least a threshold size). In response to the movement of the contacts 619 shown in FIGS. 6Q and 6R, the Chinese keyboard 616 is enlarged in both height and width (e.g., displayed in a bigger size than the keyboard shown in FIG. 6Q). In some embodiments, the amount the Chinese keyboard 616 is enlarged in size is based on the distance that contacts 619 move away from each other. The contacts 619 do not cause activation of any keys of the Chinese keyboard 616, and no characters are added into input area 608. In some embodiments, as the contacts 619 move away from each other, the keys of Chinese keyboard 616 are blurred while changing size with the movement of the contacts 619 (e.g., the Chinese keyboard 616 is animated during the transition to another size, but specific features of the keyboard are obscured). At FIG. 6R, while the contacts 619 continue to be detected on the display device 602, the Chinese keyboard 616 is displayed at an enlarged size corresponding to the amount of movement of the contacts 619. Since the contacts 619 moved more than the threshold distance, when the contacts 619 are released (e.g., a lift-off of the fingers is detected), the Chinese keyboard 616 is automatically enlarged further to a predetermined large keyboard size (e.g., as shown in FIG. 6S) and, optionally, to a predetermined location on the display (e.g., as shown in FIG. 6S).

Figure 6S:
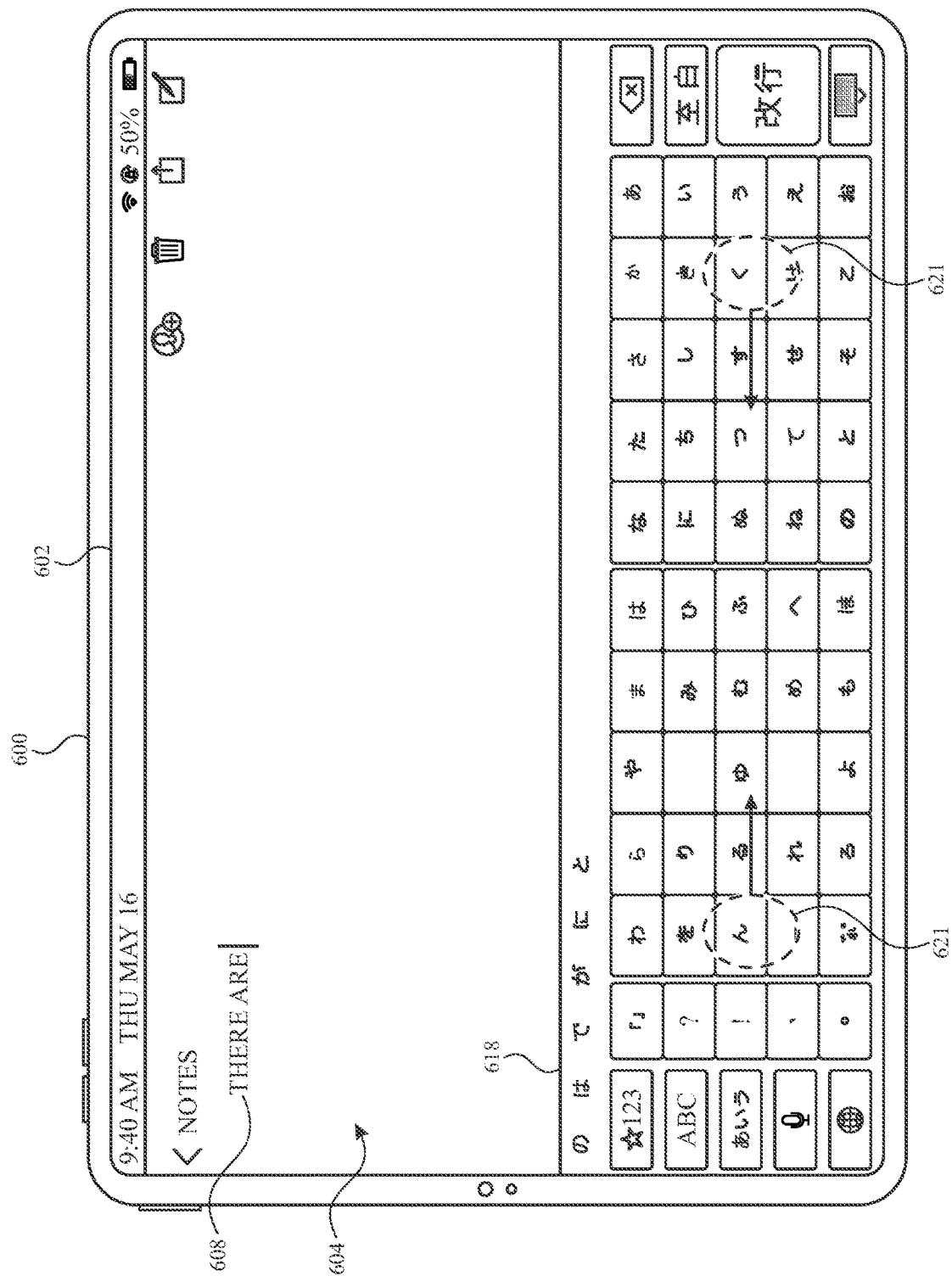

FIG. 6S illustrates electronic device 600 displaying a large size Chinese keyboard 618. The large size Chinese keyboard 618 extends the full width of the display device 602 and abuts the bottom edge of the display device 602 (in the landscape orientation). When the contacts 619 shown in FIG. 6R are released (e.g., a lift-off of the fingers is detected), the reduced size Chinese keyboard 616 is automatically resized to the size of the large size Chinese keyboard 618, and the large size Chinese keyboard 618 is displayed in a predetermined location (e.g., abutting a bottom edge of the display device 602).

FIG. 6S further illustrates contacts 621 on display device 602 at locations corresponding to the large size Chinese keyboard 618 (e.g., two concurrent finger contacts on the large size Chinese keyboard 618). The contacts 621 move toward each other to perform a pinch gesture on the large size Chinese keyboard 618. In some embodiments, electronic device 600 detects the pinch gesture when movement of the contacts 621 is more than a threshold distance toward each other. The contacts 621 do not cause activation of any keys of the large size Chinese keyboard 618, and no characters are added into input area 608.

Figure 6T:
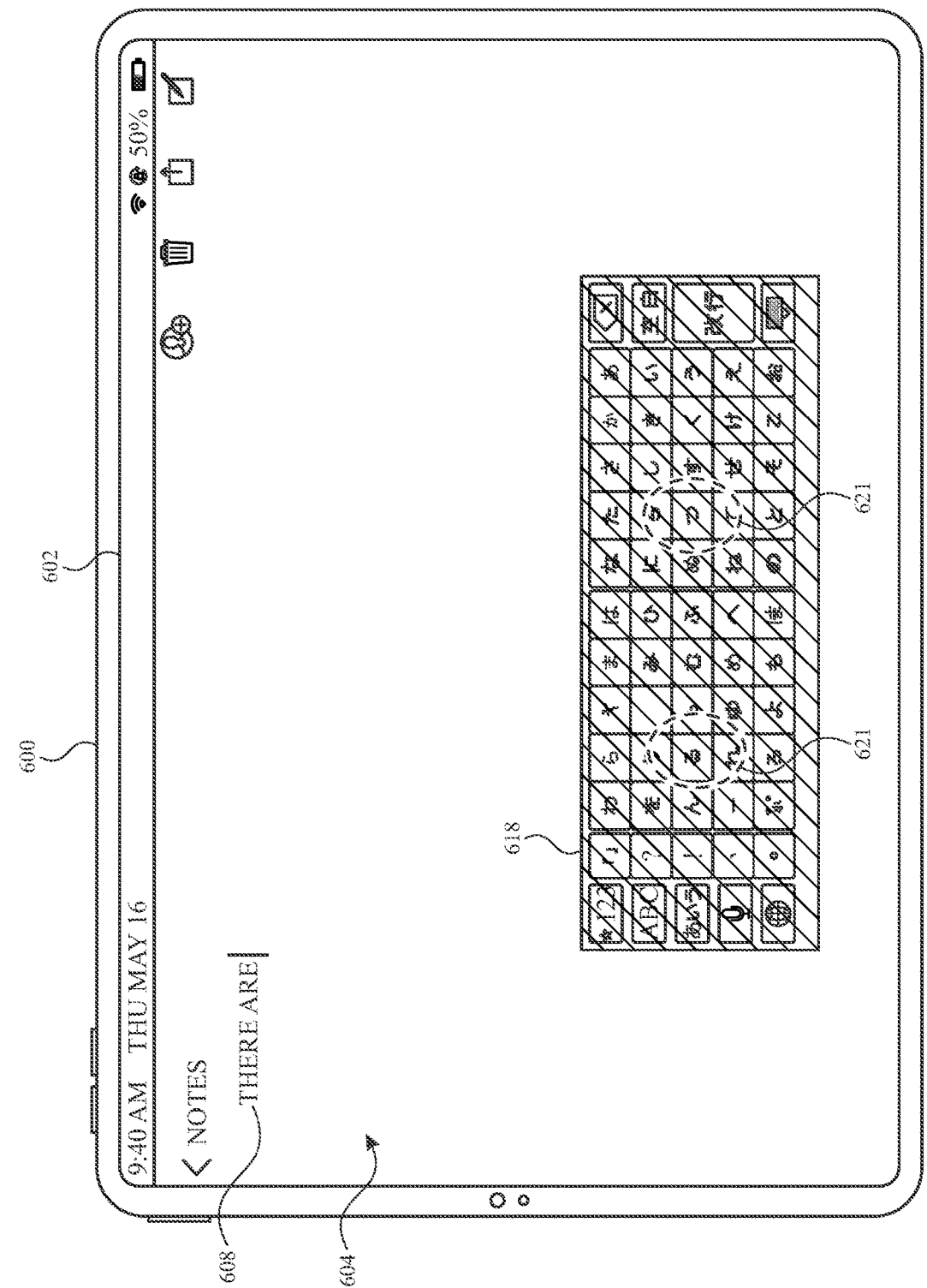

As shown in FIG. 6T, when the electronic device 600 detects the pinch gesture performed by contacts 621, the Chinese keyboard 618 is reduced in both height and width (e.g., displayed in a smaller size than the keyboard shown in FIG. 6S). In some embodiments, the amount the Chinese keyboard 618 is reduced in size is based on the distance that contacts 621 move toward each other. In some embodiments, as the contacts 21 move toward each other, the keys of Chinese keyboard 618 are blurred while changing size with the movement of the contacts 621 (e.g., the Chinese keyboard 618 is animated during the transition to another size, but specific features of the keyboard are obscured). While the contacts 621 continue to be detected on display device 602 (e.g., no lift-off of the fingers is detected), Chinese keyboard 618 continues to be displayed at the reduced size and with blurred keys.

If the contacts 621 do not move more than a threshold distance toward each other (e.g., Chinese keyboard 618 is not reduced to a threshold size), then when the contacts 621 are released (e.g., a lift-off of the fingers is detected), Chinese keyboard 618 returns to the previous size before the pinch gesture was detected (e.g., the size of the keyboard shown in FIG. 6S). If the contacts 621 move more than the threshold distance toward each other (e.g., Chinese keyboard 618 is reduced to at least a threshold size), then when the contacts 621 are released (e.g., a lift-off of the fingers is detected), the large size Chinese keyboard 618 is replaced with the small size Chinese keyboard 616 (e.g., as shown in FIG. 6U).

Figure 6U:
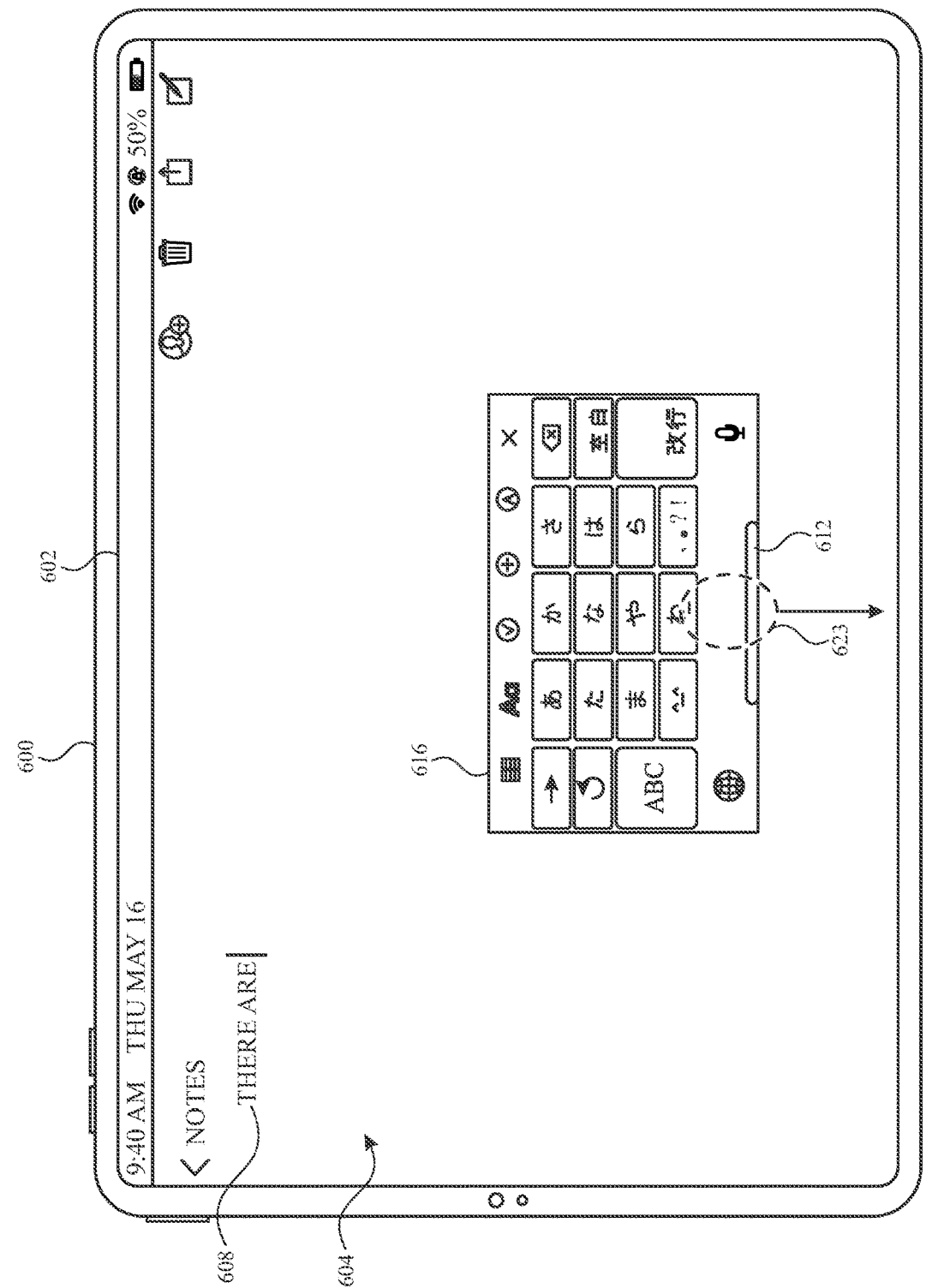

As shown in FIG. 6U, when the contacts 621 shown in FIG. 6T are released (e.g., a lift-off of the fingers is detected), the reduced size Chinese keyboard 616 is displayed. The size of the reduced size Chinese keyboard 616 is a predetermined small keyboard size that is smaller than the Chinese keyboard 618 shown in FIG. 6T. After the contacts 621 move toward each other more than the threshold distance, when the contacts 621 are released, the Chinese keyboard 618 is automatically resized to the predetermined small keyboard size of the reduced size Chinese keyboard 616.

In some embodiments, the reduced size Chinese keyboard 616 is displayed with a grabber object 612 (e.g., which is not displayed on any full size keyboards). When a contact 623 is detected on display device 602 at a location corresponding to the grabber object 612, the reduced size Chinese keyboard 616 moves with the movement of the contact 623, as further shown in FIG. 6V.

Figure 6V:
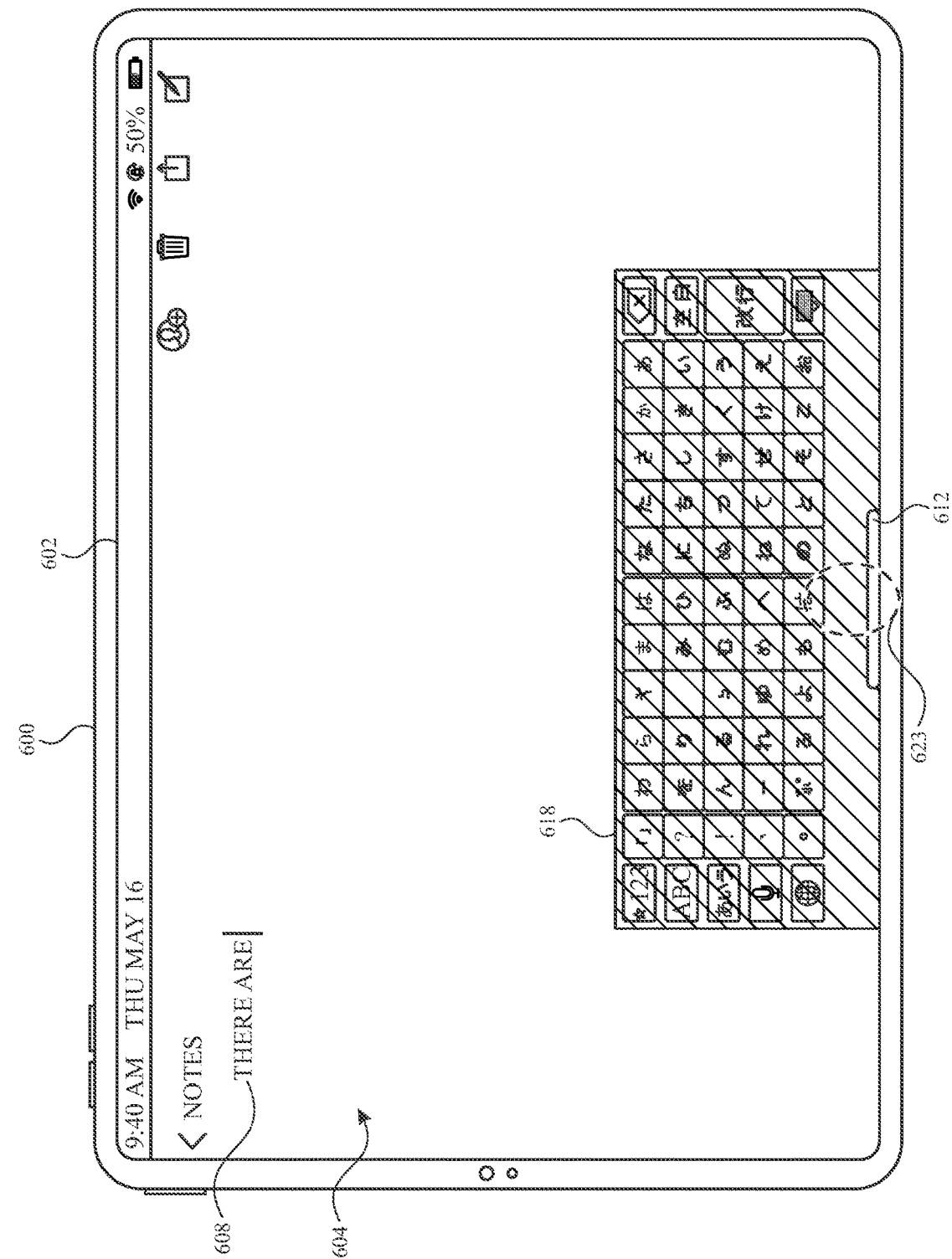

FIG. 6V illustrates the reduced size Chinese keyboard 616 being repositioned along a bottom edge display device 602 in response to movement of contact 623 on the grabber object 612. When the grabber object 612 approaches or abuts the bottom edge of the display device 602, the reduced size Chinese keyboard 616 automatically transitions to an intermediate size Chinese keyboard 618, as further shown in FIG. 6W. During the transition from the reduced size Chinese keyboard 616 to the intermediate size Chinese keyboard 618, the keys of the Chinese keyboard are blurred.

FIG. 6W illustrates the large size Chinese keyboard 618 after the contact 623 shown in FIG. 6V is released (e.g., a lift-off of the finger is detected). The reduced size Chinese keyboard 616 (as shown in FIG. 6U) automatically transitions to the large size Chinese keyboard 618 when the grabber object 612 approaches or abuts the bottom edge of the display device 602 (e.g., is held in that position for a predetermined period of time) and then lift-off of the contacts is detected, and the grabber object 612 ceases to be displayed.

FIG. 7 is a flow diagram illustrating a method for managing keyboards using an electronic device in accordance with some embodiments. Method 700 is performed at a device (e.g., 100, 300, 500, 600, 800) with a display device and a touch-sensitive surface (e.g., the display device and the touch-sensitive surface forming a touch-sensitive display). Some operations in method 700 are, optionally, combined, the orders of some operations are, optionally, changed, and some operations are, optionally, omitted.

As described below, method 700 provides an intuitive way for managing keyboards. The method reduces the cognitive burden on a user for managing keyboards, thereby creating a more efficient human-machine interface. For battery-operated computing devices, enabling a user to manage keyboards faster and more efficiently conserves power and increases the time between battery charges.

In some embodiments, the electronic device displays (702), on the display device, a keyboard at a first size (e.g., 606 at FIG. 6E, a full size), the keyboard (e.g., a QWERTY keyboard) including a first set of keys, wherein activation of a respective key of the first set of keys causes a corresponding respective character to be added into an input area (e.g., a text entry field, a search field, a document). In some embodiments, the first size is a size in which the first keyboard extends the full width (or substantially the full width) of the display device. In some embodiments, displaying the first keyboard at the first size includes displaying the first keyboard at first edge (e.g., the bottom edge) of the display device.

In some embodiments, while displaying the keyboard at the first size, the electronic device detects (704), using the touch-sensitive surface, a first gesture (e.g., 605, 607, a pinch gesture) that includes a set of two or more contacts (e.g., a pinch gesture).

In some embodiments, in response (706) to detecting at least a portion of the first gesture, in accordance with a determination that a first set of resizing criteria is satisfied, wherein the first set of resizing criteria includes a first resizing criterion that is satisfied when the first gesture includes movement of the set of two or more contacts (e.g., amount of movement of concurrent contacts detected on the touch-sensitive surface, a distance, an amount of pinching, a gesture detected with two contacts, wherein a magnitude of the movement is the distance reduced between the two contacts over time during the gesture; for example, device detects the two contacts moving toward one another (magnitude is, for example, amount of distance reduced between the two contacts); for another example, the device detects one contact moving toward the other contact (magnitude is, for example, amount of distance moved)), the electronic device resizes (708), on the display device, display of the keyboard to a second size that is smaller (e.g., 606 at FIG. 6F, in both height and width) than the first size, the second size determined based on a magnitude of the movement of the set of two or more contacts. In some embodiments, the resizing of the keyboard tracks the input point(s) of the gesture. In some embodiments, the resizing of the keyboard tracks the two input points of the pinch gesture. In some embodiments, the first set of resizing criteria is not satisfied when the first gesture does not include movement (or, optionally, includes movement below a minimum threshold).

In some embodiments, the first set of resizing criteria includes a second resizing criterion that is satisfied when the first gesture includes a first contact and a second contact and the movement of the set of two or more contacts includes reducing a distance between the first contact and the second contact.

In some embodiments, while displaying the keyboard at the second size, the electronic device detects (710), using the touch-sensitive surface, lift-off of the set of two or more contacts (e.g., device detects the end of the first gesture).

In some embodiments, in response (712) to detecting lift-off of the set of two or more contacts, in accordance with a determination that a first set of liftoff criteria, wherein the set of liftoff criteria includes a first liftoff criterion that is satisfied when the magnitude of the movement of the set of two or more contacts exceeds a first threshold (e.g., non-zero) magnitude (e.g., a threshold distance, pinch gesture includes movement of the two contacts that exceeds a certain distance), is not satisfied, the electronic device resizes, on the display device, display of the keyboard to the first size (e.g., 606 at FIG. 6G, the full size).

In some embodiments, in response (712) to detecting lift-off of the set of two or more contacts, in accordance with a determination that a set of liftoff criteria is satisfied, wherein the set of liftoff criteria includes a first liftoff criterion that is satisfied when the magnitude of the movement of the set of two or more contacts exceeds a first threshold (e.g., non-zero) magnitude (e.g., a threshold distance, pinch gesture includes movement of the two contacts that exceeds a certain distance), the electronic device resizes (714), on the display device, display of the keyboard to a third size (e.g., 610 at FIG. 6I, a predetermined size corresponding to a reduced-size keyboard) different from the first size and the second size (e.g., a reduced-size, smaller than the second size, bigger than the second size). In some embodiments, when the first gesture causes the keyboard to be displayed at a size bigger than the second size (e.g., the reduced size) and the first set of resizing criteria is met, the device enlarges the keyboard (when lift-off is detected) to display the keyboard at the second size. In some embodiments, when the first gesture causes the keyboard to be displayed at a size smaller than the second size (e.g., the reduced size) and the first set of resizing criteria is met, the device enlarges the keyboard (when lift-off is detected) to display the keyboard at the second size.

Resizing a keyboard to a smaller size allows for more display space to be used for other content. Resizing a keyboard to a larger size allows for more (or larger) keys to be displayed. Providing improved keyboard input devices enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, on the display device, the keyboard at the third size (e.g., 610 at FIG. 6J; a predetermined size corresponding to a reduced-size keyboard), the electronic device detects, using the touch-sensitive surface, a second gesture (e.g., a second pinch gesture) that includes movement of a second set of two or more contacts (e.g., 609, a pinch gesture). In some embodiments, the second set of two or more contacts includes a third contact and a fourth contact. In some embodiments, in response to detecting at least a portion of the second gesture, in accordance with a determination the movement of the second set of two or more contacts (e.g., amount of movement of concurrent contacts detected on the touch-sensitive surface, a distance, an amount of pinching, a gesture detected with two contacts, wherein a magnitude of the movement is the distance reduced between the two contacts over time during the gesture; for example, device detects the two contacts moving toward one another (magnitude is, for example, amount of distance reduced between the two contacts); for another example, the device detects one contact moving toward the other contact (magnitude is, for example, amount of distance moved)) includes decreasing a distance between the third contact and the fourth contact (e.g., a pinch gesture), the electronic device resizes, on the display device, display of the keyboard to a fifth size (e.g., 610 at FIG. 6K, a size smaller than the reduced-size keyboard) that is smaller (e.g., in both height and width) than the third size (e.g., a predetermined reduced-size). In some embodiments, the fifth size is determined based on the magnitude of the movement of the second set of two or more contacts. In some embodiments, the resizing of the keyboard tracks the input point(s) of the gesture. In some embodiments, the resizing of the keyboard tracks the two input points of the pinch gesture. In some embodiments, while displaying the keyboard at the fifth size (e.g., a size smaller than the reduced-size keyboard), the electronic device detects, using the touch-sensitive surface, lift-off of the second set of two or more contacts (e.g., device detects the end of the second gesture). In some embodiments, in response to detecting lift-off of the second set of two or more contacts, in accordance with the determination that the movement of the second set of two or more contacts includes decreasing the distance between the third contact and the fourth contact (e.g., a pinch gesture), the electronic device resizes, on the display device, display of the keyboard to the third size (e.g., 610 at FIG. 6L, returned the keyboard to the third size (the predetermined reduced size)).

Thus, in some embodiments, when the device detects a pinch gesture on the keyboard when the keyboard is in the third size (the predetermined reduced size), the device reduces the size of the keyboard and, upon detecting liftoff of the pinch gesture, returns the keyboard to the third size (the predetermined reduced size), thereby providing the user with feedback that the keyboard can be resized, but not made smaller. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, on the display device, the keyboard at the third size (e.g., 616 of FIG. 6Q, a predetermined size corresponding to a reduced-size keyboard), the electronic device detects, using the touch-sensitive surface, a second gesture (e.g., 619, a second pinch gesture) that includes movement of a second set of two or more contacts (e.g., a pinch gesture). In some embodiments, the second set of two or more contacts includes a third contact and a fourth contact. In some embodiments, in response to detecting at least a portion of the second gesture, in accordance with a determination the movement of the second set of two or more contacts (e.g., amount of movement of concurrent contacts detected on the touch-sensitive surface, a distance, an amount of depinching, a gesture detected with two contacts, wherein magnitude is the distance increase between the two contacts over time during the gesture; for example, device detects the two contacts moving away from one another (magnitude is, for example, amount of distance increased between the two contacts); for another example, the device detects one contact moving away from the other contact (magnitude is, for example, amount of distance moved)) includes increasing a distance between the third contact and the fourth contact (e.g., a depinch gesture), the electronic device resizes, on the display device, display of the keyboard to a sixth size (e.g., 616 at FIG. 6R, a size bigger than the reduced-size keyboard) that is bigger (e.g., in both height and width) than the third size (e.g., a predetermined reduced-size). In some embodiments, the sixth size is determined based on the magnitude of the movement of the second set of two or more contacts. In some embodiments, the resizing of the keyboard tracks the input point(s) of the gesture. In some embodiments, the resizing of the keyboard tracks the two input points of the depinch gesture. In some embodiments, the sixth size is bigger than the second size. In some embodiments, the sixth size is bigger than the fourth size.

In some embodiments, while displaying the keyboard at the sixth size (e.g., a size bigger than the reduced-size keyboard), the electronic device detects, using the touch-sensitive surface, lift-off of the second set of two or more contacts (e.g., device detects the end of the second gesture). In some embodiments, in response to detecting lift-off of the second set of two or more contacts, in accordance with a determination that the movement of the second set of two or more contacts includes increasing the distance between the third contact and the fourth contact (e.g., a depinch gesture), and that the magnitude of the movement of the second set of two or more contacts exceeds a second threshold (e.g., non-zero) magnitude (e.g., a threshold distance), the electronic device resizes, on the display device, display of the keyboard to the first size (e.g., 618 at FIG. 6S, display the keyboard at the first size (the predetermined full size)). Thus, in some embodiments, when the device detects a depinch gesture on the keyboard when the keyboard is in the third size (the predetermined reduced size), the device increases the size of the keyboard and, upon detecting liftoff of the pinch gesture, either: (1) updates display of the keyboard to the first size (the predetermined full size) when the magnitude of the depinch exceeds a predetermined threshold or (2) returns display of the keyboard to the third size (the predetermined reduced size) when the magnitude of the depinch does not exceed the predetermined amount.

Resizing a keyboard to a smaller size allows for more display space to be used for other content. Resizing a keyboard to a larger size allows for more (or larger) keys to be displayed. Providing improved keyboard input devices enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of two or more contacts includes a first contact and a second contact. In some embodiments, in response to detecting at least the portion of the first gesture, in accordance with a determination that the movement of the set of two or more contacts includes increasing a distance between the first contact and the second contact (e.g., a de-pinch gesture), the electronic device resizes, on the display device, display of the keyboard to a fourth size that is bigger than the first size (e.g., based on the magnitude of the movement of the set of two or more contacts). In some embodiments, while the keyboard is displayed at the first size (the full size), the electronic device detects a de-pinch gesture on the keyboard and enlarges the keyboard to the fourth size that is bigger than the first size. In some embodiments, while displaying the keyboard at the fourth size, the electronic device detects, using the touch-sensitive surface, lift-off of the set of two or more contacts (e.g., device detects the end of the first gesture). In some embodiments, in response to detecting lift-off of the set of two or more contacts, in accordance with the determination that the movement of the set of two or more contacts includes increasing the distance between the first contact and the second contact (e.g., a de-pinch gesture), the electronic device resizes, on the display device, display of the keyboard to the first size (e.g., returned the keyboard to the first size (the full size)).

Thus, in some embodiments, when the device detects a de-pinch gesture on the keyboard when the keyboard is in the first size (the full size), the device enlarges the keyboard and, upon detecting liftoff of the de-pinch gesture, returns the keyboard to the first size (the full size), thereby providing the user with feedback that the keyboard can be resized, but not enlarged. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting lift-off of the second set of two or more contacts, in accordance with a determination that the movement of the second set of two or more contacts (e.g., 617 at FIG. 6P, includes increasing the distance between the third contact and the fourth contact (e.g., a depinch gesture), and that the magnitude of the movement of the second set of two or more contacts does not exceed the second threshold (e.g., non-zero) magnitude (e.g., a threshold distance), the electronic device resizes, on the display device, display of the keyboard to the third size (e.g., 616 at FIG. 6Q, return the keyboard to the pre-determined reduced size).

In some embodiments, displaying the keyboard at the third size includes displaying (e.g., on the keyboard, adjacent to the keyboard) a grabber object for changing the display location (while, optionally, maintaining the size) of the keyboard. In some embodiments, displaying the keyboard at the first size does not include displaying (e.g., on the keyboard, adjacent to the keyboard) the grabber object for changing the display location (while, optionally, maintaining the size) of the keyboard.

In some embodiments, while displaying the keyboard at the third size and at a first location, the electronic device detects a third gesture (e.g., in a direction). In some embodiments, in response to detecting the third gesture, the electronic device moves, on the display device, the keyboard from the first location to a second location different from the first location (e.g., by displaying an animation that moves the keyboard in the direction concurrently with detecting the third gesture).

In some embodiments, the third gesture is a single-finger gesture (e.g., 613, a single-finger drag gesture) that starts at a location corresponding to a displayed grabber object of the keyboard.

In some embodiments, the third gesture is a two-finger swipe gesture (e.g., 611) that starts at a location corresponding to the keyboard.

In some embodiments, while displaying the keyboard at the second location (e.g., when the keyboard is displayed at the third size (the predetermined reduced size)), in accordance with a determination that a set of enlarging criteria is satisfied, wherein the enlarging criteria includes: a first enlarging criterion that is satisfied when the third gesture is a single-finger gesture (e.g., a single-finger drag gesture) and a second enlarging criterion that is satisfied when the third gesture includes continuing to detect a contact of the third gesture within a predefined area (e.g., within 100 pixels of a bottom edge of the display) (or, alternatively, that the second location is within a second predefined area) for a threshold period of time, the electronic device resizes, on the display device, display of the keyboard to a seventh size (e.g., a pre-determined intermediate size that is bigger than the third size (the reduced size) and is smaller than the first size (the full size)). In some embodiments, while displaying the keyboard at the seventh size, the electronic device detects, using the touch-sensitive surface, lift-off of the third gesture (e.g., detect a lift-off of contacts of the third gesture).

In some embodiments, in response to detecting lift-off of the third gesture, the electronic device resizes, on the display device, display of the keyboard to the first size (e.g., the pre-determined full size). In some embodiments, while the keyboard is displayed at the seventh size, the device detects movement of contacts of the third gesture away from (e.g., out of) the predefined area (instead of detecting liftoff) and, in response, resizes the keyboard back to the third size.

In some embodiments, while displaying the keyboard at the third size and at the second location, the electronic device detects, using the touch-sensitive surface, lift-off of the third gesture (e.g., detect a lift-off of contacts of the third gesture). In some embodiments, in response to detecting lift-off of the third gesture, in accordance with a determination that at least a portion of the keyboard occupies a second predefined area of the display (e.g., a portion of the keyboard is in a margin area of the display), the electronic device moves, on the display device, the keyboard to a third location different from the second location (such that no portion of the keyboard occupies the second predefined area of the display). In some embodiments, in response to detecting lift-off of the third gesture, in accordance with a determination that the keyboard does not occupy the second predefined area of the display (e.g., no portion of the keyboard is in the margin area of the display), the electronic device maintains, on the display device, display of the keyboard at the second location.

In some embodiments, resizing, on the display device, display of the keyboard includes, in accordance with a determination that a set of transition criteria are satisfied, applying a visual transitional effect (e.g., a blur effect, a fade effect) to the keyboard during resizing. In some embodiments, resizing, on the display device, display of the keyboard includes, in accordance with a determination that the set of transition criteria are not satisfied, forgoing applying the visual transitional effect (e.g., a blur effect, a fade effect) to the keyboard during resizing. In some embodiments, the set of transition criteria include a first transition criterion that is satisfied when the different sized keyboards have different keys. In some embodiments, the set of transition criteria include a second transition criterion that is satisfied when the keyboard is of a first type (e.g., a first language, English) (and not satisfied when it is of a second type (a second language, Chinese).

In some embodiments, resizing, on the display device, display of the keyboard (e.g., from the first size to the second size, from the second size to the first size) includes changing an aspect ratio of one or more keys of the keyboard. In some embodiments, the "a" key (and, optionally, the "b" key) of the keyboard has a first aspect ratio when the keyboard is displayed at the first size and the "a" key (and, optionally, the "b" key) of the keyboard has a second aspect ratio different from the first aspect ratio when the keyboard is displayed at the third size.

Note that details of the processes described above with respect to method 700 (e.g., FIG. 7) are also applicable in an analogous manner to the methods described below. For example, method 900 optionally includes one or more of the characteristics of the various methods described above with reference to method 700. For brevity, these details are not repeated below.

FIGS. 8A-8K illustrate exemplary user interfaces for providing visual feedback of an audio input, in accordance with some embodiments. The user interfaces in these figures are used to illustrate the processes described below, including the processes in FIG. 9.

Figure 8A:
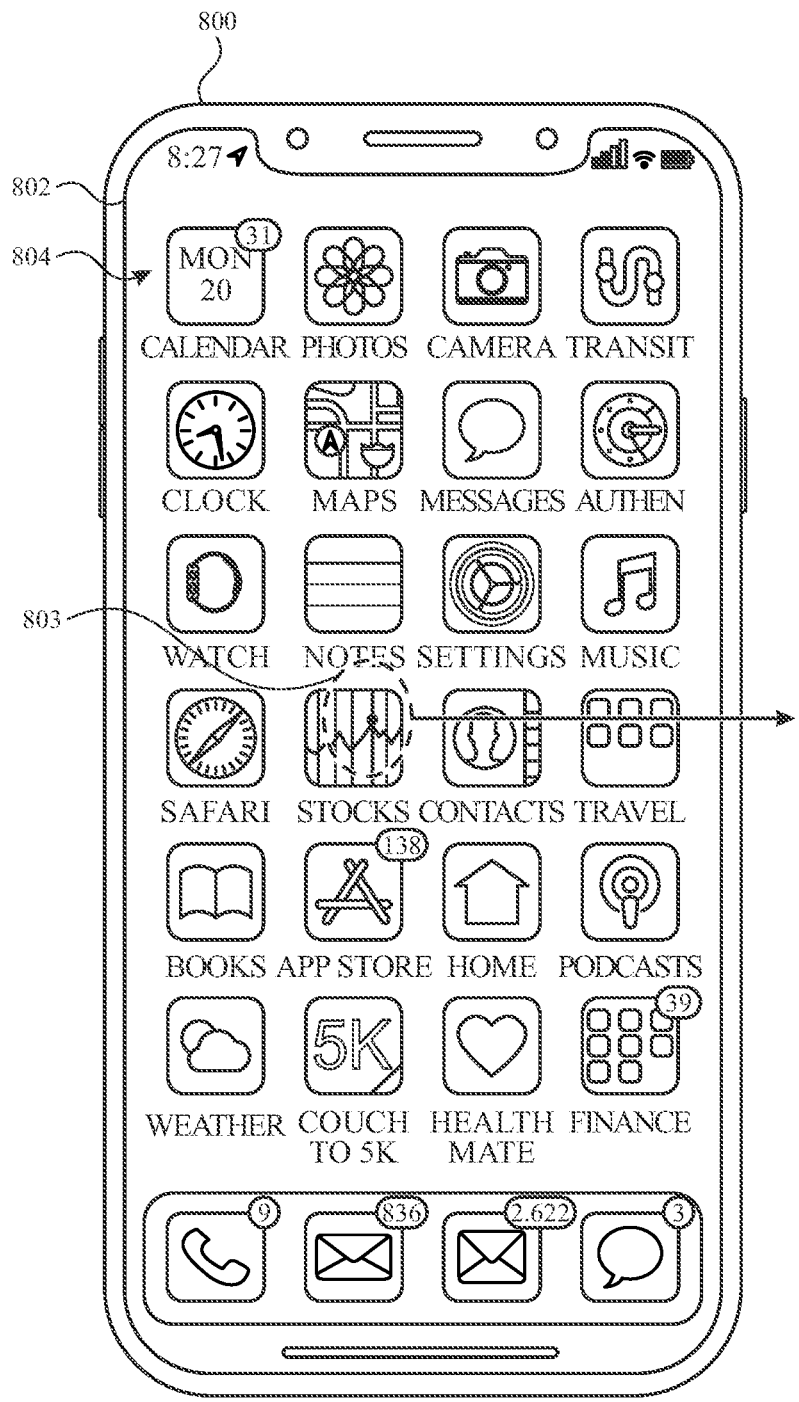
FIGS. 8A-8K illustrate exemplary user interfaces for providing visual feedback of an audio input, in accordance with some embodiments.

FIG. 8A illustrates an electronic device 800 including a display device 802 integrated with a touch-sensitive surface. In some embodiments, electronic device 800 includes one or more features of device 100, 300, 500, or 600. Electronic device 800 displays, on display device 802, a home screen interface 804. In response to detecting an input 803 in a first direction (e.g., a swipe gesture to the right), home screen interface 804 is moved off the display device 802 in the direction of the input 803, and a search interface (e.g., search interface 806 as shown in FIG. 8C) is moved on to the display device 802, as further shown in FIGS. 8B and 8C.

Figure 8B:
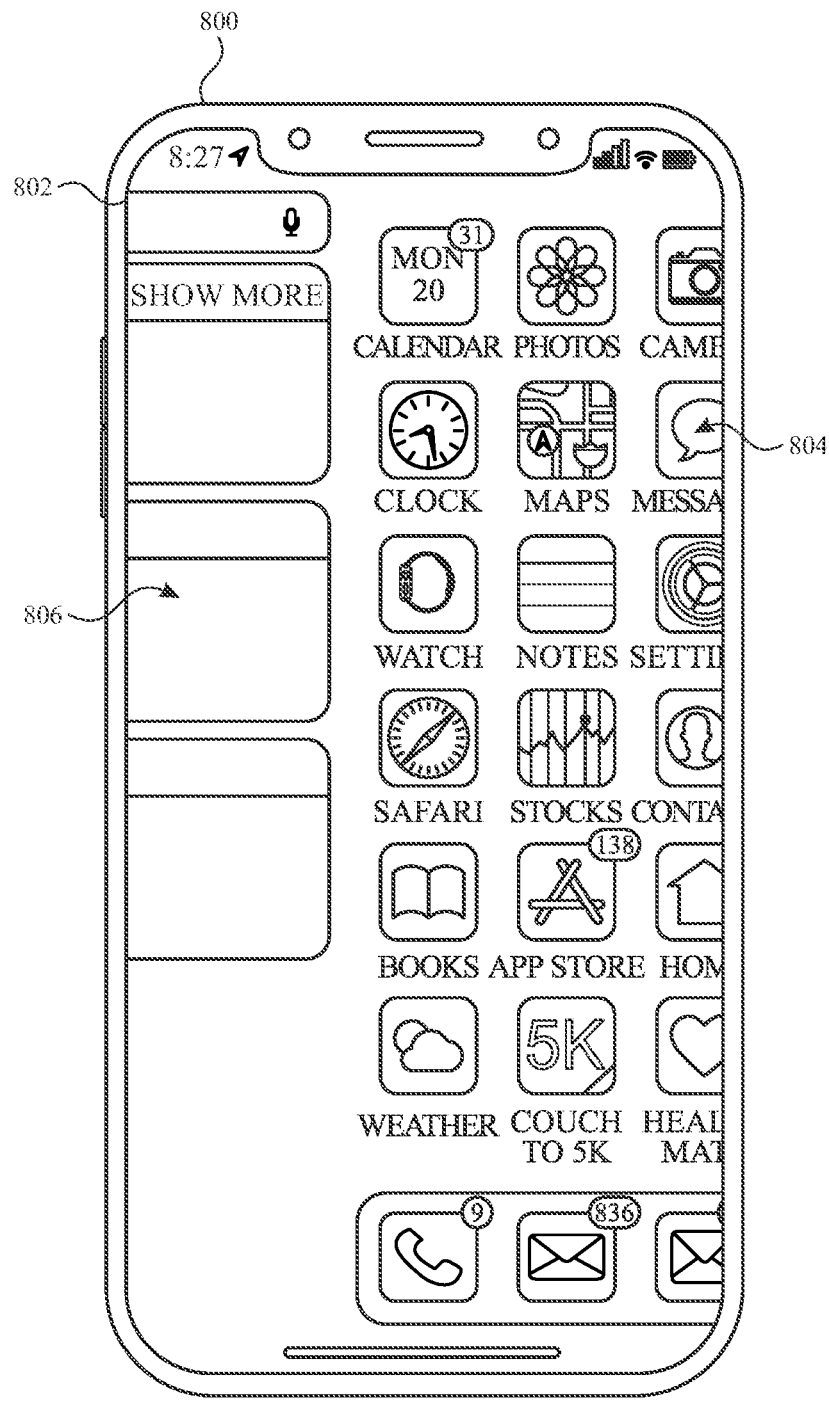
Figure 9:
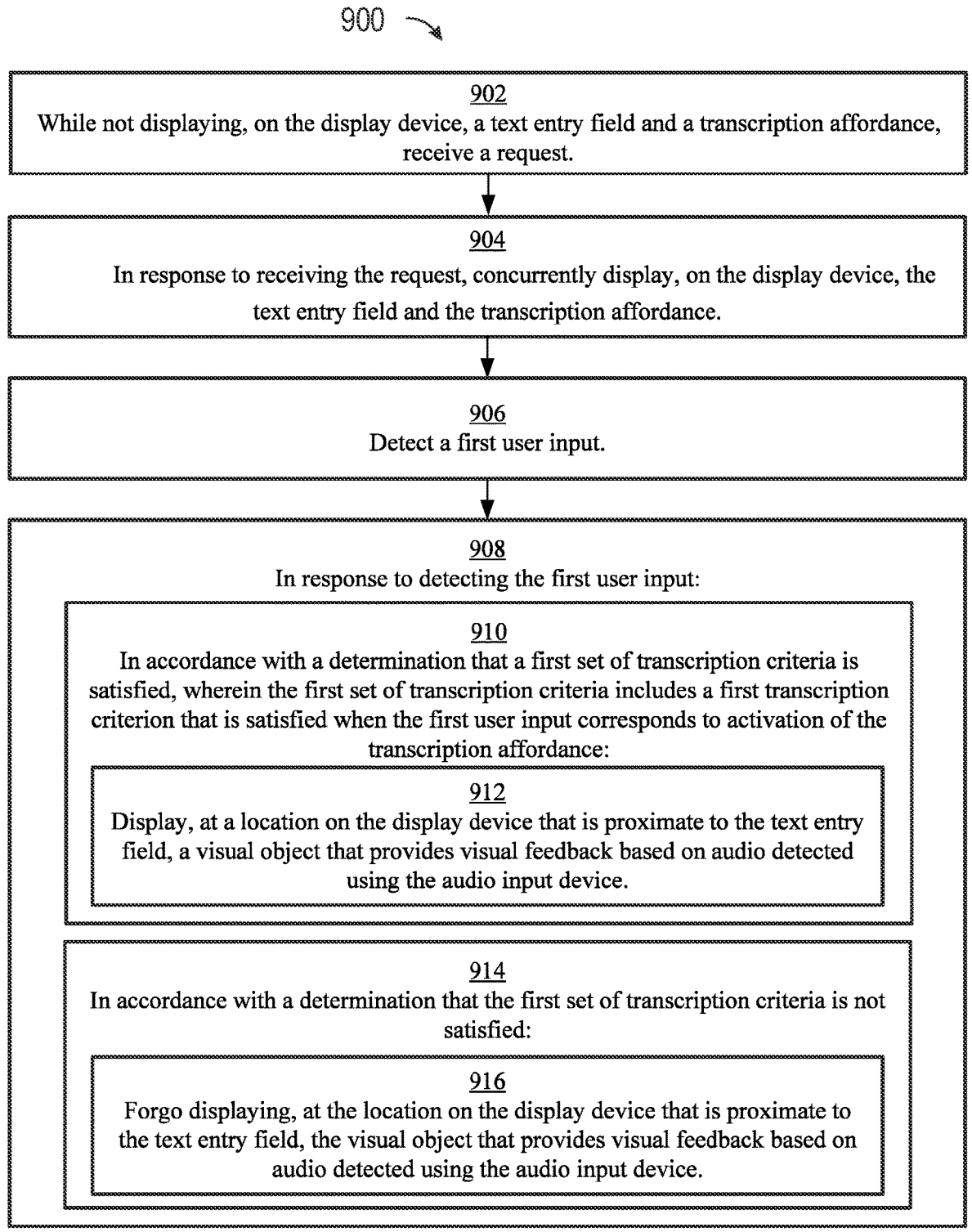
FIG. 9 is a flow diagram illustrating methods for providing visual feedback of an audio input, in accordance with some embodiments.

FIG. 8B illustrates the transition from the home screen interface 804 to the search interface 806 in response to detecting input 803, as shown in FIG. 8A. During the transition, the home screen interface 804 is animated to shift off of the display device 802 while the search interface 806 is animated to shift on to the display device 802.

Figure 8C:
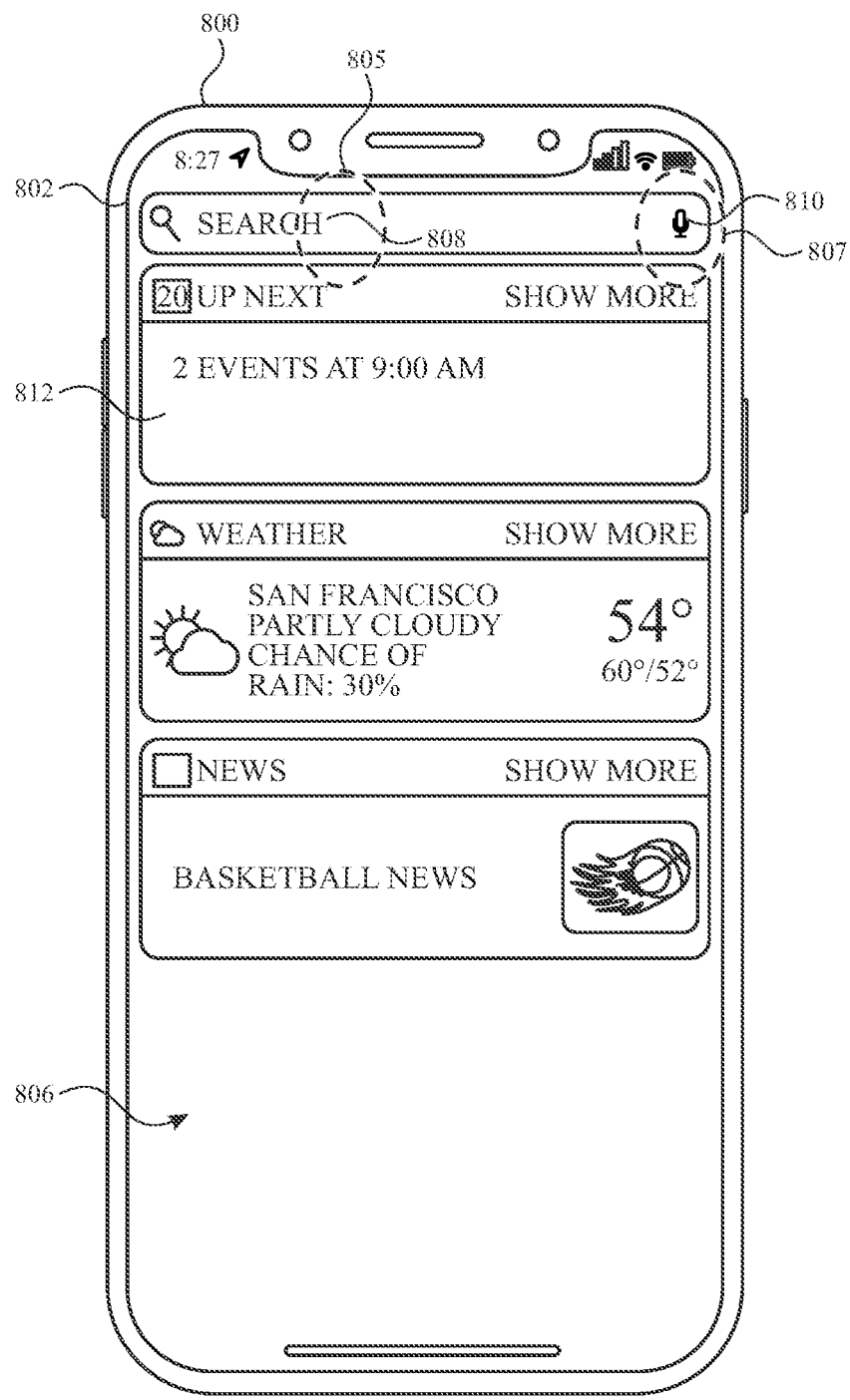

FIG. 8C illustrates search interface 806 displayed on display device 802. Search interface 806 includes a text entry field 808 and a transcription affordance 810. In some embodiments, search interface 806 also includes one or more notifications 812. In response to detecting an input 805 (e.g., a tap input) corresponding to the text entry field 808, a keyboard for entering text into the text entry field 808 (e.g., keyboard 820 as shown in FIG. 8G) is displayed. Alternatively, in response to detecting an input 807 (e.g., a tap input) corresponding to transcription affordance 810, the electronic device 800 initiates an audio input mode and displays a visual object (e.g., 814) without displaying a keyboard (e.g., 820). The visual object (e.g., 814) provides visual feedback of audio detected in the audio input mode (e.g., visual object 814 as shown in FIG. 8D) with an audio input device (e.g., a microphone).

Figure 8D:
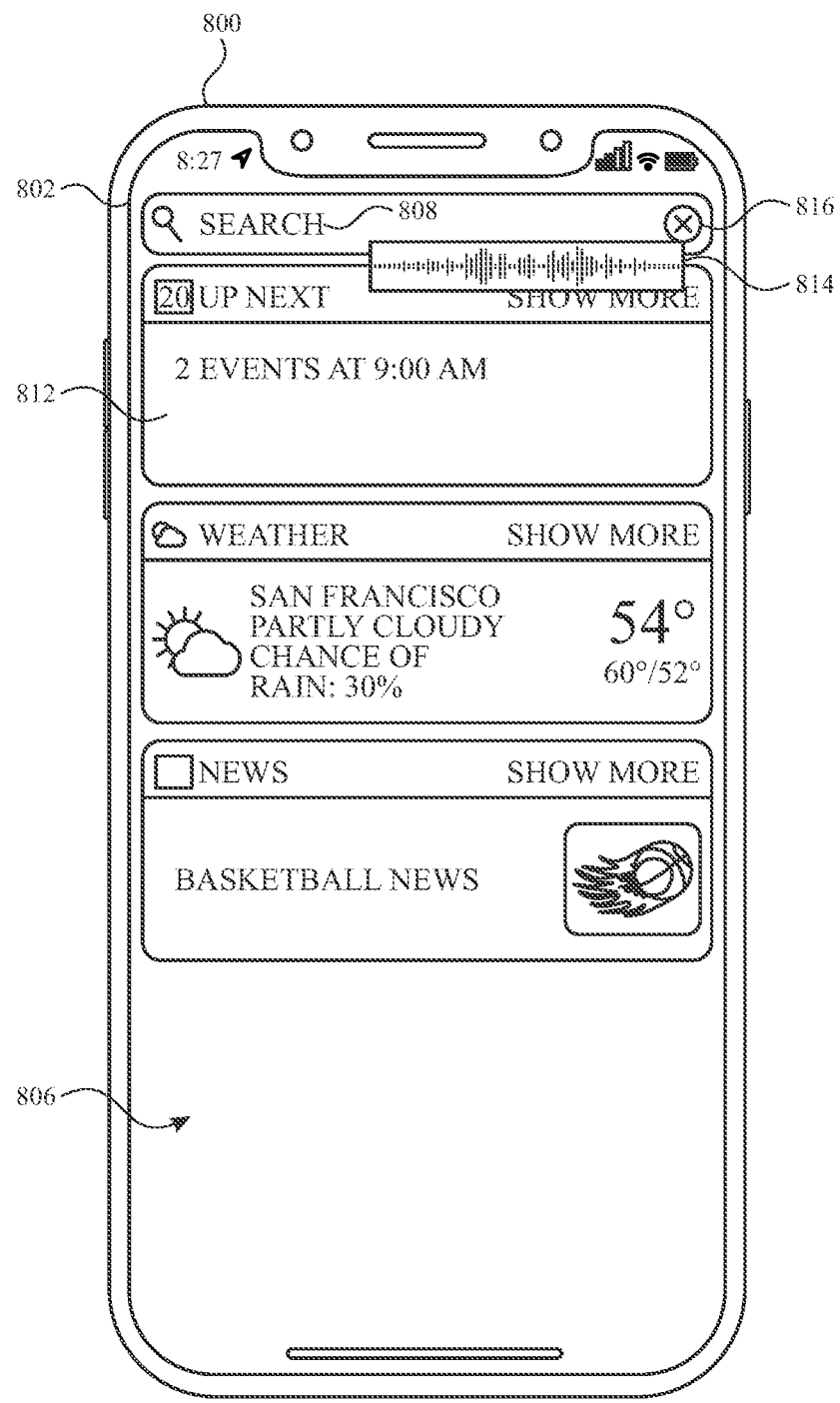

FIG. 8D illustrates search interface 806 with visual object 814 displayed in response to initiating the audio input mode (e.g., in response to detecting tap 807 on transcription affordance 810). In some embodiments, visual object 814 is a popover visual object that overlays a portion of the search interface 806 and is smaller (in width, in height, both) than the text entry field 808. In some embodiments, visual object 814 is a popover visual object that replaces a portion of the text entry field 808, thereby indicating to the user where transcribed text will be entered.

Visual object 814 provides visual feedback based on audio (e.g., based on volume of audio) detected with the audio input device (e.g., a visual representation of the audio waveform detected with the audio input device). The visual feedback indicates to a user that audio is being received by the electronic device 800. While the visual object 814 is displayed, a cancelation affordance 816 is also displayed (e.g., having replaced transcription affordance 810). Activation of the cancelation affordance 816 ends the audio input mode and ceases display of the visual object 814. In some embodiments, the visual object 814 ceases to be displayed and the audio input mode ends when no audio input (e.g., no audio above a threshold level) is detected for a threshold duration of time. In some embodiments, the visual object 814 ceases to be displayed and the audio input mode ends after an absolute amount of time from when input 807 was detected that initiated the audio input mode (e.g., 15 seconds).

Figure 8E:
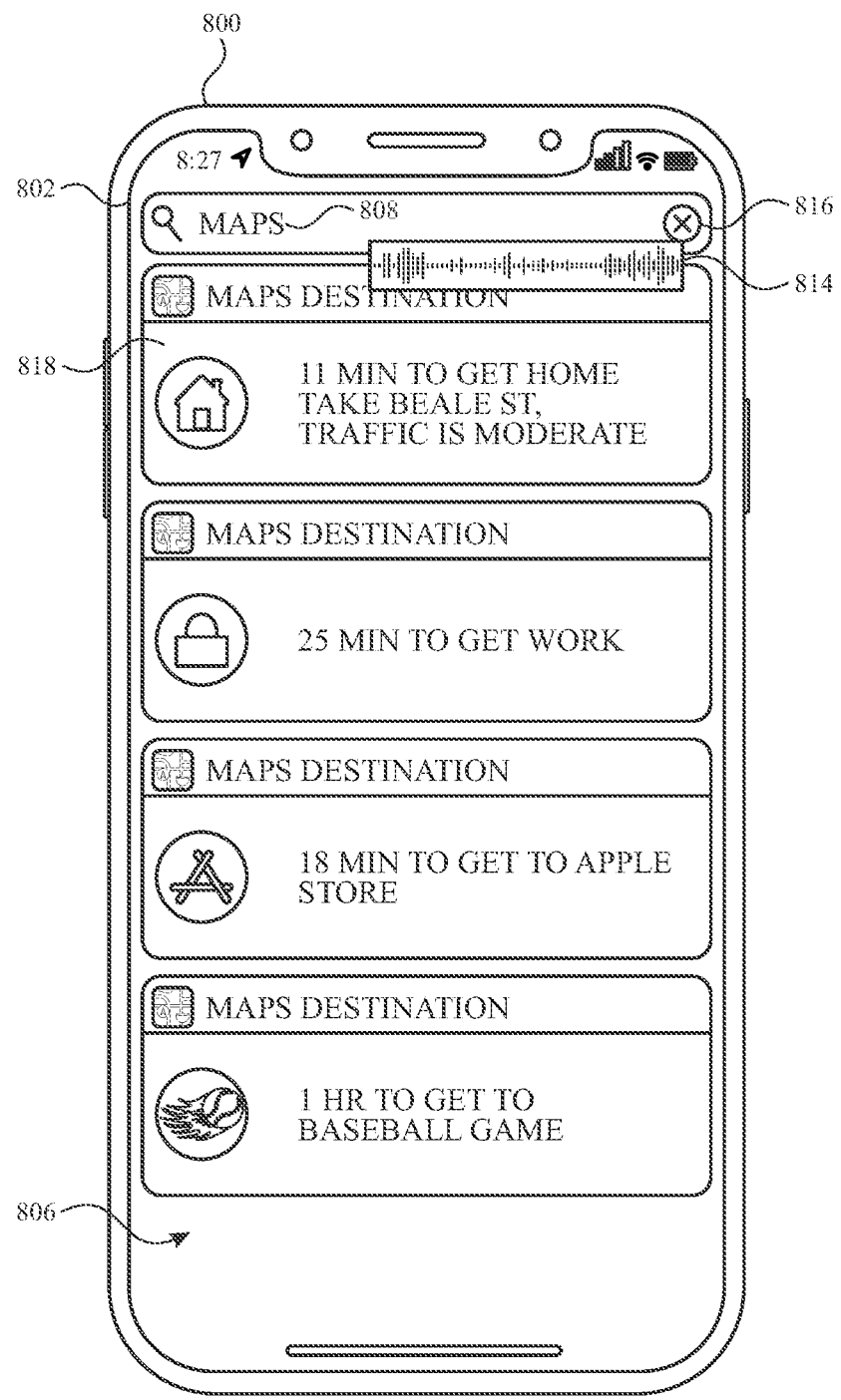

FIG. 8E illustrates search interface 806 after an audio input (e.g., "maps") has been detected and transcribed by electronic device 800. While the audio input is being detected, visual object 814 includes a visual representation of the detected audio (e.g., an audio waveform). The transcribed audio input is displayed in the text entry field 808, and a search is performed based on the transcribed audio input (e.g., a search of information accessible by the electronic device 800 that relates to the transcribed audio input). If search results are located, one or more search results 818 are displayed in the search interface 806. In some embodiments, the one or more search results 818 replace display of the one or more notifications 812 shown in FIGS. 8C and 8D. The visual object 814 continues to be displayed in the search interface 806 until activation of the cancelation affordance 816 is detected, or a threshold duration of time passes without detecting further audio input (e.g., audio above a threshold level). In some embodiments, the visual object 814 ceases to be displayed and the audio input mode ends after an absolute amount of time from when input 807 was detected that initiated the audio input mode (e.g., 15 seconds).

Figure 8F:
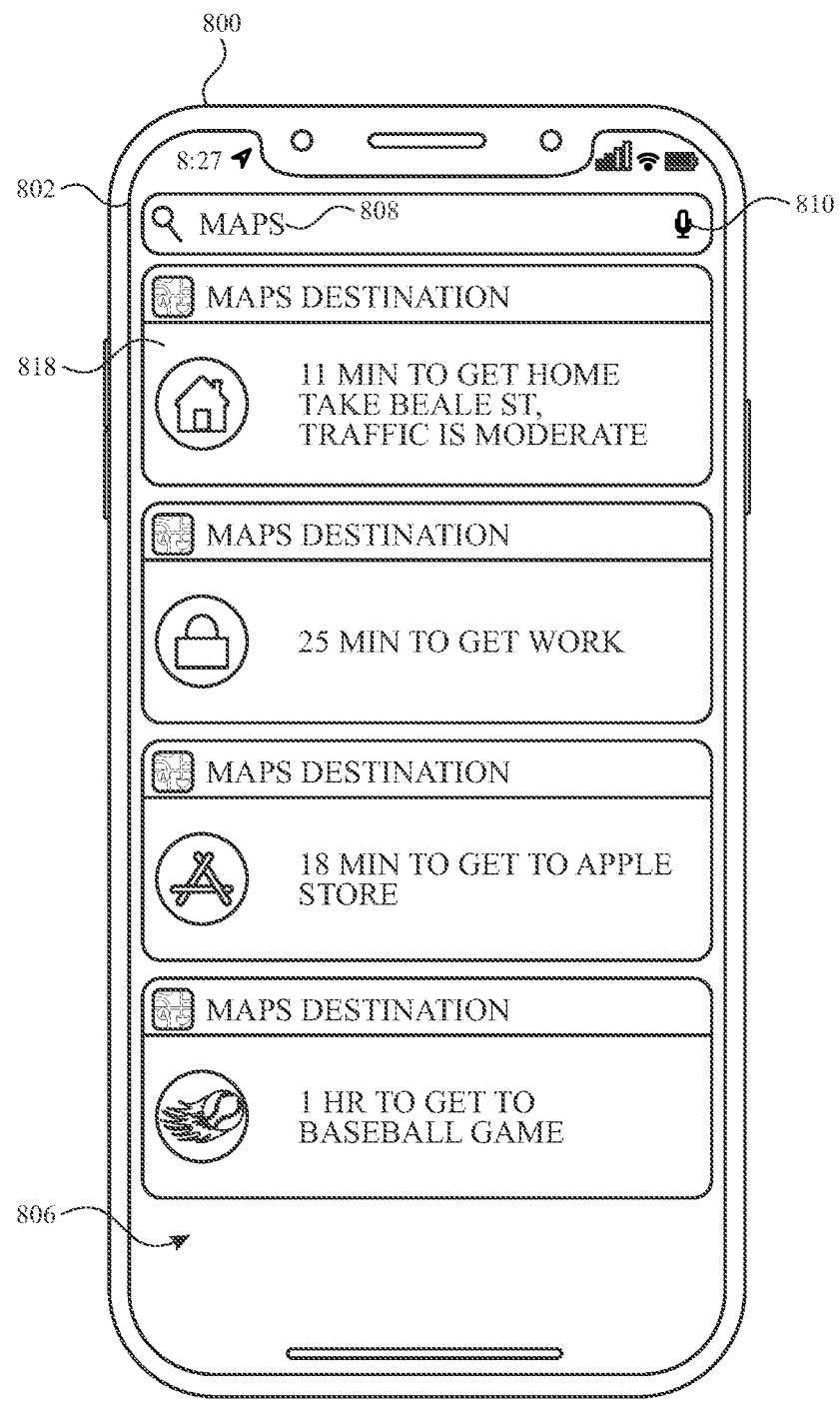
Figure 8G:
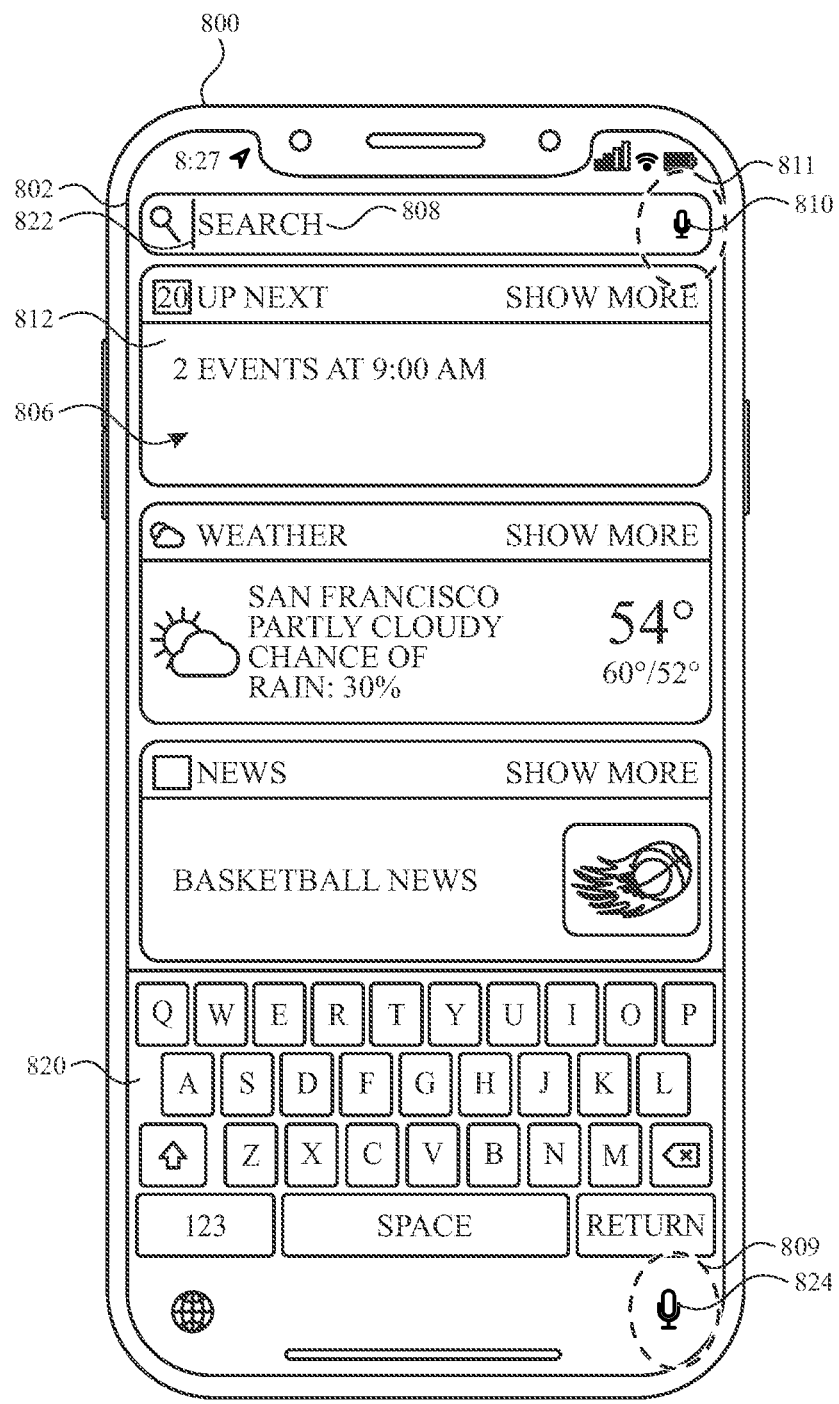

FIG. 8F illustrates search interface 806 after the audio input mode has ended and the visual object ceases to be displayed. The transcribed audio input (e.g., "maps") continues to be displayed in the text entry field 808 and one or more search results 818 continue to be displayed in the search interface 806.

Figure 8H:
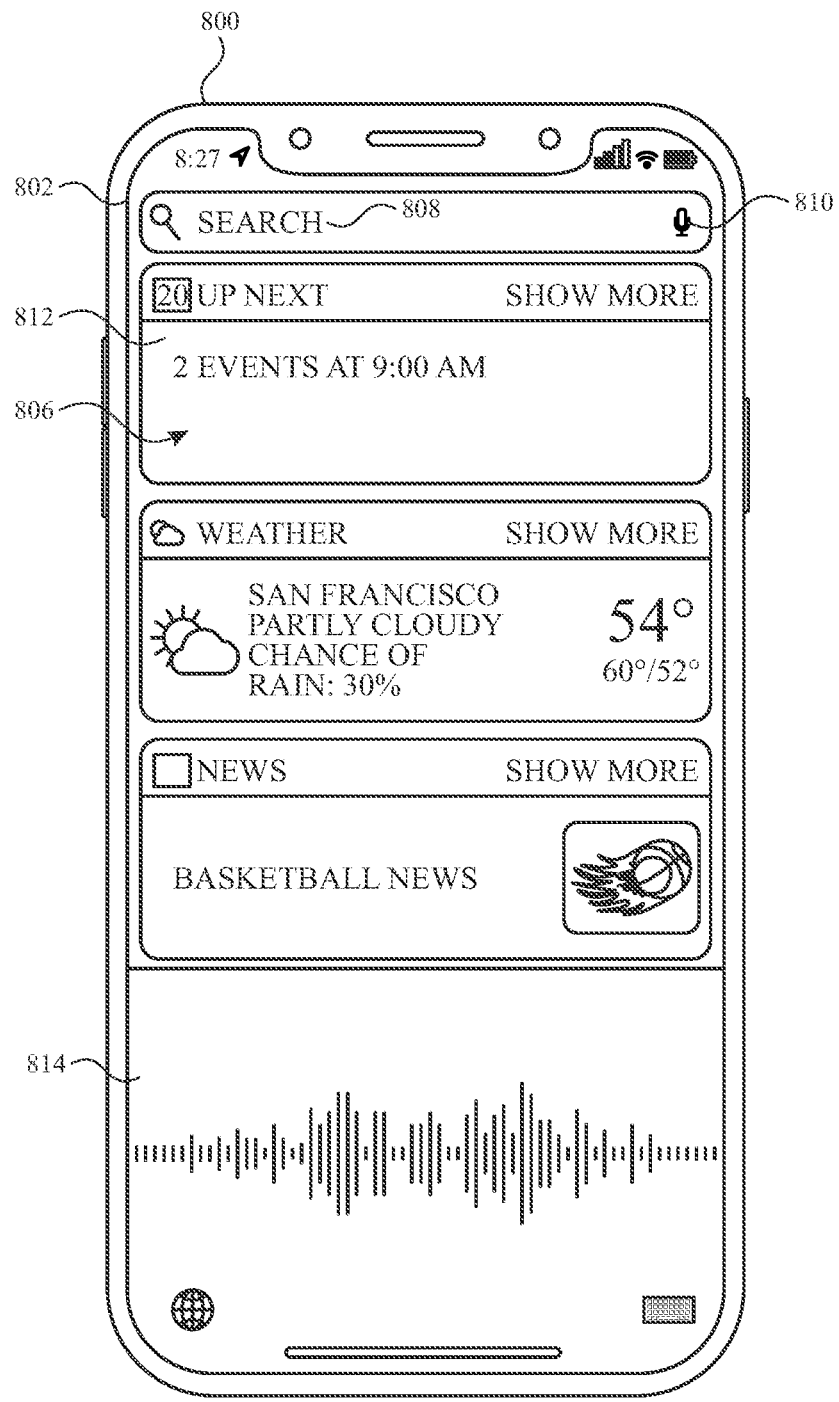

FIG. 8G illustrates search interface 806 after detecting an input (e.g., a tap input) (e.g., input 805 shown in FIG. 8C) corresponding to the text entry field 808. In response to detecting the input corresponding to the text entry field 808, a keyboard 820 is displayed in the search interface 806 and a cursor 822 is displayed in the text entry field 808. The keyboard 820 includes a secondary transcription affordance 824. In response to detecting an input 809 (e.g., a tap input) corresponding to the secondary transcription affordance 824, the electronic device 800 initiates the audio input mode and replaces display of the keyboard 820 with display of a visual object that provides visual feedback of audio detected in the audio input mode (e.g., visual object 814 as shown in FIG. 8H). In some embodiments, while the keyboard 820 is displayed, in response to detecting an input 811 (e.g., a tap input) corresponding to the transcription affordance 810 in the text entry field, the electronic device 800 initiates the audio input mode and replaces display of the keyboard 820 with display of a visual object that provides visual feedback of audio detected in the audio input mode (e.g., visual object 814 as shown in FIG. 8H).

FIG. 8H illustrates search interface 806 with visual object 814 replacing display of keyboard 820 shown in FIG. 8G. Visual object 814 shown in FIG. 8H replaces display of the keyboard in response to initiating the audio input mode (e.g., in response to detecting a tap on transcription affordance 810 or secondary transcription affordance 824). By replacing display of the keyboard, a larger visual representation of the audio signal is displayed without covering any portion of the text entry field 808. This allows the full width of the text entry field 808 to display transcribed text without being partially obscured by a visual object, such as shown in FIG. 8D, but uses more display space, thereby limiting the content that is displayed. Visual object 814 provides visual feedback based on audio (e.g., based on volume of audio) detected with the audio input device (e.g., a visual representation of the audio waveform detected with the audio input device). The visual feedback indicates to a user that audio is being received by the electronic device 800.

Figure 8I:
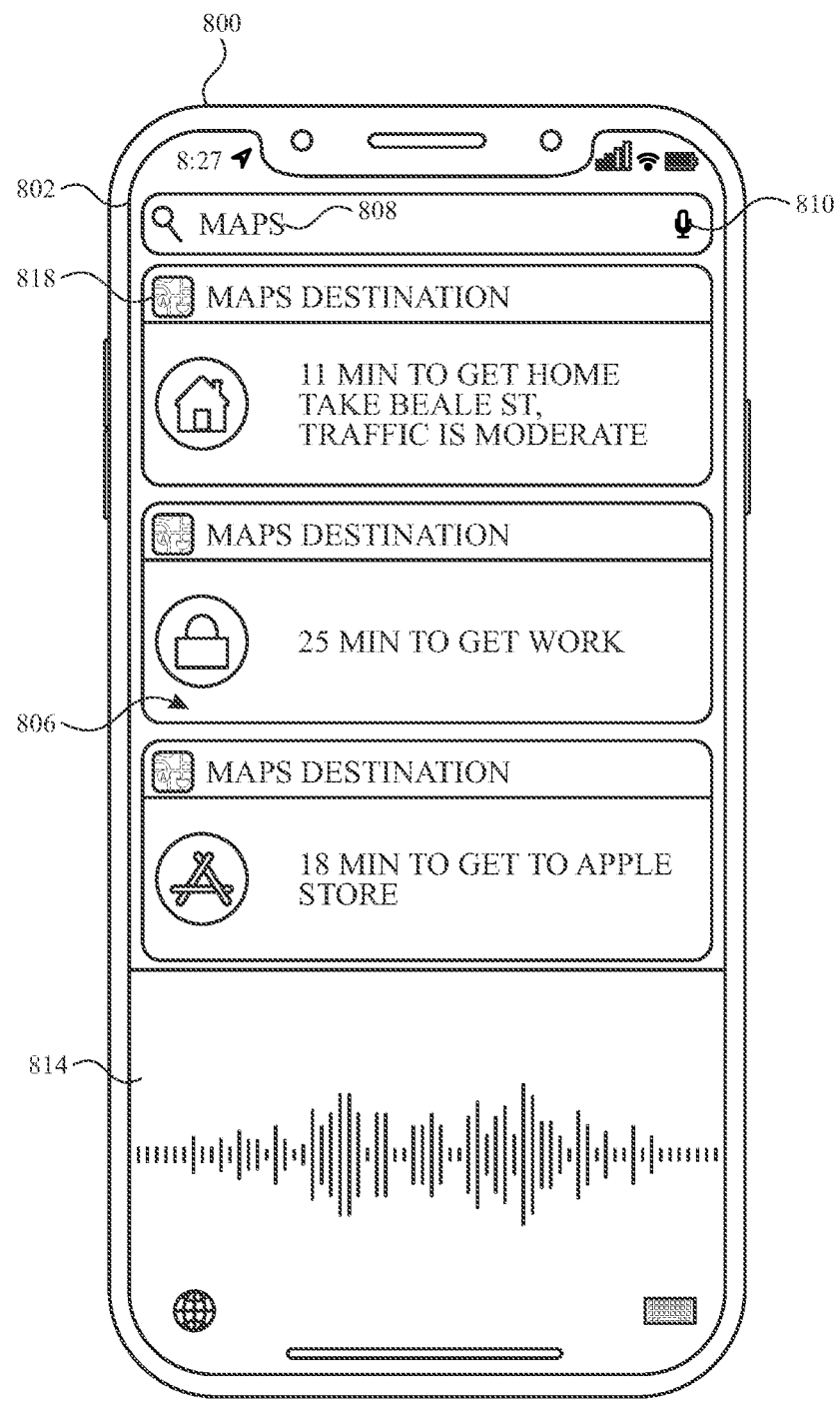

FIG. 8I illustrates search interface 806 after an audio input (e.g., "maps") has been detected and transcribed by electronic device 800. While the audio input is being detected, visual object 814 includes a visual representation of the detected audio (e.g., an audio waveform). The transcribed audio input is displayed in the text entry field 808, and a search is performed based on the transcribed audio input (e.g., a search of information accessible by the electronic device 800 that relates to the transcribed audio input). If search results are located, one or more search results 818 are displayed in the search interface 806. In contrast to FIG. 8E, fewer search results 818 can be displayed due to the area of the search interface 806 taken by the visual object 814.

Figure 8J:
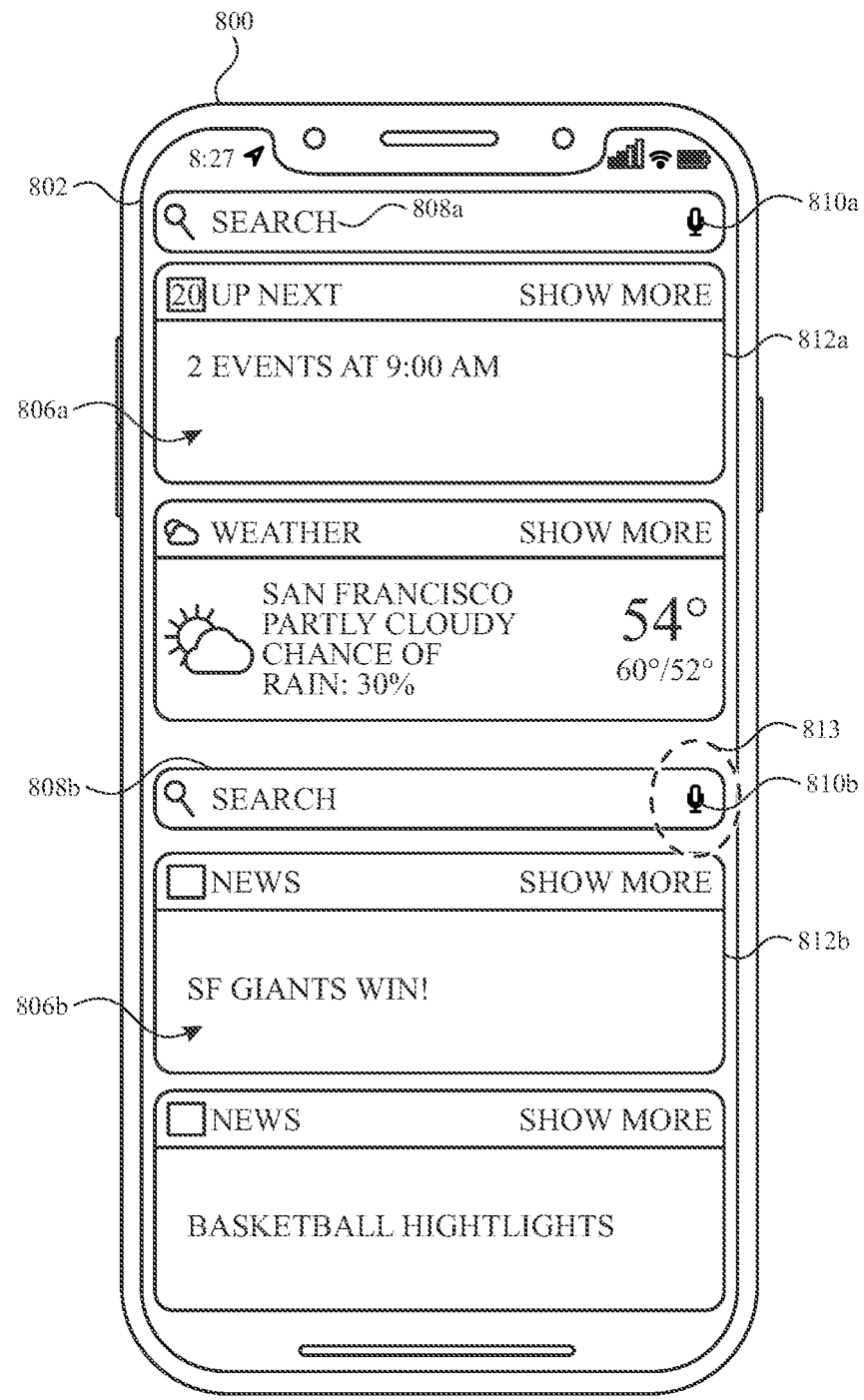

FIG. 8J illustrates electronic device 800 displaying multiple search interfaces 806a and 806b on display device 802 (e.g., a device search interface and a news search interface). Search interface 806a includes text entry field 808a and transcription affordance 810a. Search interface 806b includes text entry field 808b and transcription affordance 810b. In some embodiments, each search interface 806a and 806b also include one or more notifications 812a and 812b. In response to detecting an input 813 (e.g., a tap input) corresponding to transcription affordance 810b, the electronic device 800 initiates an audio input mode for the search interface 806b and displays a visual object that provides visual feedback of audio detected in the audio input mode for the search interface 806b (e.g., visual object 814 as shown in FIG. 8K).

Figure 8K:
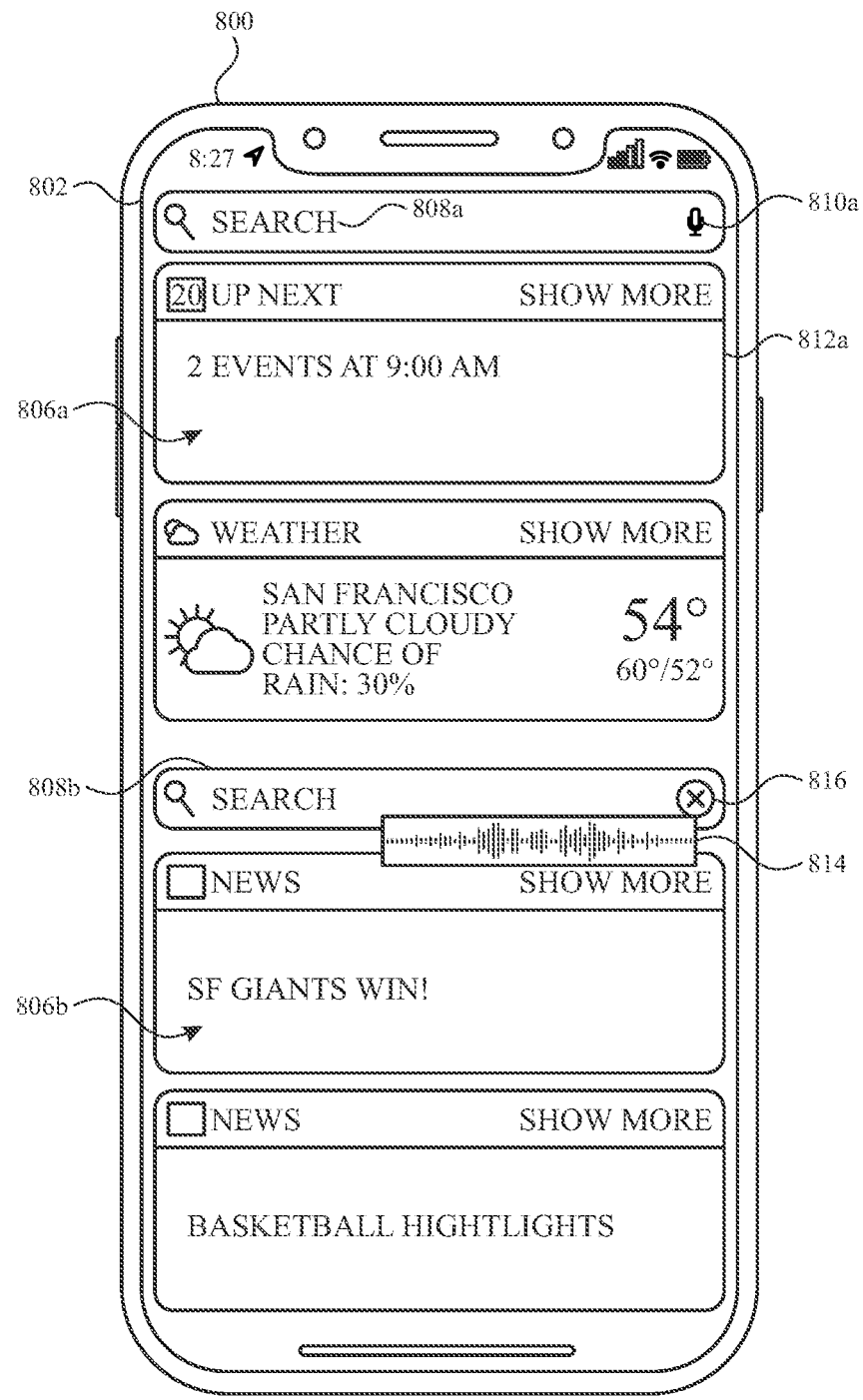

FIG. 8K illustrates visual object 814 being displayed in response to initiating the audio input mode for search interface 806b (e.g., in response to detecting a tap on transcription affordance 810b). Visual object 814 is a popover visual object that overlays a portion of the search interface 806b to indicate that the audio input being detected is for search interface 806b. When the audio input is transcribed, text corresponding to the transcribed audio input will be displayed in text entry field 808b and not in text entry field 808a. As a result, the technique enables a single input (e.g., a tap) that includes both targeting (e.g., between text entry field 808 and text entry field 808b) and initiating transcription.

FIG. 9 is a flow diagram illustrating a method for providing visual feedback of an audio input using an electronic device in accordance with some embodiments. Method 900 is performed at a device (e.g., 100, 300, 500, 600, 800) with a display device and an audio input device. Some operations in method 900 are, optionally, combined, the orders of some operations are, optionally, changed, and some operations are, optionally, omitted.

As described below, method 900 provides an intuitive way for providing visual feedback of an audio input. The method reduces the cognitive burden on a user for receiving feedback that audio input is ongoing, thereby creating a more efficient human-machine interface. For battery-operated computing devices, enabling a user to provide audio for transcription faster and more efficiently conserves power and increases the time between battery charges.

In some embodiments, while not displaying, on the display device, a text entry field and a transcription affordance, the electronic device receives (902) a request (e.g., 803, a user input requesting a search functionality (a search field)).

In some embodiments, in response to receiving the request, the electronic device concurrently displays (904), on the display device the text entry field (e.g., 808) and the transcription affordance (e.g., 810, that has the appearance of a microphone, displayed inside the text entry field, that (when activated) causes audio to be transcribed into text and for the transcribed text to be displayed in the text entry field).

In some embodiments, the electronic device detects (906) (e.g., using a touch-sensitive surface) a first user input (e.g., 807, 805, a tap input).

In some embodiments, in response (908) to detecting the first user input, in accordance with a determination (910)

that a first set of transcription criteria is satisfied, wherein the first set of transcription criteria includes a first transcription criterion that is satisfied when the first user input corresponds to activation of the transcription affordance (e.g., the first user input is a tap gesture that is detected, on a touch-sensitive surface, at a location that corresponds to the transcription affordance), the electronic device displays (912), at a location on the display device that is proximate to the text entry field (e.g., partially overlapping the text entry field), a visual object (e.g., 814, an object that includes a waveform; a visual indicator) that provides visual feedback (e.g., over time, while the visual object is displayed) based on audio (e.g., based on volume of audio) detected using the audio input device. In some embodiments, in accordance with the determination that the first set of transcription criteria is satisfied, the electronic device begins detecting audio using the audio input device.

Displaying the visual object that provides visual feedback based on audio detected using the audio input device provides the user with feedback that the audio they are providing is being transcribed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the location on the display device that is proximate to the text entry field is selected based on a location of the text entry field. In some embodiments, the location is a first location in accordance with a determination that the text entry field is displayed in a first region of the display device; the location is a second location different from the first location in accordance with a determination that the text entry field is displayed in a second region of the display device that is different from the first region.

In some embodiments, in accordance with the determination that the first set of transcription criteria is satisfied, the electronic device ceases to display the transcription affordance (e.g., 816, replacing display of the transcription affordance with display of a cancelation affordance which, when activated causes the device to cease displaying transcribed audio in the text entry field). In some embodiments, in accordance with the determination that the first set of transcription criteria is not satisfied, the device maintains display of the transcription affordance.

In some embodiments, the first set of transcription criteria includes a second transcription criterion that is satisfied when a keyboard (e.g., 820) is not displayed on the display device when the first user input is detected. In some embodiments, when a keyboard is being displayed on the display device when the first user input is detected, the device does not display the visual object at the location that is proximate to the text entry field and optionally, instead, replaces at least a portion of the keyboard with a waveform representation of audio received.

Displaying the visual object that provides visual feedback based on audio detected at a location that is proximate to the text entry field enables the device to not display a keyboard, which would take up display space. Preserving display space so that other content can be displayed enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, at the location on the display device that is proximate to the text entry field, the visual object that provides visual feedback based on audio detected using the audio input device includes replacing display of a first portion of the text entry field with (at least a portion of) the visual object. In some embodiments, displaying, at the location on the display device that is proximate to the text entry field, the visual object that provides visual feedback based on audio detected using the audio input device includes not replacing display of a second portion of the text entry field with the visual object. In some embodiments, the visual object is a popover visual object that replaces a portion of the text entry field, thereby indicating to the user where transcribed text will be entered. In some embodiments, a portion of the visual object does not replace the text entry field, thereby allowing a larger visual representation of the audio signal to be displayed while maintaining a useable text entry field to display the transcribed text.

Displaying the visual object that provides visual feedback based on audio detected such that it partially overlaps the text entry field enables the device preserve display space. Preserving display space so that other content can be displayed enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying the visual object that provides visual feedback based on audio detected at a location that is proximate to the text entry field enables the device to not display a keyboard, which would take up display space. Preserving display space so that other content can be displayed enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, at the location on the display device that is proximate to the text entry field, the visual object that provides visual feedback based on audio detected using the audio input device includes displaying the visual object without shifting a location (e.g., from a first location on the display to a second location on the display) of displayed content. In some embodiments, displaying the visual object includes displaying a popover object that does not reorient elements displayed on the user interface with the first user input was received (e.g., does not cause UI elements to move on the display). In some embodiments, portions of the user interface (other than the space used to display the visual object) do not change in response to detecting the first user input. In some embodiments, portions of the user interface (other than the space used to display the visual object and other than text being entered into the text entry field) do not change in response to detecting the first user input. In some embodiments, a keyboard is not displayed in response to detecting the first user input. In some embodiments, an object (e.g., a keyboard, a waveform display object) does not slide onto the display from an edge (e.g., the bottom) of the display.

Displaying the visual object that provides visual feedback based on audio detected without shifting a location of other content that was previously displayed provides the user with feedback that an additional function is being performed in the current context. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the visual object (e.g., an object that includes a waveform; a visual indicator) that provides visual feedback (e.g., over time, while the visual object is displayed) based on audio (e.g., based on volume of audio) detected using the audio input device, the electronic device detects, using the audio input device, audio input. In some embodiments, in response to detecting audio input, the electronic device displays text in the text entry field (e.g., 808 at FIG. 8E), wherein the text is based on the detected audio input. In some embodiments, the device receives the audio, transcribes the audio into text, and displays the text in the text entry field. In some embodiments, the device receives the audio, transmits the audio to a server for transcription, receives text that is based on the audio, and displays the text in the text entry field.

In some embodiments, while displaying the visual object (e.g., 814, an object that includes a waveform; a visual indicator) that provides visual feedback (e.g., over time, while the visual object is displayed) based on audio (e.g., based on volume of audio) detected using the audio input device, the electronic device determines that audio levels received for a threshold duration of time do not exceed a threshold audio level (e.g., the device detects 1 second of silence, the device detects 0.5 seconds of audio levels below a predefined dB (such as 15 dB)). In some embodiments, in response to the determination that audio levels received for the threshold duration of time do not exceed the threshold audio level (e.g., the device detects 1 second of silence, the device detects 0.5 seconds of audio levels below a predefined dB (such as 15 dB)), the electronic device ceases to display the visual object (and optionally ceasing transcribing into the text entry field). In some embodiments, the device ceases to display the visual object (and optionally ceasing transcribing into the text entry field) after an absolute amount of time after the first input was detected (e.g., 15 seconds).

In some embodiments, activation of the transcription affordance initiates text entry into the text entry field (e.g., 808). In some embodiments, the electronic device concurrently displays, on the display device with the text entry field and the transcription affordance, a second text entry field (e.g., 808*b* with 808*a*) and a third transcription affordance (e.g., 816, at a location proximate to the second text entry field). In some embodiments, the electronic device detects activation of the third transcription affordance. In some embodiments, in response to detecting activation of the third transcription affordance, the electronic device displays, at a location on the display device that is proximate to the second text entry field (e.g., partially overlapping the text entry field), a second visual object (e.g., an object that includes a waveform; a visual indicator) that provides visual feedback (e.g., over time, while the visual object is displayed) based on audio (e.g., based on volume of audio) detected using the audio input device. In some embodiments, multiple text entry fields are displayed, each with a corresponding transcription affordance which, when activated, starts transcription processes for the respective text entry field and causes display of a popover waveform at a location that is proximate to the respective text entry field.

In some embodiments, in response to (908) detecting the first user input, in accordance with a determination (914) that the first set of transcription criteria is not satisfied, the electronic device forgoes (916) displaying, at the location on the display device that is proximate to the text entry field, the visual object (e.g., an object that includes a waveform) that provides visual feedback (e.g., over time, while the visual object is displayed) based on audio (e.g., based on volume of audio) detected using the audio input device.

In some embodiments, the electronic device displays, on the display device, a keyboard (e.g., 820) concurrently with the text entry field and the transcription affordance (e.g., 810). In some embodiments, in response to detecting the first user input, in accordance with the determination that the first set of transcription criteria is not satisfied, the electronic device replaces, on the display device, display of at least a portion of (e.g., at least one key of the keyboard, all keys of the keyboard) the keyboard (e.g., 820) with second visual feedback (e.g., 814, changing over time) based on audio (e.g., based on volume of audio) detected using the audio input device.

In some embodiments, the electronic device displays, on the display device, a second transcription affordance (e.g., 824) concurrently with the keyboard (e.g., 820). In some embodiments, the first user input corresponds to activation of the second transcription affordance. In some embodiments, the device displays a second transcription affordance that is optionally part of a displayed keyboard. In response to detecting activation of the second transcription affordance, the device replaces the keyboard with waveform that is based on the audio being received.

Note that details of the processes described above with respect to method 900 (e.g., FIG. 9) are also applicable in an analogous manner to the methods described above. For example, method 700 optionally includes one or more of the characteristics of the various methods described above with reference to method 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve input techniques. The present disclosure contemplates that in some instances, this gathered data may include personal information data that uniquely identifies a specific person.

The present disclosure recognizes that the use of such personal information data, in the present technology, can be used to the benefit of users. For example, the personal information data can be used to better transcribe audio. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device, comprising:
   a display device;
   an audio input device;
   one or more processors; and
   memory storing one or more programs configured to be executed by the one or more processors, the one or more programs including instructions for:
      while not displaying, on the display device, a text entry field and a first transcription affordance, receiving a request;
      in response to receiving the request, concurrently displaying, on the display device:
         the text entry field, and
         the first transcription affordance at a first location;
      detecting a first user input; and
      in response to detecting the first user input:
         in accordance with a determination that the first user input is directed to the first transcription affordance:
            displaying, on the display device, a first visual object that provides visual feedback based on audio detected using the audio input device and varies based on volume of the audio detected using the audio input device without displaying a keyboard, wherein the first visual object overlays at least a portion of the text entry field;
         in accordance with a determination that the first user input is directed to the text entry field:
            displaying, on the display device concurrently with the text entry field and the first transcription affordance, a keyboard with a second transcription affordance that is different from the first transcription affordance, wherein the second transcription affordance is displayed at a second location that is different from the first location;
      after displaying the keyboard with the second transcription affordance:
         detecting a second user input; and
         in accordance with a determination that the second user input is directed to the second transcription affordance:
            replacing, on the display device, display of at least a portion of the keyboard with a second visual object that provides visual feedback based on audio detected using the audio input device and varies based on volume of the audio detected using the audio input device.

2. The electronic device of claim 1, the one or more programs further including instructions for:
   while displaying the first visual object that provides visual feedback based on audio detected using the audio input device and varies based on volume of the audio detected using the audio input device:
      detecting, using the audio input device, audio input; and
      in response to detecting audio input, displaying text in the text entry field, wherein the text is based on the detected audio input.

3. The electronic device of claim 1, the one or more programs further including instructions for:

while displaying the first visual object that provides visual feedback based on audio detected using the audio input device and varies based on volume of the audio detected using the audio input device:
  determining that audio levels received for a threshold duration of time do not exceed a threshold audio level; and
in response to the determination that audio levels received for the threshold duration of time do not exceed the threshold audio level, ceasing to display the first visual object.

4. The electronic device of claim 1, the one or more programs further including instructions for:
  in accordance with the determination that a first set of transcription criteria is satisfied, wherein the first set of transcription criteria includes a first transcription criterion that is satisfied when the first user input is directed to the first transcription affordance:
    ceasing to display the first transcription affordance.

5. The electronic device of claim 4, the one or more programs further including instructions for:
  in accordance with a determination that the first set of transcription criteria are not satisfied:
    forgoing displaying the first visual object that provides visual feedback based on audio detected using the audio input device and varies based on volume of the audio detected using the audio input device while maintaining display of the text entry field.

6. The electronic device of claim 1, the one or more programs further including instructions for:
  concurrently displaying, on the display device with the text entry field and the first transcription affordance:
    a second text entry field, and
    a third transcription affordance;
  detecting activation of the third transcription affordance; and
  in response to detecting activation of the third transcription affordance:
    displaying, at a location on the display device that is proximate to the second text entry field, a third visual object that provides visual feedback based on audio detected using the audio input device.

7. The electronic device of claim 1, wherein replacing display of at least a portion of the keyboard with the second visual object that provides visual feedback based on audio detected using the audio input device and varies based on volume of the audio detected using the audio input device comprises:
  ceasing display of the keyboard; and
  replacing display of the keyboard with the second visual object that provides visual feedback based on audio detected using the audio input device and varies based on volume of the audio detected using the audio input device.

8. A non-transitory computer-readable storage medium storing one or more programs configured to be executed by one or more processors of an electronic device with a display device and an audio input device, the one or more programs including instructions for:
  while not displaying, on the display device, a text entry field and a first transcription affordance, receiving a request;
  in response to receiving the request, concurrently displaying, on the display device:
    the text entry field, and
    the first transcription affordance at a first location;
  detecting a first user input; and
  in response to detecting the first user input:
    in accordance with a determination that the first user input is directed to the first transcription affordance:
      displaying, on the display device, a first visual object that provides visual feedback based on audio detected using the audio input device and varies based on volume of the audio detected using the audio input device without displaying a keyboard, wherein the first visual object overlays at least a portion of the text entry field;
    in accordance with a determination that the first user input is directed to the text entry field:
      displaying, on the display device concurrently with the text entry field and the first transcription affordance, a keyboard with a second transcription affordance that is different from the first transcription affordance, wherein the second transcription affordance is displayed at a second location that is different from the first location;
  after displaying the keyboard with the second transcription affordance:
    detecting a second user input; and
    in accordance with a determination that the second user input is directed to the second transcription affordance:
      replacing, on the display device, display of at least a portion of the keyboard with a second visual object that provides visual feedback based on audio detected using the audio input device and varies based on volume of the audio detected using the audio input device.

9. The non-transitory computer-readable storage medium of claim 8, the one or more programs further including instructions for:
  while displaying the first visual object that provides visual feedback based on audio detected using the audio input device and varies based on volume of the audio detected using the audio input device:
    detecting, using the audio input device, audio input; and
    in response to detecting audio input, displaying text in the text entry field, wherein the text is based on the detected audio input.

10. The non-transitory computer-readable storage medium of claim 8, the one or more programs further including instructions for:
  while displaying the first visual object that provides visual feedback based on audio detected using the audio input device and varies based on volume of the audio detected using the audio input device:
    determining that audio levels received for a threshold duration of time do not exceed a threshold audio level; and
  in response to the determination that audio levels received for the threshold duration of time do not exceed the threshold audio level, ceasing to display the first visual object.

11. The non-transitory computer-readable storage medium of claim 8, the one or more programs further including instructions for:
  in accordance with the determination that a first set of transcription criteria is satisfied, wherein the first set of transcription criteria includes a first transcription criterion that is satisfied when the first user input is directed to the first transcription affordance:
    ceasing to display the first transcription affordance.

12. The non-transitory computer-readable storage medium of claim 11, the one or more programs further including instructions for:
- in accordance with a determination that the first set of transcription criteria are not satisfied:
  - forgoing displaying the first visual object that provides visual feedback based on audio detected using the audio input device and varies based on volume of the audio detected using the audio input device while maintaining display of the text entry field.

13. The non-transitory computer-readable storage medium of claim 8, the one or more programs further including instructions for:
- concurrently displaying, on the display device with the text entry field and the first transcription affordance:
  - a second text entry field, and
  - a third transcription affordance;
- detecting activation of the third transcription affordance; and
- in response to detecting activation of the third transcription affordance:
  - displaying, at a location on the display device that is proximate to the second text entry field, a third visual object that provides visual feedback based on audio detected using the audio input device.

14. The non-transitory computer-readable storage medium of claim 8, wherein replacing display of at least a portion of the keyboard with the second visual object that provides visual feedback based on audio detected using the audio input device and varies based on volume of the audio detected using the audio input device comprises:
- ceasing display of the keyboard; and
- replacing display of the keyboard with the second visual object that provides visual feedback based on audio detected using the audio input device and varies based on volume of the audio detected using the audio input device.

15. A method, comprising:
- at an electronic device with a display device and an audio input device:
  - while not displaying, on the display device, a text entry field and a first transcription affordance, receiving a request;
  - in response to receiving the request, concurrently displaying, on the display device:
    - the text entry field, and
    - the first transcription affordance at a first location;
  - detecting a first user input; and
  - in response to detecting the first user input:
    - in accordance with a determination that the first user input is directed to the first transcription affordance:
      - displaying, on the display device, a first visual object that provides visual feedback based on audio detected using the audio input device and varies based on volume of the audio detected using the audio input device without displaying a keyboard, wherein the first visual object overlays at least a portion of the text entry field;
    - in accordance with a determination that the first user input is directed to the text entry field:
      - displaying, on the display device concurrently with the text entry field and the first transcription affordance, a keyboard with a second transcription affordance that is different from the first transcription affordance, wherein the second transcription affordance is displayed at a second location that is different from the first location;
  - after displaying the keyboard with the second transcription affordance:
    - detecting a second user input; and
    - in accordance with a determination that the second user input is directed to the second transcription affordance:
      - replacing, on the display device, display of at least a portion of the keyboard with a second visual object that provides visual feedback based on audio detected using the audio input device and varies based on volume of the audio detected using the audio input device.

16. The method of claim 15, further comprising:
- while displaying the first visual object that provides visual feedback based on audio detected using the audio input device and varies based on volume of the audio detected using the audio input device:
  - detecting, using the audio input device, audio input; and
  - in response to detecting audio input, displaying text in the text entry field, wherein the text is based on the detected audio input.

17. The method of claim 15, further comprising:
- while displaying the first visual object that provides visual feedback based on audio detected using the audio input device and varies based on volume of the audio detected using the audio input device:
  - determining that audio levels received for a threshold duration of time do not exceed a threshold audio level; and
- in response to the determination that audio levels received for the threshold duration of time do not exceed the threshold audio level, ceasing to display the first visual object.

18. The method of claim 15, further comprising:
- in accordance with the determination that a first set of transcription criteria is satisfied, wherein the first set of transcription criteria includes a first transcription criterion that is satisfied when the first user input is directed to the first transcription affordance:
  - ceasing to display the first transcription affordance.

19. The method of claim 18, further comprising:
- in accordance with a determination that the first set of transcription criteria are not satisfied:
  - forgoing displaying the first visual object that provides visual feedback based on audio detected using the audio input device and varies based on volume of the audio detected using the audio input device while maintaining display of the text entry field.

20. The method of claim 15, further comprising:
- concurrently displaying, on the display device with the text entry field and the first transcription affordance:
  - a second text entry field, and
  - a third transcription affordance;
- detecting activation of the third transcription affordance; and
- in response to detecting activation of the third transcription affordance:
  - displaying, at a location on the display device that is proximate to the second text entry field, a third visual object that provides visual feedback based on audio detected using the audio input device.

21. The method of claim 15, wherein replacing display of at least a portion of the keyboard with the second visual object that provides visual feedback based on audio detected using the audio input device and varies based on volume of the audio detected using the audio input device comprises:
   ceasing display of the keyboard; and
   replacing display of the keyboard with the second visual object that provides visual feedback based on audio detected using the audio input device and varies based on volume of the audio detected using the audio input device.

\* \* \* \* \*